US009174689B2

(12) United States Patent
Owada

(10) Patent No.: US 9,174,689 B2
(45) Date of Patent: Nov. 3, 2015

(54) VEHICLE HEADLIGHT AND PROJECTION LENS

(71) Applicant: Stanley Electric Co., Ltd., Tokyo (JP)

(72) Inventor: Ryotaro Owada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 14/188,665

(22) Filed: Feb. 24, 2014

(65) Prior Publication Data

US 2014/0313762 A1  Oct. 23, 2014

(30) Foreign Application Priority Data

Feb. 22, 2013  (JP) ................................. 2013-033447

(51) Int. Cl.
| F21V 1/00 | (2006.01) |
| F21V 5/00 | (2015.01) |
| B62J 6/02 | (2006.01) |
| F21S 8/10 | (2006.01) |
| B60Q 1/00 | (2006.01) |

(52) U.S. Cl.
CPC ................. B62J 6/02 (2013.01); B60Q 1/0088 (2013.01); F21S 48/1104 (2013.01); F21S 48/1109 (2013.01); F21S 48/1131 (2013.01); F21S 48/1154 (2013.01); F21S 48/1216 (2013.01); F21S 48/1258 (2013.01); F21S 48/1283 (2013.01); F21S 48/1747 (2013.01); F21S 48/328 (2013.01)

(58) Field of Classification Search
CPC ... F21S 48/12; F21S 48/1258; F21S 48/1283; F21S 48/1291; G02B 3/02; G02B 3/04; G02B 3/10

USPC .................................................. 362/509, 520
See application file for complete search history.

(56) References Cited

U.S. PATENT DOCUMENTS

| 2,760,051 | A | * | 8/1956 | Schmidt ........................ 362/530 |
| 3,708,221 | A | * | 1/1973 | Schaefer ....................... 359/718 |
| 5,688,044 | A | * | 11/1997 | Watanabe et al. ............. 362/516 |
| 7,152,985 | B2 | * | 12/2006 | Benitez et al. ................. 359/857 |
| 7,484,871 | B2 | * | 2/2009 | Boxler .......................... 362/545 |
| 7,922,370 | B2 | * | 4/2011 | Zhang et al. ............. 362/311.02 |
| 8,581,284 | B2 | | 11/2013 | Seko |

(Continued)

FOREIGN PATENT DOCUMENTS

| JP | 2010-93208 A | 4/2010 |
| JP | 2010-277818 A | 12/2010 |

(Continued)

*Primary Examiner* — Jong-Suk (James) Lee
*Assistant Examiner* — Bryon T Gyllstrom
(74) *Attorney, Agent, or Firm* — Kenealy Vaidya LLP

(57) ABSTRACT

A vehicle headlight can form a predetermined high-beam light distribution pattern, while being capable of causing the chromaticity of the entire light distribution pattern to fall within a white range (JIS D5500). The vehicle headlight can include: a projection lens that can control light incident on its light incident surface at a first incident position near its optical axis to be directed in a direction not parallel to the optical axis, can control light incident at a second incident position away from the optical axis to be directed in a direction parallel to the optical axis, and can control light incident at an incident position between the first and second incident positions to be directed in a direction closer to the direction parallel to the optical axis as the light is incident at an incident position closer from the first incident position to the second incident position.

9 Claims, 47 Drawing Sheets

(56) References Cited

U.S. PATENT DOCUMENTS

| | | | |
|---|---|---|---|
| 8,631,787 B2 * | 1/2014 | Benitez et al. | 126/689 |
| 2002/0034078 A1 * | 3/2002 | Natsume | 362/509 |
| 2008/0316761 A1 * | 12/2008 | Minano et al. | 362/518 |
| 2009/0219716 A1 * | 9/2009 | Weaver et al. | 362/235 |
| 2010/0080012 A1 * | 4/2010 | Bernard | 362/509 |
| 2010/0090229 A1 | 4/2010 | Harada | |

FOREIGN PATENT DOCUMENTS

| | | |
|---|---|---|
| JP | 2011-204376 A | 10/2011 |
| JP | 2012-134355 A | 7/2012 |

* cited by examiner

FIG. 1A
Conventional Art
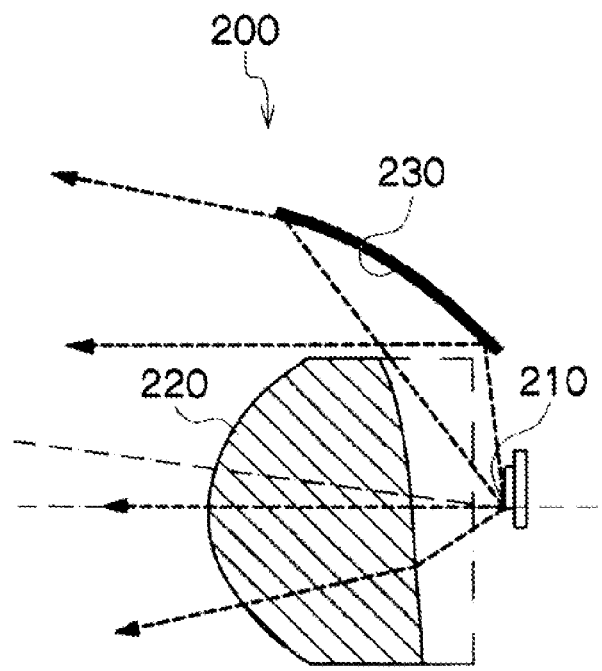
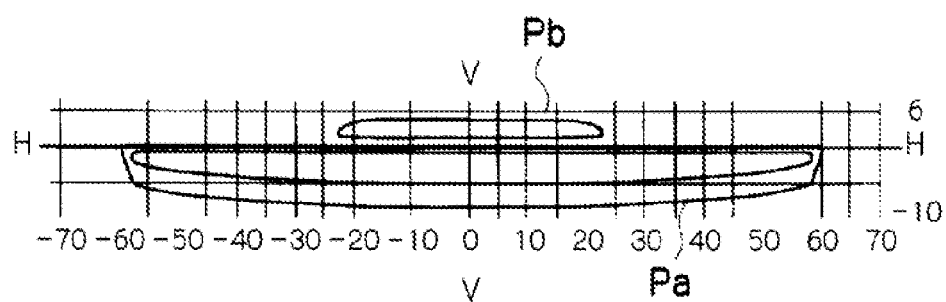
FIG. 1B
Conventional Art

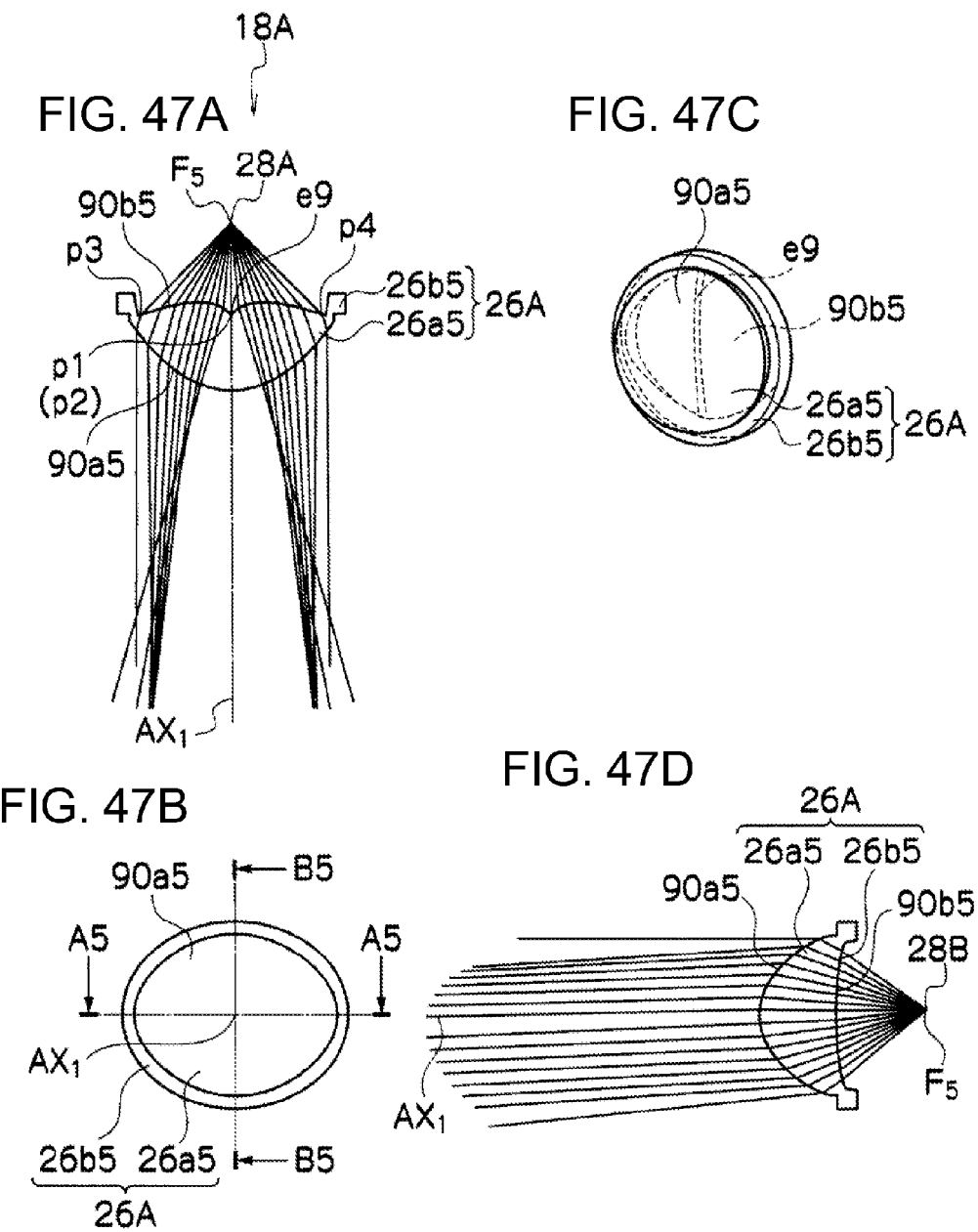

VEHICLE HEADLIGHT AND PROJECTION LENS

This application claims the priority benefit under 35 U.S.C. §119 of Japanese Patent Application No. 2013-033447 filed on Feb. 22, 2013, which is hereby incorporated in its entirety by reference.

TECHNICAL FIELD

The presently disclosed subject matter relates to a vehicle headlight and a projection lens, and in particular, to a vehicle headlight utilizing a semiconductor light emitting device as well as to a projection lens for use in such a vehicle headlight.

BACKGROUND ART

In recent years, various vehicle lighting units including headlights utilizing a semiconductor light emitting device as a light source have been proposed, for example, such as those disclosed in Japanese Patent Application Laid-Open No. 2010-277818.

As shown in FIG. 1A, a conventional vehicle lighting unit 200 disclosed in the above publication includes a light source 210 utilizing a semiconductor light emitting device such as an LED, a projection lens 220 disposed in front of the light source 210, etc.

In the vehicle lighting device 200 with the above configuration, the light emitted from the light source 210 and projected forward through the projection lens 220 can form a basic light distribution pattern Pa as illustrated in FIG. 1B, diffused in the horizontal direction below the horizontal line H.

When the vehicle lighting unit 200 with the above configuration uses as the light source 210 a light source that uses a combination of a semiconductor light emitting device (such as a blue LED) and a light-transmitting member (such as a yellow YAG phosphor) covering the light emitting device, such as those disclosed in Japanese Patent Application Laid-Open Nos. 2012-134355, 2011-204376, and 2010-93208), a problem or characteristic may arise in which the chromaticity of the basic light distribution pattern Pa partially falls outside the white range as determined under a provision of law or the like (for example, JIS D5500).

When a light source with a combined structure of a semiconductor light emitting device and a light-transmitting member covering the light emitting device is used, the blue light emitted from the semiconductor light emitting device and directed in an optical axis (for example, a normal direction to the light emission surface of the semiconductor light emitting device) may travel a shorter distance through the light-transmitting member when compared with the blue light directed in an oblique direction to the optical axis. As a result, the blue light directed in the normal direction may not be sufficiently absorbed by the phosphor, and not converted to yellow light. This phenomenon may cause the above characteristics and/or problems.

SUMMARY

The presently disclosed subject matter was devised in view of these and other characteristics, problems and features in association with the conventional art. According to an aspect of the presently disclosed subject matter, a vehicle headlight can be configured to form a predetermined light distribution pattern (such as a high-beam light distribution pattern) while being capable of causing the chromaticity of the entire light distribution pattern to fall within a white range as determined under a provision of law or the like (for example, JIS D5500).

According to another aspect of the presently disclosed subject matter, a vehicle headlight having an optical axis extending in a front-to-rear direction of a vehicle body on which the vehicle headlight is to be mounted can include: a projection lens disposed on the optical axis, the projection lens including a light emitting surface, a light incident surface on which light to be projected through the light emitting surface is incident, and a reference point disposed to face the light incident surface; and a light source disposed substantially at (i.e., at or near) the reference point, the light source emitting white light to be incident on the light emitting surface to enter the projection lens and be projected forward through the light emitting surface. In the vehicle headlight with the above configuration, the light source can be configured to emit white light by color mixture of at least a first color light and a second color light so that white light directed in a direction of the optical axis can contain a relatively larger amount of the first color light than the second color light while white light directed in an oblique direction with respect to the optical axis by a certain angle can contain a relatively larger amount of the second color light than the first color light. The light emitting surface and/or the light incident surface can be configured to have a surface that can control, of the light from the reference point to be incident on the light incident surface to enter the projection lens and be projected forward through the light emitting surface, light incident on the light incident surface at an incident position on the optical axis or a first incident position near the optical axis to be directed in a direction not parallel to the optical axis, and light incident on the light incident surface at a second incident position away from the optical axis to be directed in a direction parallel to the optical axis. Furthermore, the light emitting surface and/or the light incident surface can be configured to have the surface that can control light incident on the light incident surface at an incident position between the first incident position and the second incident position to be directed in a direction closer to the direction parallel to the optical axis as the light is incident on the light incident surface at an incident position closer from the first incident position to the second incident position.

In the vehicle headlight with the above configuration, the chromaticity of an entire light distribution pattern (for example, a high-beam light distribution pattern) can be allowed to fall within a white range as determined under a provision of law or the like (for example, JIS D5500).

This is because the light emitting surface and/or the light incident surface of the projection lens are/is specifically designed such that the light incident on the light incident surface at an incident position on the optical axis or the first incident position near the optical axis is controlled to be directed in a direction not parallel to the optical axis while the light incident on the light incident surface at the second incident position away from the optical axis is controlled to be directed in a direction parallel to the optical axis, and further such that the light incident on the light incident surface at an incident position between the first incident position and the second incident position is controlled to be directed in a direction closer to the parallel direction as the incident position approaches more from the first incident position to the second incident position.

The light source can be configured to include at least one semiconductor light emitting device that can emit the first color light and a light-transmitting member that can absorb at least part of the first color light from the semiconductor light emitting device and convert the first color light into the second color light.

The first color light may be blue light while the second color light may be yellow light.

According to further another aspect of the presently disclosed subject matter, a projection lens can include a light emitting surface, a light incident surface on which light to be projected through the light emitting surface is incident, and a reference point disposed to face the light incident surface. In the projection lens with the above configuration, the light emitting surface and/or the light incident surface can be configured to have a surface that can control, of the light from the reference point to be incident on the light incident surface to enter the projection lens and be projected forward through the light emitting surface, light incident on the light incident surface at an incident position on a predetermined reference axis or a first incident position near the predetermined reference axis to be directed in a direction not parallel to the predetermined reference axis, and light incident on the light incident surface at a second incident position away from the predetermined reference axis to be directed in a direction parallel to the predetermined reference axis. Furthermore, the light emitting surface and/or the light incident surface can be configured to have the surface that can control light incident on the light incident surface at an incident position between the first incident position and the second incident position to be directed in a direction closer to the direction parallel to the predetermined reference axis as the light is incident on the light incident surface at an incident position closer from the first incident position to the second incident position.

In the projection lens with the above configuration, the chromaticity of an entire light distribution pattern (for example, a high-beam light distribution pattern) can be allowed to fall within a white range as determined under a provision of law or the like (for example, JIS D5500).

This is because the light emitting surface and/or the light incident surface of the projection lens are/is specifically designed such that the light incident on the light incident surface at an incident position on the optical axis or the first incident position near the optical axis is controlled to be directed in a direction not parallel to the optical axis while the light incident on the light incident surface at the second incident position away from the optical axis is controlled to be directed in a direction parallel to the optical axis, and further such that the light incident on the light incident surface at an incident position between the first incident position and the second incident position is controlled to be directed in a direction closer to the parallel direction as the incident position approaches more from the first incident position to the second incident position.

BRIEF DESCRIPTION OF DRAWINGS

These and other characteristics, features, and advantages of the presently disclosed subject matter will become clear from the following description with reference to the accompanying drawings, wherein:

FIGS. 1A and 1B are a vertical cross sectional view of a conventional vehicle lighting unit, and a graph showing an example of a light distribution pattern formed by the conventional vehicle lighting unit, respectively;

FIG. 5 is a perspective view of the headlight while omitting an outer lens, a hosing, an extension and the like;

FIG. 6 is a perspective view of the headlight while omitting an outer lens, a hosing and the like;

FIG. 10 is a perspective view of the headlight while omitting an outer lens, a hosing, an extension, a first lens, a second lens and the like;

FIG. 16 is a perspective view of the headlight while omitting an outer lens, a first lens, a second lens, an extension and the like;

FIGS. 47A, 47B, 47C and 47D are a cross-sectional view of a low-beam optical system 18A taken along line A5-A5 of FIG. 47B, a front view, a perspective view, and a cross-sectional view of the low-beam optical system 18A taken along line B5-B5 of FIG. 47B, respectively.

DESCRIPTION OF EXEMPLARY EMBODIMENTS

Figure 2:
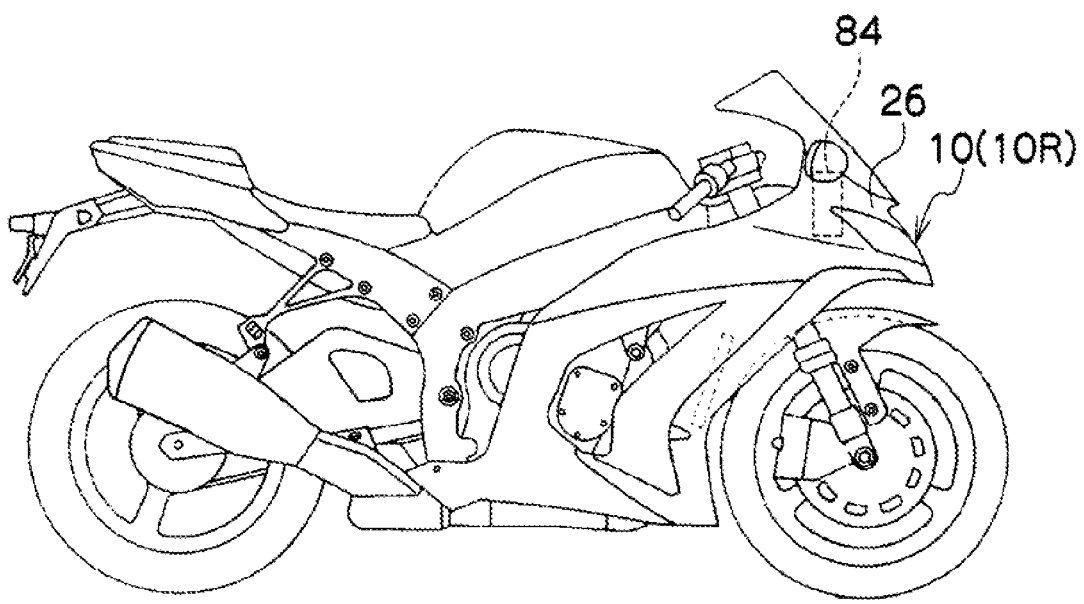
FIG. 2 is a side view of a motorcycle on which a headlight for a motorcycle as an embodiment made in accordance with principles of the presently disclosed subject matter is mounted.
Figure 3:
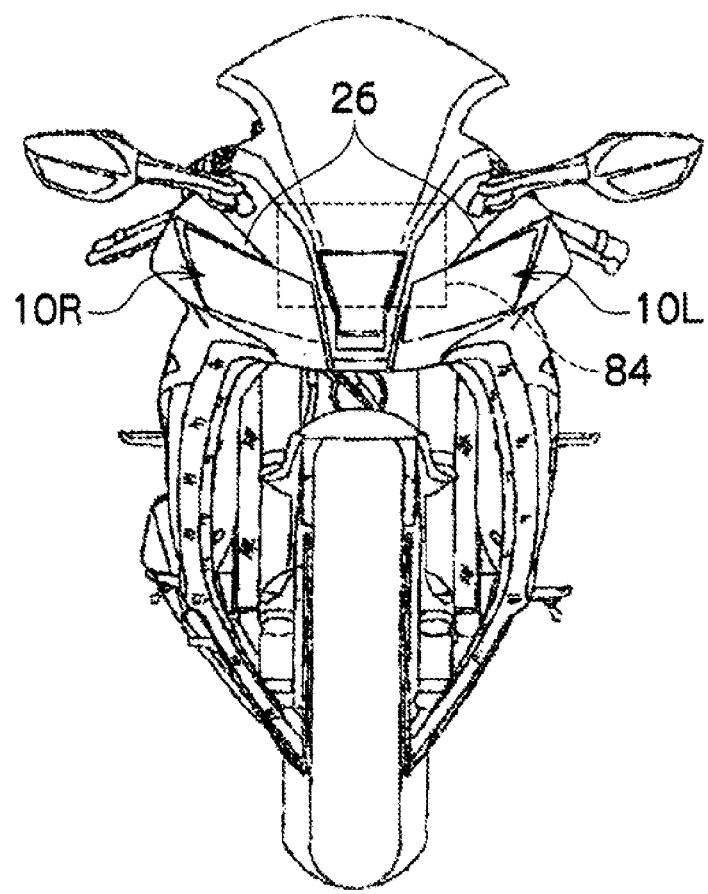
FIG. 3 is a front view of the motorcycle of FIG. 2.

A description will now be made below to vehicle headlights of the presently disclosed subject matter with reference to the accompanying drawings in accordance with exemplary embodiments. FIG. 2 is a side view of a motorcycle on which a headlight for a motorcycle (motorcycle headlight) as an embodiment made in accordance with principles of the presently disclosed subject matter is mounted, and FIG. 3 is a front view of the motorcycle of FIG. 2. The vehicle headlight of the presently disclosed subject matter is not limited to those for motorcycles, but can be applied to those for automobiles, trucks, SUVS, all terrain vehicles, snowmobiles, or the like.

The motorcycle headlight 10 of the present embodiment (hereinafter, also referred to as simply the "headlight 10") can be configured as a lighting unit for illuminating the front area of a motorcycle (in the travelling direction), and can be mounted on each of the right and left front portions of the motorcycle as illustrated in FIGS. 2 and 3.

Figure 4:
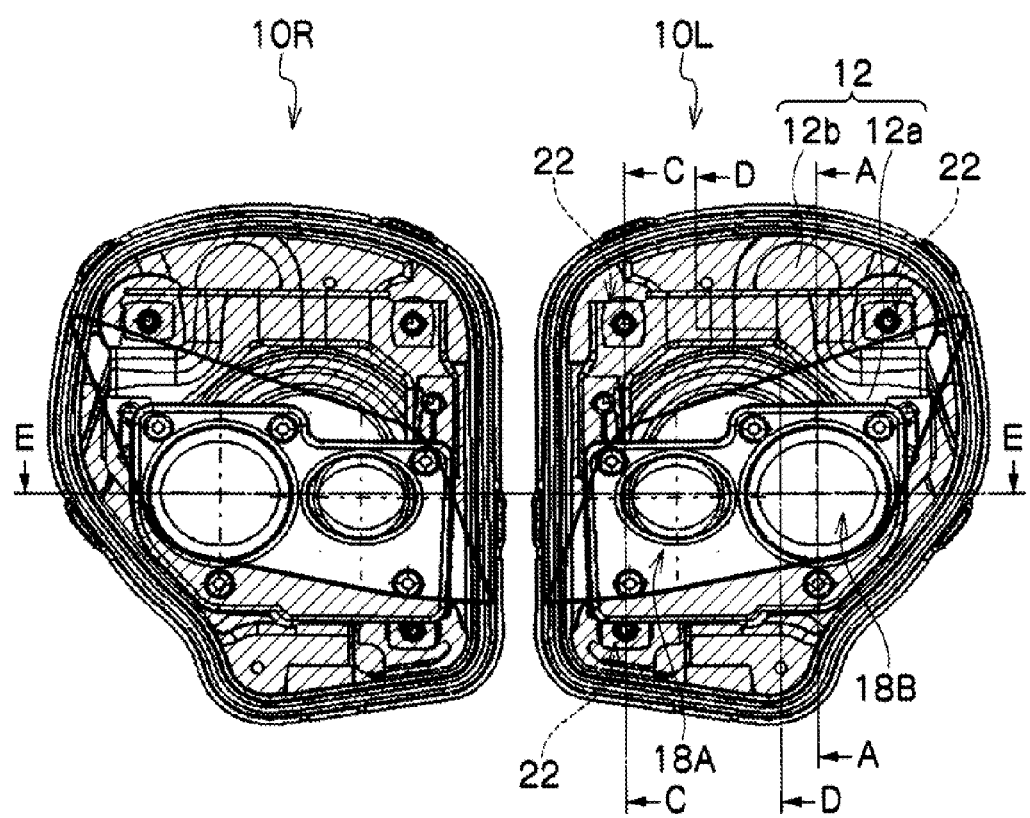
FIG. 4 is a front view of an embodiment of a headlight made in accordance with the presently disclosed subject matter.
Figure 5:
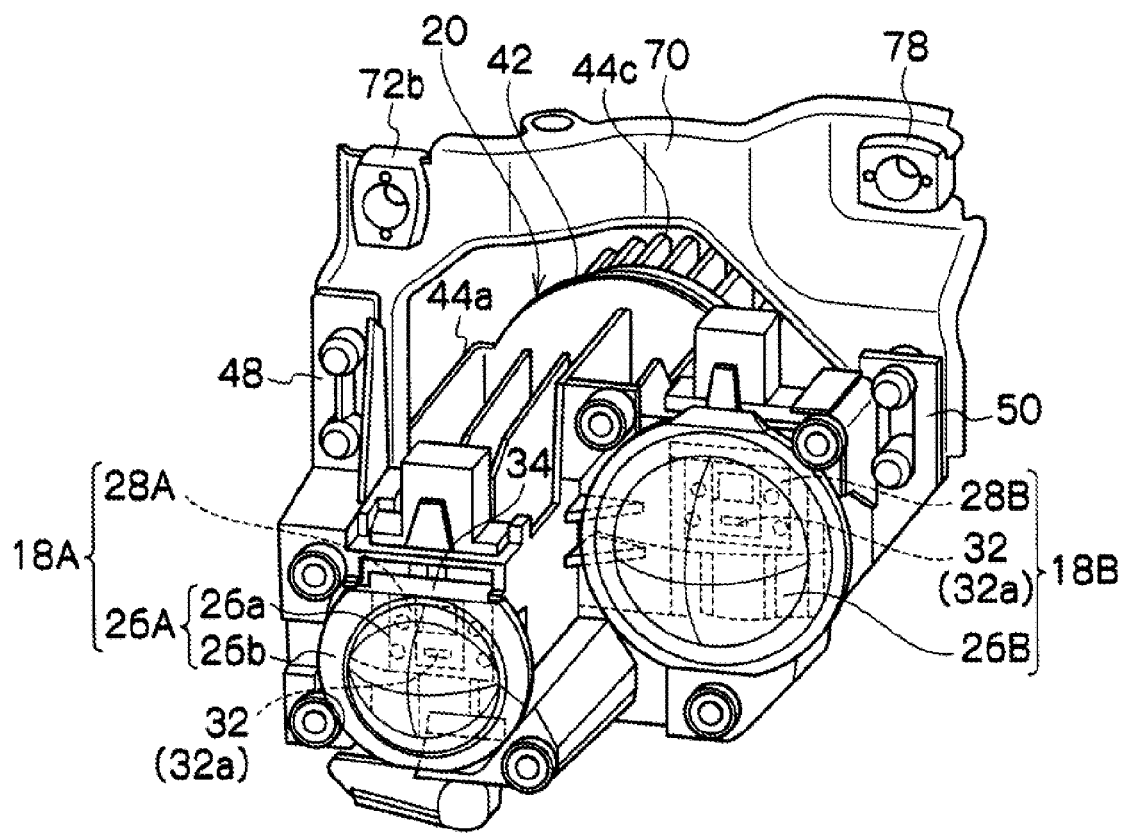
Figure 6:
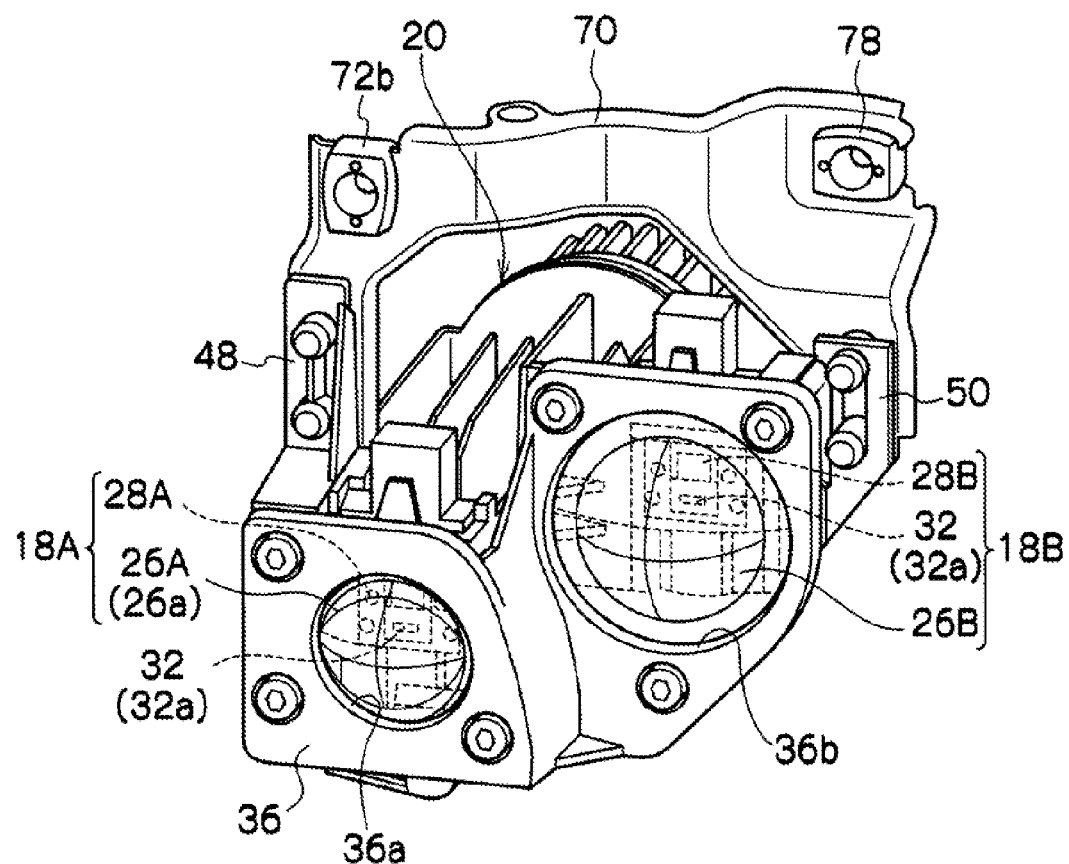
Figure 7:
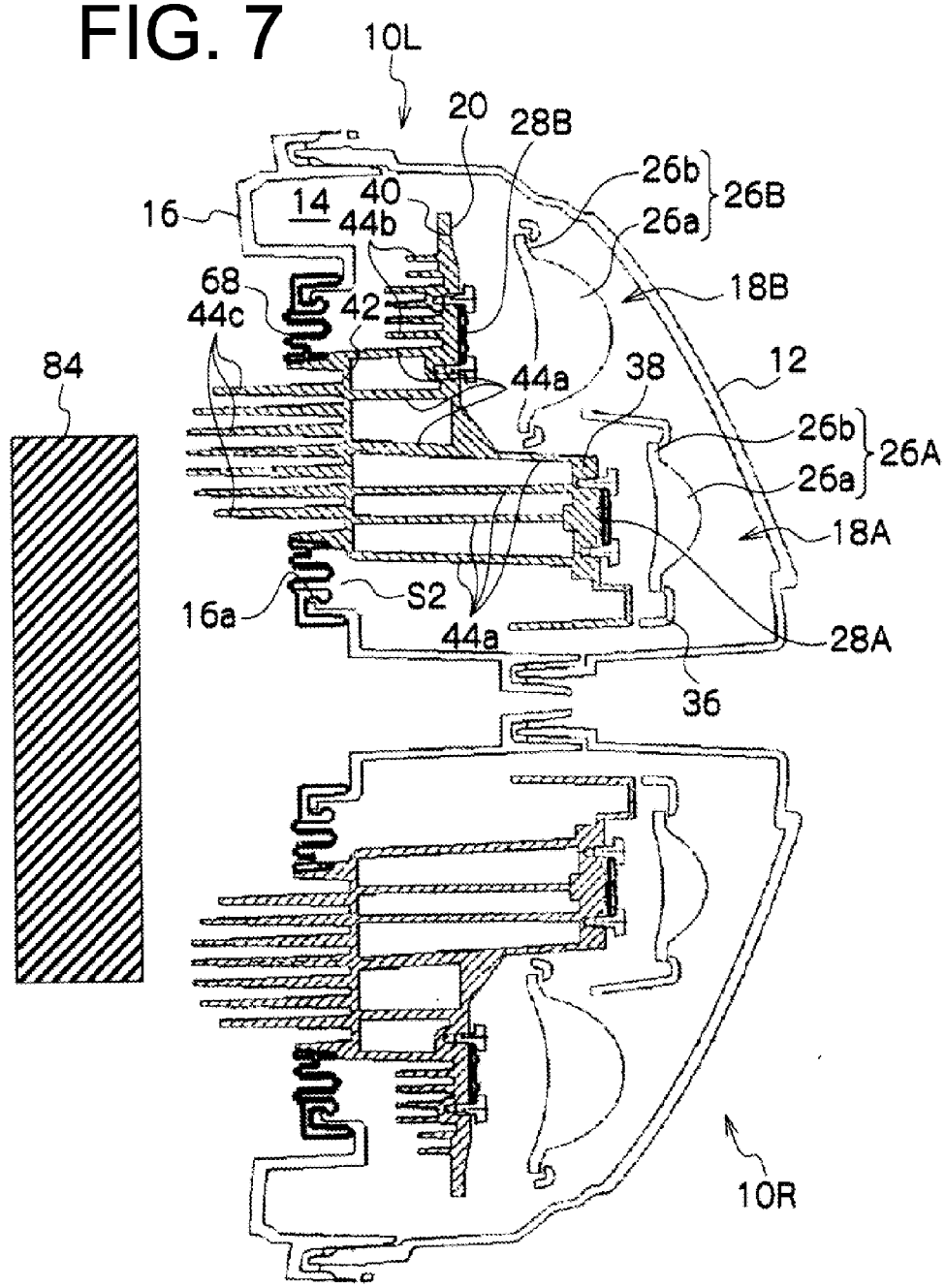
FIG. 7 is a cross-sectional view of the headlight of FIG. 4 taken along line E-E.
Figure 8:
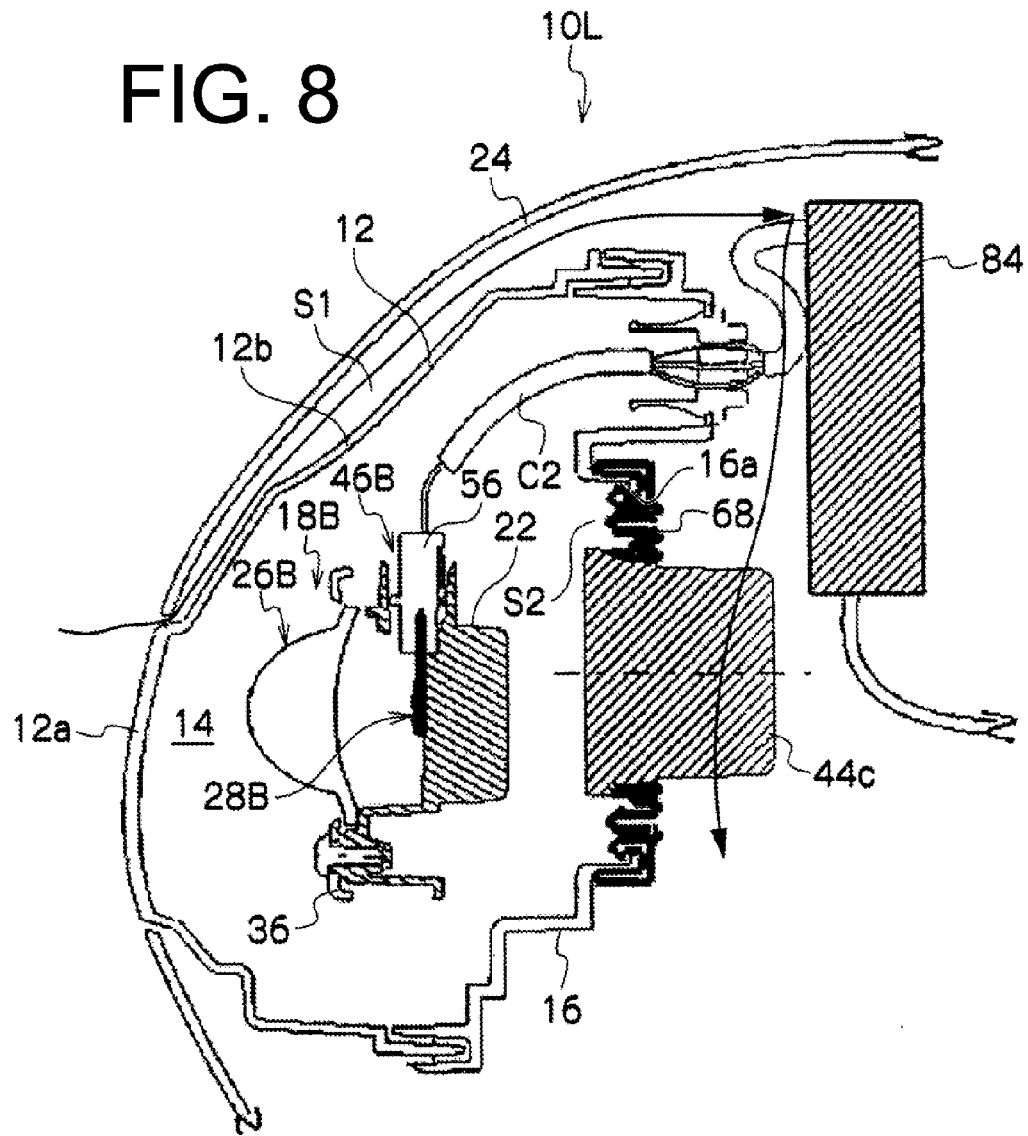
FIG. 8 is a cross-sectional view of the headlight of FIG. 4 taken along line A-A.
Figure 9:
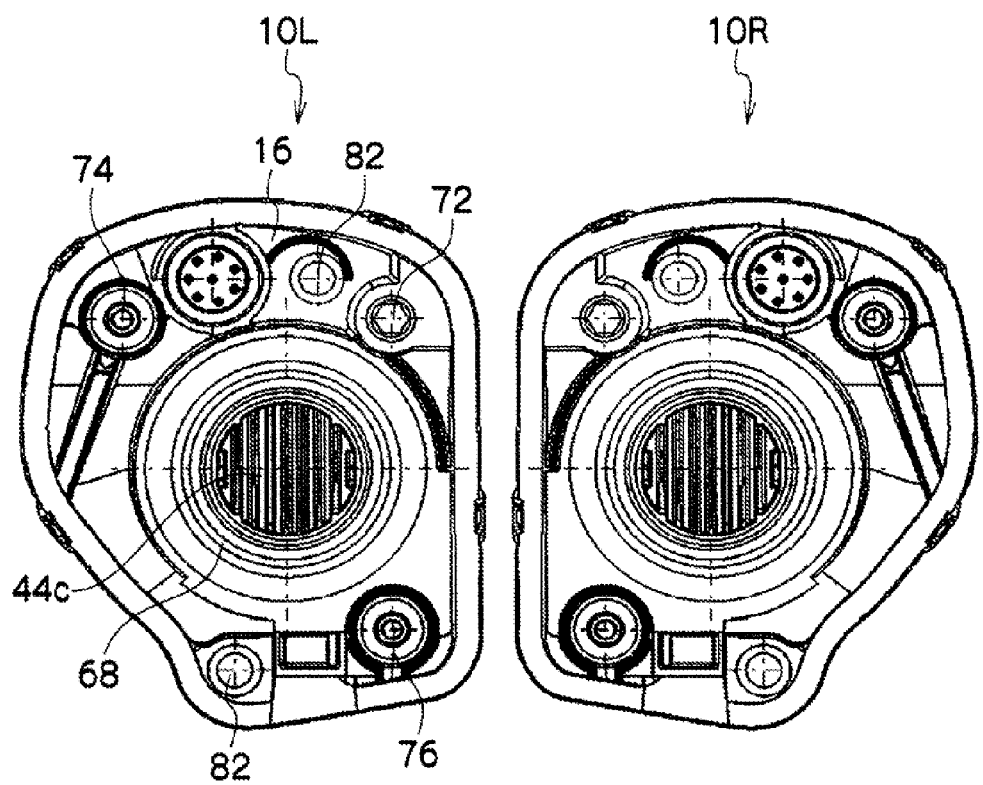
FIG. 9 is a rear view of the headlight.

The headlight 10 on the right side (10R) and the headlight 10 on the left side (10L) can have the same symmetric configuration, and accordingly, a description hereinafter will be given of mainly the left side headlight 10L while a description relating to the right side headlight 10R will be omitted for simplicity. FIG. 4 is a front view of the headlights; FIG. 5 is a perspective view of the headlight while omitting an outer lens, a hosing, an extension and the like; FIG. 6 is a perspective view of the headlight while omitting an outer lens, a hosing and the like; FIG. 7 is a cross-sectional view of the headlights of FIG. 4 taken along line E-E; FIG. 8 is a cross-sectional view of the headlight of FIG. 4 taken along line A-A; and FIG. 9 is a rear view of the headlight.

As illustrated in FIGS. 4 and 7 etc., the headlight 10 can be a two-lamp system headlight (including one for low-beam and the other for high-beam), and can include an outer lens 12, a housing 16 configured to define, together with the outer lens 12, a lighting chamber 14, a low-beam optical system 18A and a high-beam optical system 18B disposed inside the lighting chamber 14, a heat sink 20, an aiming mechanism 22, and the like.

The outer lens 12 can be a light-transmitting plain cover member, and as illustrated in FIGS. 4 and 8, can include a transparent portion 12a through which the light from the low-beam optical system 18A and the high-beam optical system 18B can pass, and an extension portion 12b that extends from the upper portion of the transparent portion 12a upward and rearward to the rear direction of a vehicle body.

The portion other than the transparent portion 12a of the outer lens 12 (which is hatched in FIG. 4) can be an opaque portion to which a black coating can be applied, for example.

The extension portion 12b of the outer lens 12 can be covered with a cowling 24 (see FIG. 8). The cowling 24 can extend from near the upper portion of the transparent portion 12a and along the extension portion 12b of the outer lens 12 so as to configure an air passage S1 with the extension portion 12b for allowing travelling air to flow through (see the arrow in FIG. 8).

As illustrated in FIGS. 4 and 7, the low-beam optical system 18A and the high-beam optical system 18B can be disposed side by side in the horizontal direction inside the lighting chamber 14 while being secured to the heat sink 20.

Figure 10:
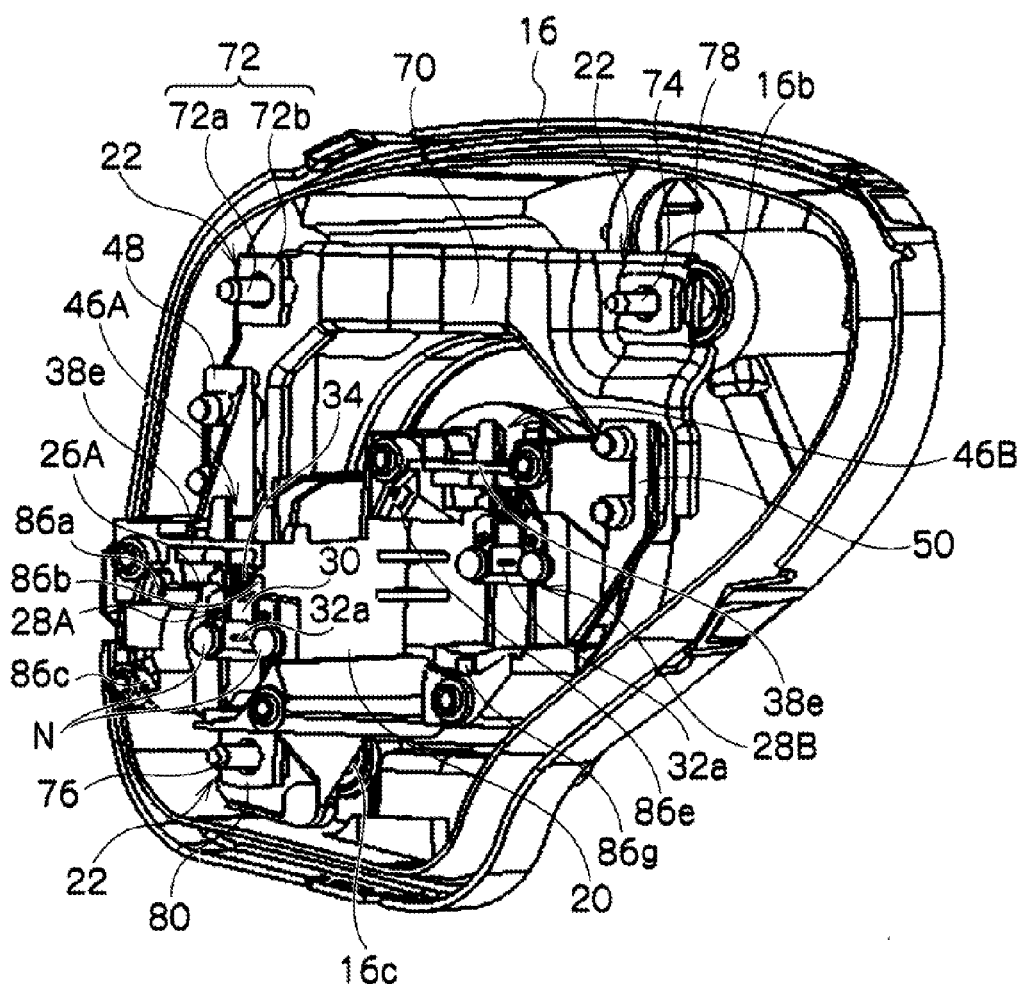

FIG. 10 is a perspective view of the headlight while omitting the outer lens, the hosing, the extension, the first lens, the second lens and the like.

As illustrated in FIG. 10, the heat sink 20 can be supported by the housing 16 while the heat sink 20 can be inclined vertically and horizontally via the aiming mechanism 22.

The low-beam optical system 18A can be a so-called direct projection type optical system, and as shown in FIGS. 5 and 7, can include a first lens 26A and a first light source 28A disposed behind the first lens 26A. The first light source 28A can emit light passing directly through the first lens 26A and the outer lens 12.

As illustrated in FIGS. 5 and 7, the first lens 26A can be formed from a transparent resin and include a lens section 26a having a convex front surface and a concave rear surface and a flange section 26b disposed on the periphery of the lens section 26a.

As illustrated in FIG. 6, the first lens 26A can be disposed in front of the first light source 28A while being secured to the heat sink 20 in such a state that the flange section 26b is interposed between the heat sink 20 (the seat sections 86) and a common extension 36 screwed to the heat sink 20. With this configuration, the lens section 26a of the first lens 26A can be projected through an opening 36a formed in the extension 36.

Figure 26:
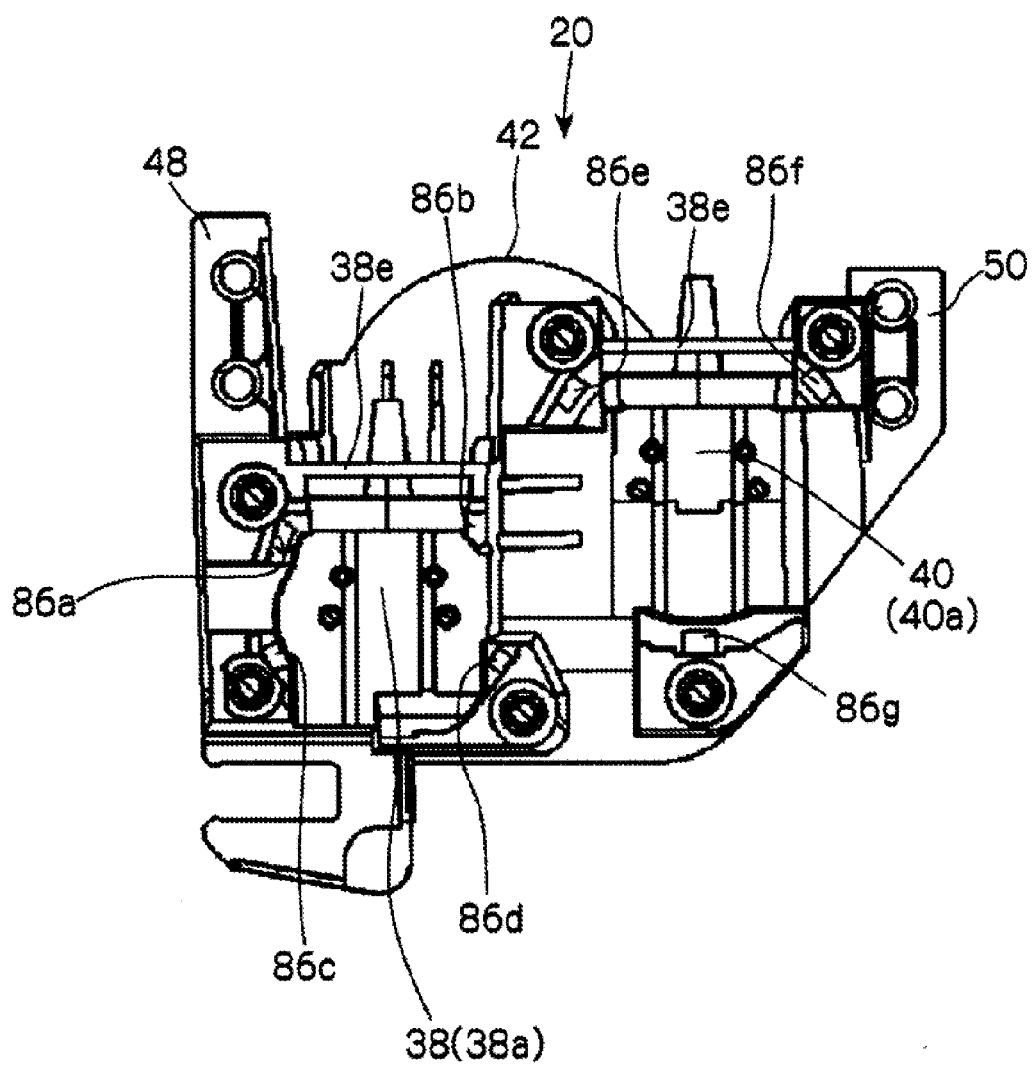
FIG. 26 is a front view of the heat sink.

FIG. 26 is a front view of the heat sink. As illustrated in FIG. 26, the seat sections 86 (86a to 86d) against which the first lens 26A abuts can be disposed at four locations around the front surface 38a of a first base section 38 to which also the first light source 28A can be secured.

Figure 27A:
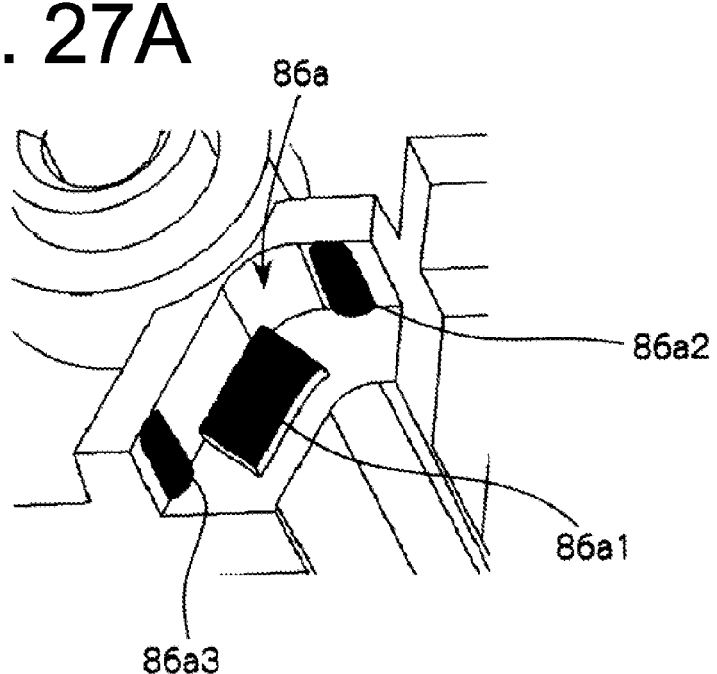
FIGS. 27A and 27B are each an enlarged perspective view of a seat section (86a)
Figure 27B:
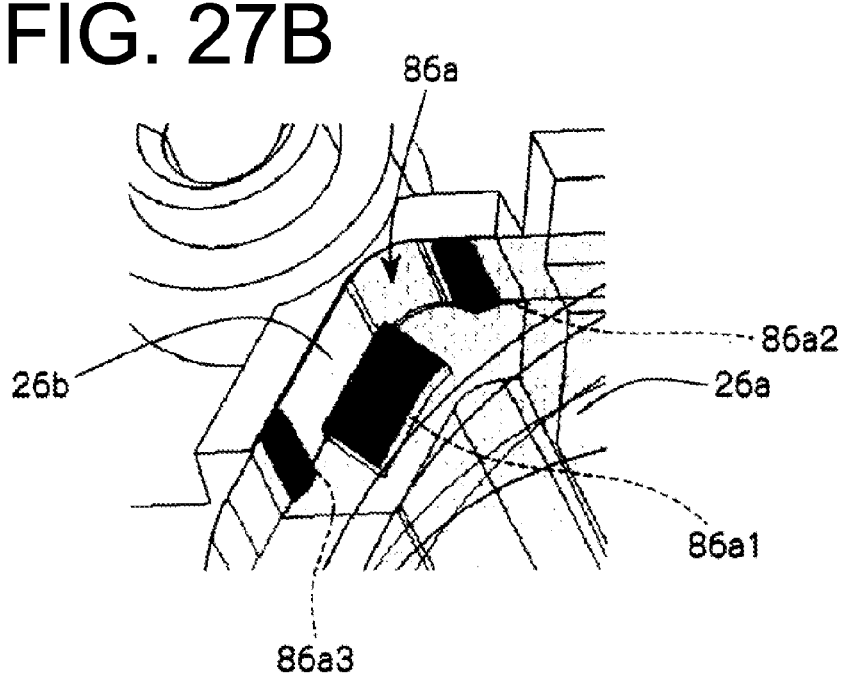

FIG. 27A is an enlarged perspective view of the seat section 86a, and FIG. 27B is an enlarged perspective view of the seat section 86a which is brought into contact with the first lens 26A.

The seat section 86a can include a projected section 86a1 against which the rear surface of the first lens 26A at its flange portion 26a abuts, a projected section 86a2 against which the top surface of the first lens 26A at its flange portion 26a abuts, and a projected section 86a3 against which the side surface of the first lens 26A at its flange portion 26a abuts.

The other seat sections 86b to 86d can include respective projected sections against which each of the rear surface, the top surface, and the side surface of the first lens 26A at its flange section 26a abuts as in the seat section 86a.

The provision of these seat sections 86 (86a to 86d) can allow the position of the first lens 26A to be finely adjusted so that the low-beam optical system 18A can project the low-beam light distribution pattern to an appropriate area. This can also decrease the burden on the fine adjustment of positioning the first lens 26A when a design thereof is changed while a mold for molding these parts may not be changed too much. The adjustment also can be facilitated.

Figure 11:
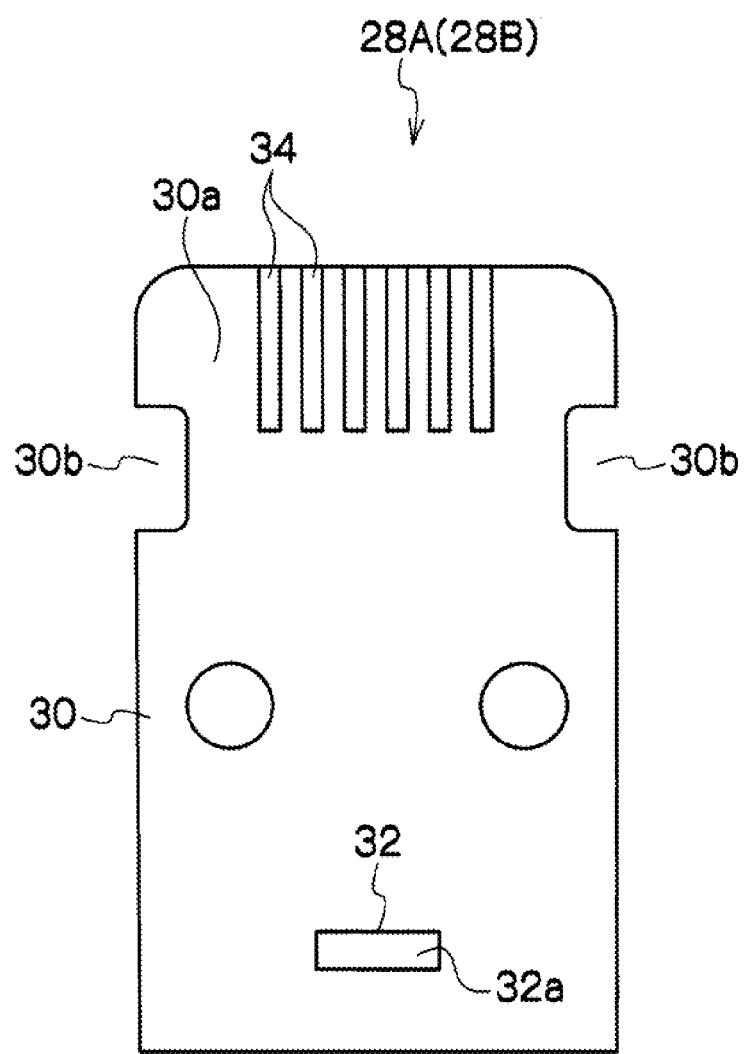
FIG. 11 is a front view of a first light source 28A (a second light source 28B)

FIG. 11 is a front view of the first light source 28A. As illustrated in FIG. 11, the first light source 28A can include a substrate 30, a plurality of semiconductor light emitting devices 32 mounted on the surface of the substrate 30, and a plurality of substrate-side terminals 34 electrically connected to the semiconductor light emitting devices 32. The plurality of substrate-side terminals 34 can be formed on the surface of the substrate 30 along an upper edge of the substrate 30.

The plurality of semiconductor light emitting devices 32 can each have a light emission surface with 1 mm side, for example, and can be mounted in a line on the surface of the substrate 30 made of ceramic or metal, so that an elongated light emission surface 32a can be formed as a whole. The semiconductor light emitting device 32 can be configured by combining a blue LED chip (or laser diode) and a yellow phosphor (for example, YAG phosphor) covering the LED chip, or by combining three color, RGB, LED chips (or laser diodes), which are not limitative.

As illustrated in FIG. 10 and others, the first light source 28A can be screwed to the heat sink 20 with screws N such that the longer side of the elongated rectangular light emission surface 32a is directed horizontally, the light emission surface 32a faces forward, and the plurality of substrate-side terminals 34 is disposed upward.

The high-beam optical system 18B can be a so-called direct projection type optical system, and as shown in FIGS. 5 and 7, can include a second lens 26B and a second light source 28B disposed behind the second lens 26B. The second light source 28B can emit light passing directly through the second lens 26B and the outer lens 12.

The second lens 26B can be formed from a transparent resin and include a lens section 26a and a flange section 26b disposed on the periphery of the lens section 26a.

The second lens 26B can be disposed in front of the second light source 28B while being secured to the heat sink 20 in such a state that the flange section 26b is interposed between the heat sink 20 (the seat sections 86) and the common extension 36 screwed to the heat sink 20. With this configuration, the lens section 26a of the second lens 26B can be projected through an opening 36b formed in the extension 36.

As illustrated in FIG. 26, the seat sections 86 (86e to 86g) against which the second lens 26B abuts can be disposed at three locations around the front surface 40a of a second base section 40 to which also the second light source 28B can be secured.

As in the seat section 86a, the seat sections 86e to 86g can each include a projected section against which the rear surface of the second lens 26B at its flange portion 26a abuts, a projected section against which the top surface of the second lens 26B at its flange portion 26a abuts, and a projected section against which the side surface of the second lens 26B at its flange portion 26a abuts.

The provision of these seat sections 86 (86e to 86g) can allow the position of the second lens 26B to be finely adjusted so that the high-beam optical system 18B can project the high-beam light distribution pattern to an appropriate area. This can also decrease the burden on the fine adjustment of positioning the second lens 26B when a design thereof is changed while a mold for molding these parts may not be changed too much. The adjustment also can be facilitated.

The second lens 26B and the second light source 28B will be detailed later.

Figure 12:
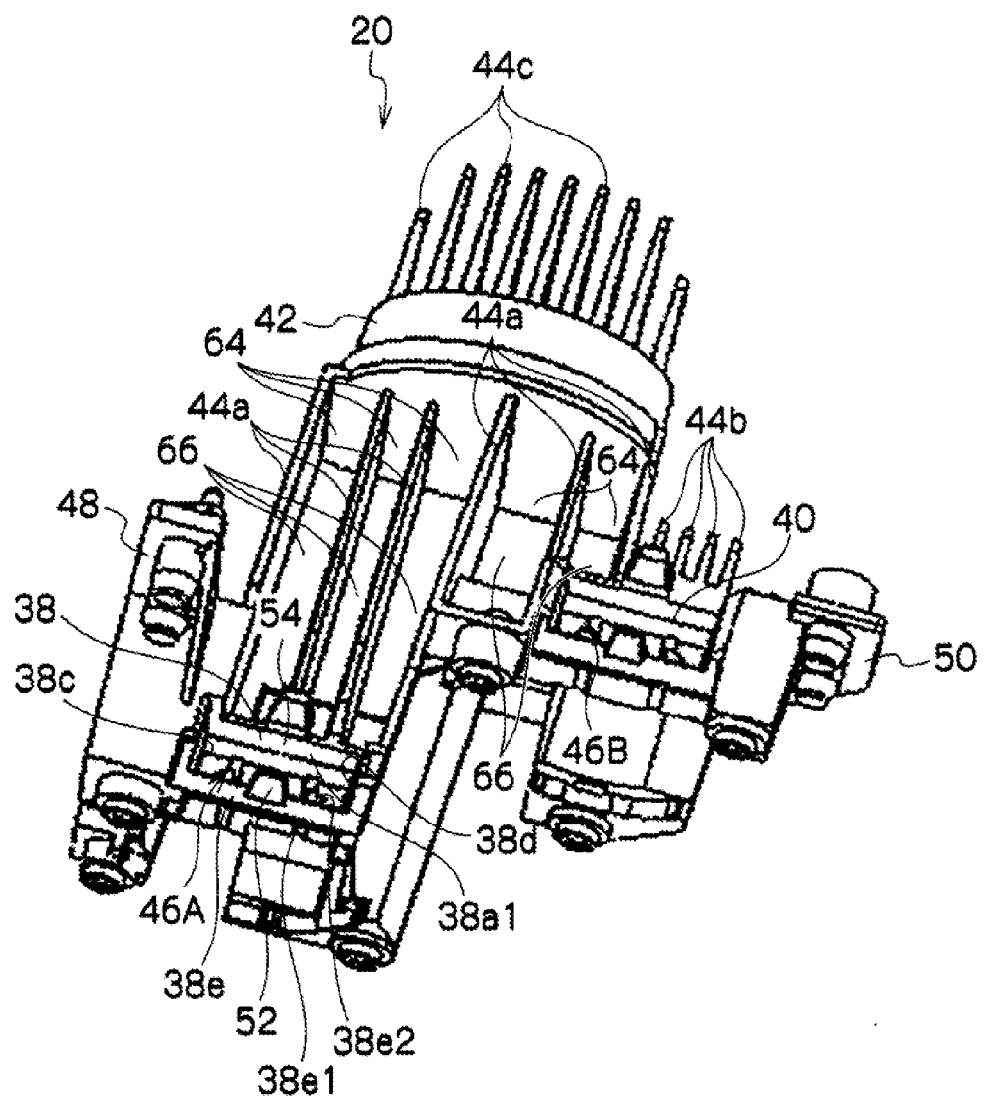
FIG. 12 is a perspective view of a heat sink.
Figure 13A:
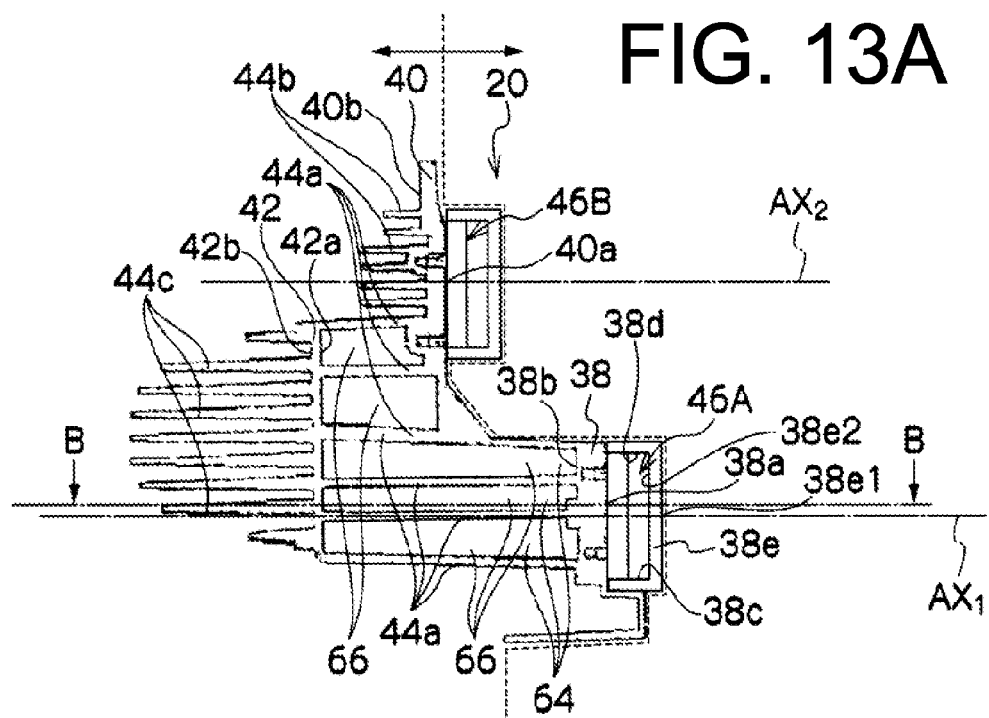
FIGS. 13A and 13B are a top view of the heat sink and a cross-sectional view of the heat sink of FIG. 13A, respectively.
Figure 13B:
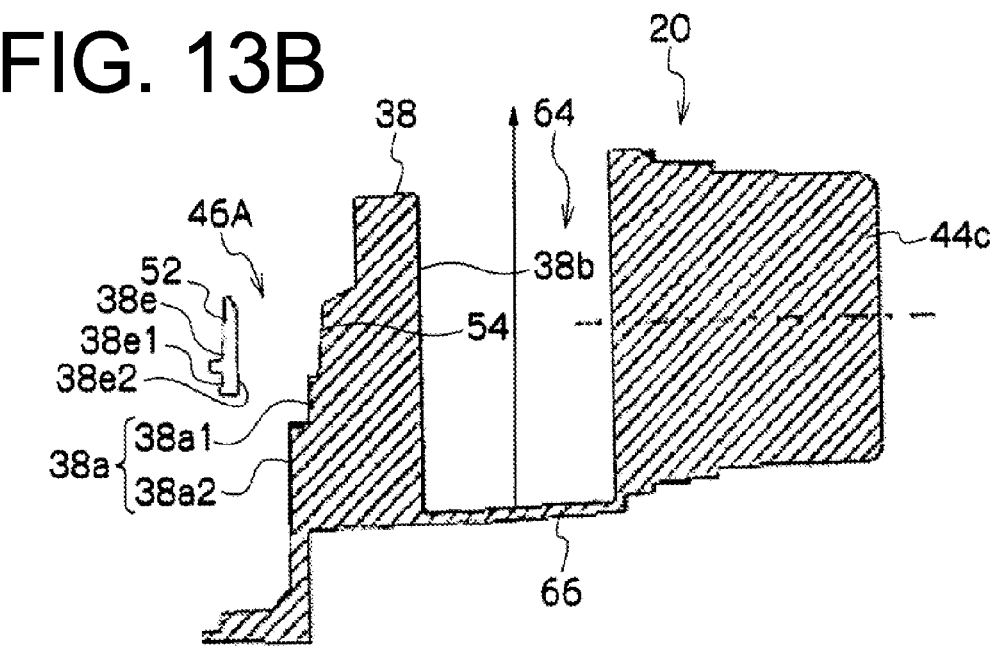

FIG. 12 is a perspective view of the heat sink, and FIGS. 13A and 13B are a top view of the heat sink and a cross-sectional view of the heat sink of FIG. 13A, respectively.

The heat sink 20 can be formed from aluminum by die-casting. As illustrated in FIGS. 12, 13A, and 26, the heat sink 20 can include a first base section 38, a second base section 40, a third base section 42, a plurality of heat dissipation fins 44a to 44c, a first opening section 46A and a second opening section 46B through which respective couplers 56 attached to respective power feed cables C1 and C2 are inserted, and a pair of flange sections 48 and 50 disposed at right and left sides when viewed from its front side.

The heat sink 20 can be configured to dissipate heat generated by the first and second light sources 28A and 28B (semiconductor light emitting devices 32) for cooling, serving as a common member. The heat sink 20 can be integrally molded by injecting a molten aluminum alloy into a cavity defined by two molds horizontally and relatively movable (not shown) and another mold vertically movable with respect to the two molds (not shown). In FIG. 13A, the arrows described on the upper side represent the moving directions of the two molds (mold withdrawn directions) that are moved relatively and horizontally, and the dotted line represents the contact faces of the two molds. In FIG. 13B, the center arrow represents the moving direction of the vertical movable mold (mold withdrawn direction).

As illustrated in FIG. 13A, the first base section 38, the second base section 40, and the third base section 42 can be arranged from the front side of a vehicle body to the rear side thereof, in this order. Furthermore, the second base section 40 can be arranged at a position shifted toward the side surface of the vehicle body more than the first base section 38.

As illustrated in FIG. 12B, the first base section 38 can include a front surface 38a and a rear surface 38b opposite to the front surface 38a. These front and rear surfaces 38a and 38b can be formed as a vertical surface perpendicular to an optical axis $AX_1$ extending in the front-to-rear direction of the vehicle body.

Figure 14:
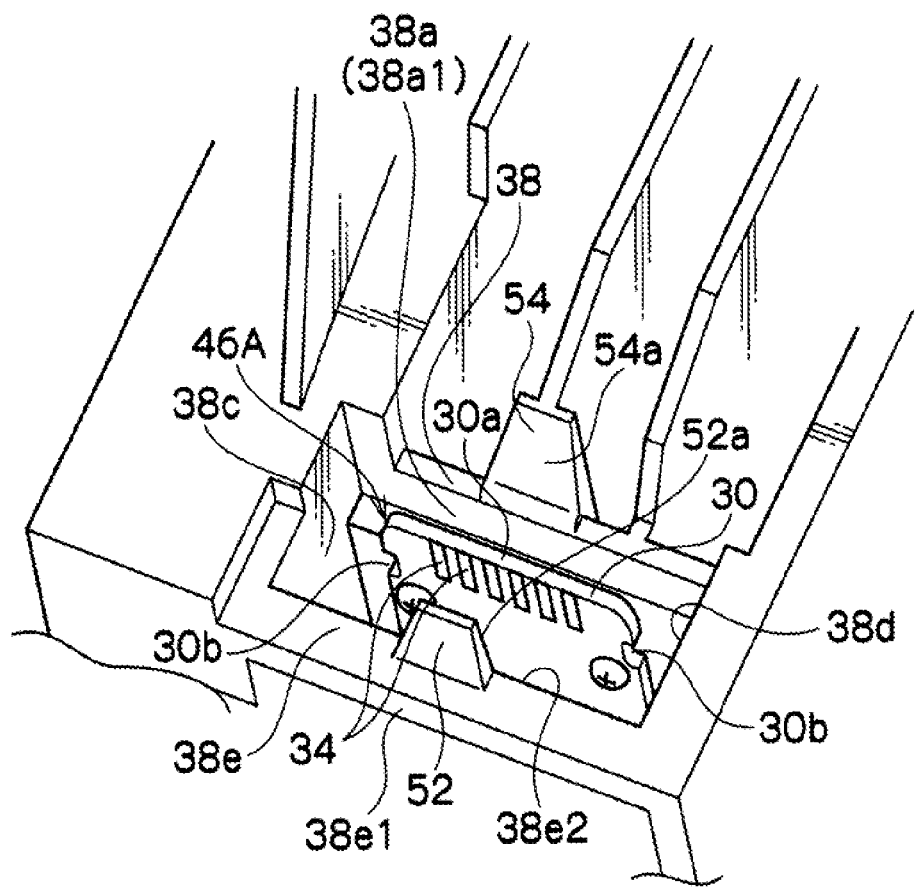
FIG. 14 is an enlarged perspective view of a portion near a first opening section.

As illustrated in FIGS. 10, 12, 13A, 13B, and 14, the first opening section 46A can be provided to the front surface 38a of the first base section 38. FIG. 14 is an enlarged perspective view of a portion near the first opening section 46A.

As illustrated in FIGS. 13B and 14, the first opening section 46A can open while facing upward so that the coupler 56 (see FIGS. 16 and 17) attached to the power feeding cable C can be inserted not from the side, front, and rear sides, but from the upper side in view of the miniaturization of the headlight 10L, 10R in the vehicle width direction as well as in the vehicle front-to-rear direction, and also in view of the prevention of dropping-off of the coupler 56.

The first opening section 46A can be defined by a front surface 38a of the first base section 38 (upper area 38a1), left and right walls 38c and 38d extending forward from respective right and left ends of the front surface 38a of the first base section 38, and a frame 38e connecting the upper ends of the left and right walls 38c and 38d.

When the coupler 56 including coupler-side terminals 60 for feeding a driving current to the semiconductor light emitting devices 32 is inserted from its upper side, the coupler-side terminals 60 and the semiconductor light emitting devices 32 (substrate-side terminals 34) can be electrically connected to each other. This can be achieved by positioning the first opening section 46A, which allows the coupler 56 to be inserted therethrough from its upper side, at a position where the coupler-side terminals 60 of the coupler 56 can be electrically connected to the substrate-side terminals 34 of the substrate 30.

This also can allow the headlights 10L and 10R to be reduced in size (in particular, the vehicle width direction and the vehicle front-to-rear direction). This is because the first opening section 465A opens upward through which the coupler 56 can be inserted from its upper side.

As illustrated in FIG. 13B, the front surface 38a of the first base section 38 can include an upper area 38a1 and a lower area 38a2 projected forward more than the upper area 38a1.

Figure 15A:
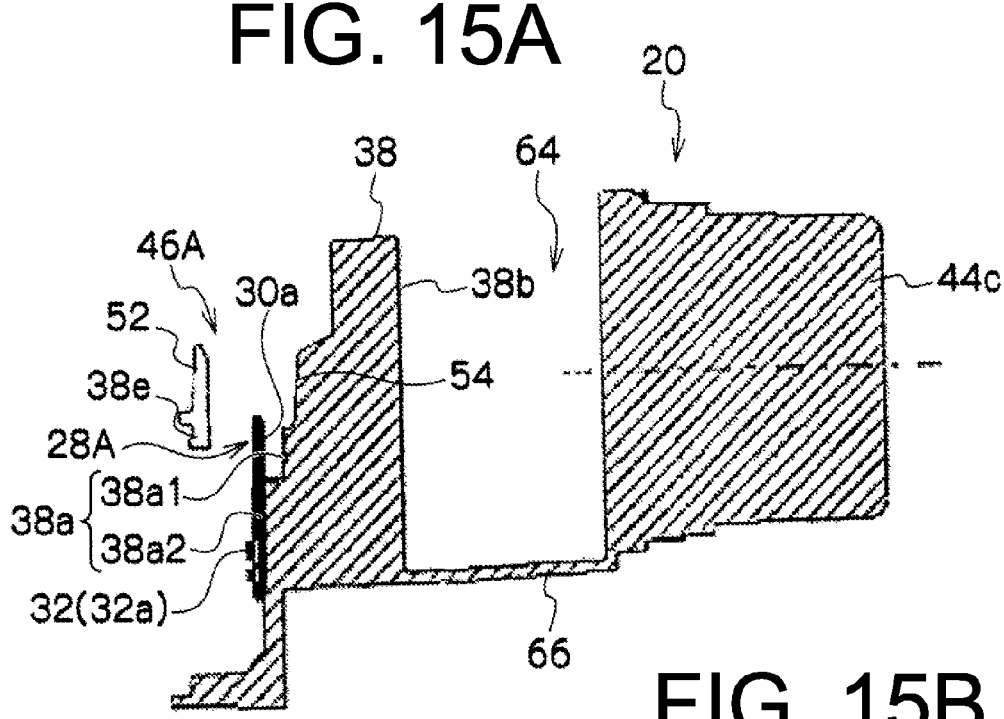
FIGS. 15A and 15B are a cross-sectional view of the heat sink (including the first light source 28A) taken along line B-B of FIG. 13A, and a cross-sectional view of the heat sink (including the first light source 28A and a coupler 56) taken along line B-B of FIG. 13A, respectively.
Figure 15B:
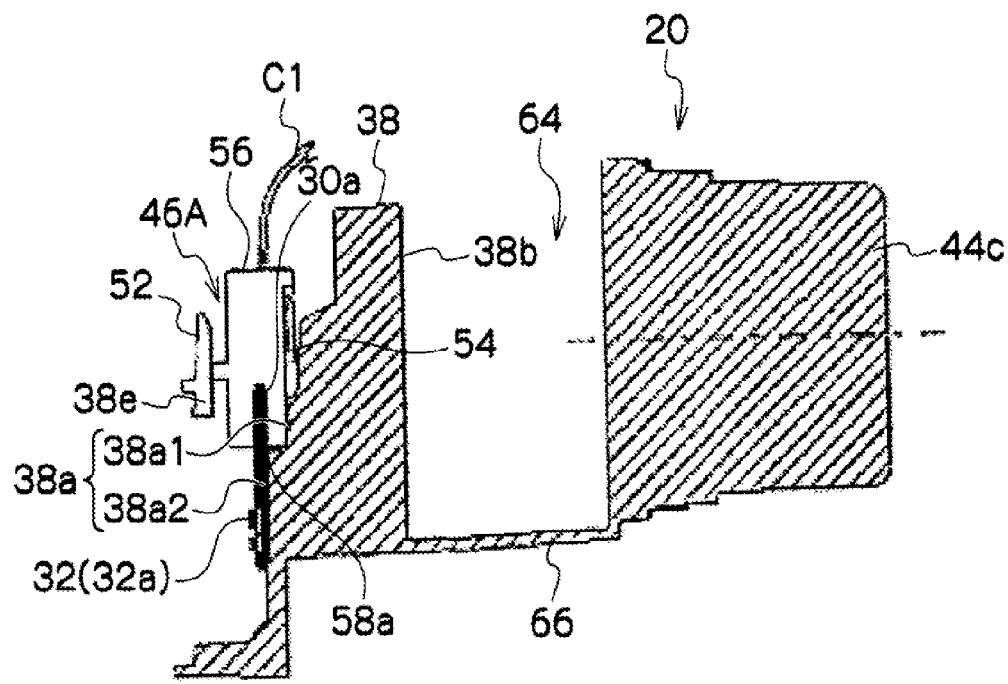

FIGS. 15A and 15B are a cross-sectional view of the heat sink of FIG. 13A (including the first light source 28A) taken along line B-B, and a cross-sectional view of the heat sink of FIG. 13A (including the first light source 28A and the coupler 56) taken along line B-B, respectively.

The lower area 38a2 can be a surface to which the first light source 28A can be secured. As illustrated in FIG. 15A, the first light source 28A can be screwed to the front surface 38a of the first base section 38 of the heat sink 20 such that the long side of the elongated light emission surface 32a is horizontally arranged, that the light emission surface 32a faces forward, that the rear surface of the substrate 30 and the front surface 38a (lower area 38a2) of the first base section 38 of the first base section 38 are in surface contact with each other, and that the upper portion 30a of the substrate 30 projects upward more than the upper edge of the lower area 38a.

As illustrated in FIG. 13, the front surface 38a of the first base section 38 can be made wider than the substrate 30 in the vehicle width direction, and the left and right sides thereof can extend forward to constitute the left and right walls 38c and 38d. The left and right walls 38c and 38d each can be formed as a vertical surface perpendicular to the front surface 38a of the first base section 38. The front upper ends of the left and right walls 38c and 38d can be connected to the frame 38e that extends in the vehicle width direction. The frame 38e can include a front surface 38e1 and a rear surface 38e2 opposite to the front surface 38e1. The front surface 38e1 and rear surface 38e2 each can be formed as a vertical surface perpendicular to the optical axis $AX_1$ that extends in the vehicle front-to-rear direction.

The frame 38e can be thin in the vertical direction and extend in the vehicle width direction. The frame 38e can be disposed at a position where the frame 38e is overlapped with the front surface 38a (upper area 38a1) of the first base section 38 when viewed from its front side (see FIG. 12B). The substrate 30 is not disposed at the center of the first opening section 46A but disposed at a position shifted rearward so as to prevent the coupler 56 from being erroneously inserted therethrough (see FIG. 15A).

As illustrated in FIGS. 12B and 14, guiding sections 52 and 54 can be formed around the first opening section 46A, for example, at the upper portions of the first base section 38 and the frame 38a. The guiding sections 52 and 54 can function to guide the coupler 56, which is to be inserted into the first opening section 46A, toward the first opening section 46A while the coupler 56 is in contact with the guiding sections 52 and 54 (sliding movement). Accordingly, the guiding sections 52 and 54 can include contact surfaces 52a and 54a with which the inserted coupler 56 can be in contact.

Figure 16:
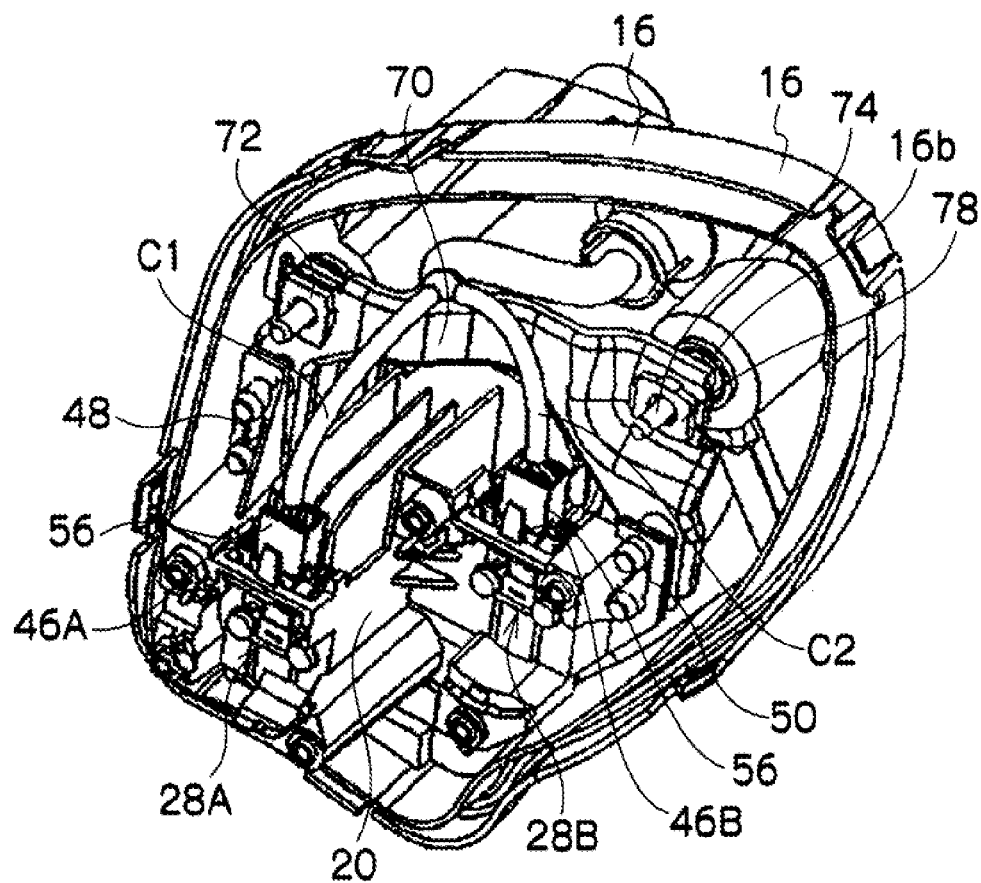

FIG. 16 is a perspective view of the headlight while omitting the outer lens, the first lens, the second lens, the extension and the like.

As illustrated in FIG. 15, the coupler 56 can be attached to the end of the power feeding cable C1 (C2). The base end of the power feeding cable C1 (C2) can be electrically connected to a power circuit (not shown) housed in a case 84 via a connector secured to the housing 16.

Figure 17:
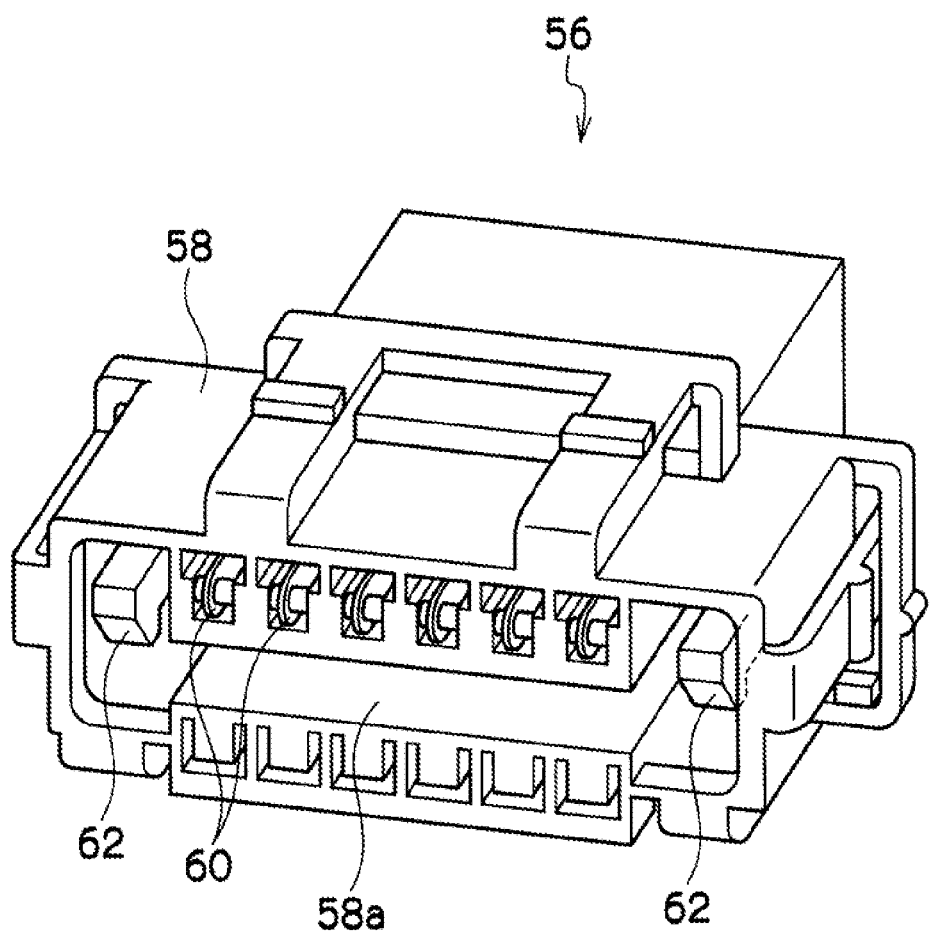
FIG. 17 is a perspective view of the coupler.

FIG. 17 is a perspective view of the coupler 56. As illustrated in FIGS. 15B and 17, the coupler 56 can include a coupler main body 58 having an opening section 58a through which the upper portion 30a of the substrate 30 is to be inserted. The coupler main body 58 can include the plurality of coupler-side terminals 60 to be electrically connected to the plurality of substrate-side terminals 34 mounted on the upper portion 30a of the substrate 30 when the substrate is inserted into the opening section 58a, and pawls 62 to be engaged with notches 30b formed on either side of the upper portion 30a of the substrate 30 (see FIG. 11).

Figure 18:
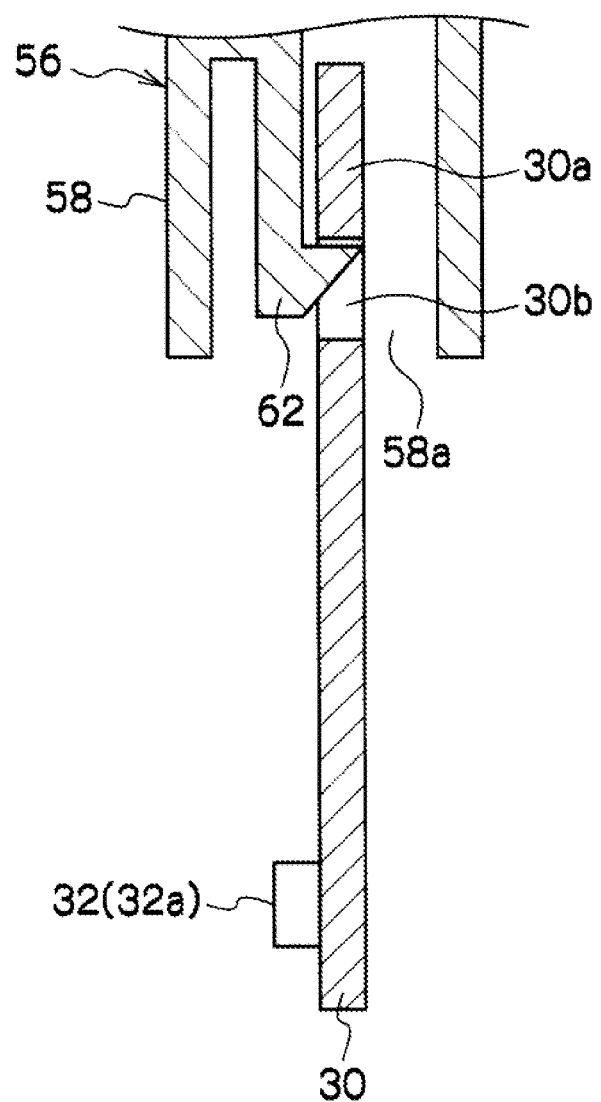
FIG. 18 is a cross-sectional view illustrating the engagement relation between the coupler and the first light source.

FIG. 18 is a cross-sectional view illustrating the engagement relation between the coupler and the first light source.

When the coupler 56 with the above configuration is inserted into the first opening section 46A from above while the posture of the coupler 56 is properly taken, as illustrated in FIGS. 15B and 18, the upper portion 30a of the substrate 30 can be inserted into the opening section 58a of the coupler 56. Then, the pawls 62 provided inside the coupler 56 can be engaged with the notches 30b formed at either side of the upper portion 30a of the substrate 30, so that the coupler-side terminals 60 are electrically connected to the substrate-side terminals 34. This configuration can prevent the coupler 56 inserted into the first opening section 46A from above from dropping off from the first opening section 46A and can maintain the electrically connected state therebetween. Namely, this configuration can serve as a dropping-off prevention means.

As illustrated in FIG. 12A, the second base section 40 can include a front surface 40a and a rear surface 40b opposite to the front surface 40a. These front and rear surfaces 40a and 40b can be formed as a vertical surface perpendicular to an optical axis $AX_2$ extending in the front-to-rear direction of the vehicle body.

As illustrated in FIGS. 12 and 13A, the second opening section 46B can be provided to the front surface 40a of the second base section 40.

As illustrated in FIG. 13B, the second opening section 46B can open while facing upward so that the coupler 56 (see FIGS. 16 and 17) attached to the power feeding cable C2 can be inserted not from the side, front, and rear sides, but from the upper side in view of the miniaturization of the headlight 10L, 10R in the vehicle width direction as well as in the vehicle front-to-rear direction, and also in view of the prevention of dropping-off of the coupler 56.

The second opening section 46B can be configured similarly to the configuration of the first opening section 46A, and accordingly, the same portions/sections are denoted by the same reference numerals and the description thereof will not be repeated.

As illustrated in FIG. 12A, the third base section 42 can include a front surface 42a and a rear surface 42b opposite to the front surface 42a. These front and rear surfaces 42a and 42b can be formed as a vertical surface perpendicular to an optical axis $AX_1$ extending in the front-to-rear direction of the vehicle body. The front surface 42a can include a portion facing to the first base section 38 and a portion facing to the second base section 40.

As illustrated in FIGS. 12 and 13A, the plurality of heat dissipation fins 44a can be arranged in the vehicle width direction at predetermined intervals so that the first base section 38 (rear surface 38b), the second base section 40 (rear surface 40b), and the third base section 42 (front surface 42a) are connected thereby. Accordingly, the first base section 38, the second base section 40, the third base section 42, and the plurality of heat dissipation fins 44a can define a plurality of tubular sections 64. The lower end openings of the plurality of tubular sections 64 can be closed by the bottom surface 66. This can enhance the strength of the plurality of heat dissipation fins 44a. Specifically, the plurality of heat dissipation fins 44a are connected by the first base section 38 and/or the second base section 40 and the third base section 42 to define at least single tubular section 64 and the lower end opening of the tubular section 64 is closed by the bottom surface 66, thereby enhancing the strength of the heat dissipation fins 44a.

Furthermore, the heat generated by the semiconductor light emitting devices 32 can be effectively dissipated, thereby facilitating the cooling. This is because the closure of the lower end opening of the tubular section 64 by the bottom surface 66 can increase the heat dissipation path.

This configuration can also provide advantageous effects as follows. When a molten aluminum alloy is supplied to the cavity defined by the combined molds to mold the heat sink 20, the molten aluminum alloy can be spread into every corner of the cavity (not shown). As a result, the heat sink 20 can be molded to have a designed shape. This is because the cavity portion corresponding to that closed by the bottom surface 66 can serve as a passage through which the molten aluminum alloy can pass, of which advantageous effects have been confirmed by the present inventors.

The plurality of heat dissipation fins 44b can be arranged on the rear surface 40b of the second base section 40 at predetermined intervals in the vehicle width direction so as to extend rearward. The plurality of heat dissipation fins 44c can be arranged on the rear surface 42b of the third base section 42 at predetermined intervals in the vehicle width direction so as to extend rearward.

The heat sink 20 with the above configuration can dissipate heat generated from the semiconductor light emitting devices 32 more effectively for cooling. This is because, as the heat sink 20 is formed as an integrated molded component while including the first base section 38, the second base section 40, the third base section 42, and the plurality of heat dissipation fins 44a, there is no gap between the conventional respective components (for example, between the heat sink 270 (heat dissipation fin) and the seat section 230 in the conventional headlight), thereby preventing the contact thermal resistance caused by such a gap from occurring.

According to the heat sink 20 with the above configuration, the reduction of the number of components, the steps of assembly, and the improvement in assembly accuracy can be achieved. This can be achieved by the integral molding of the components (including the first base section 38, the second base section 40, the third base section 42, the respective opening sections 46A and 46B, and the plurality of heat dissipation fins 44a to 44c) not as plural components but as a single integrated component.

Figure 19:
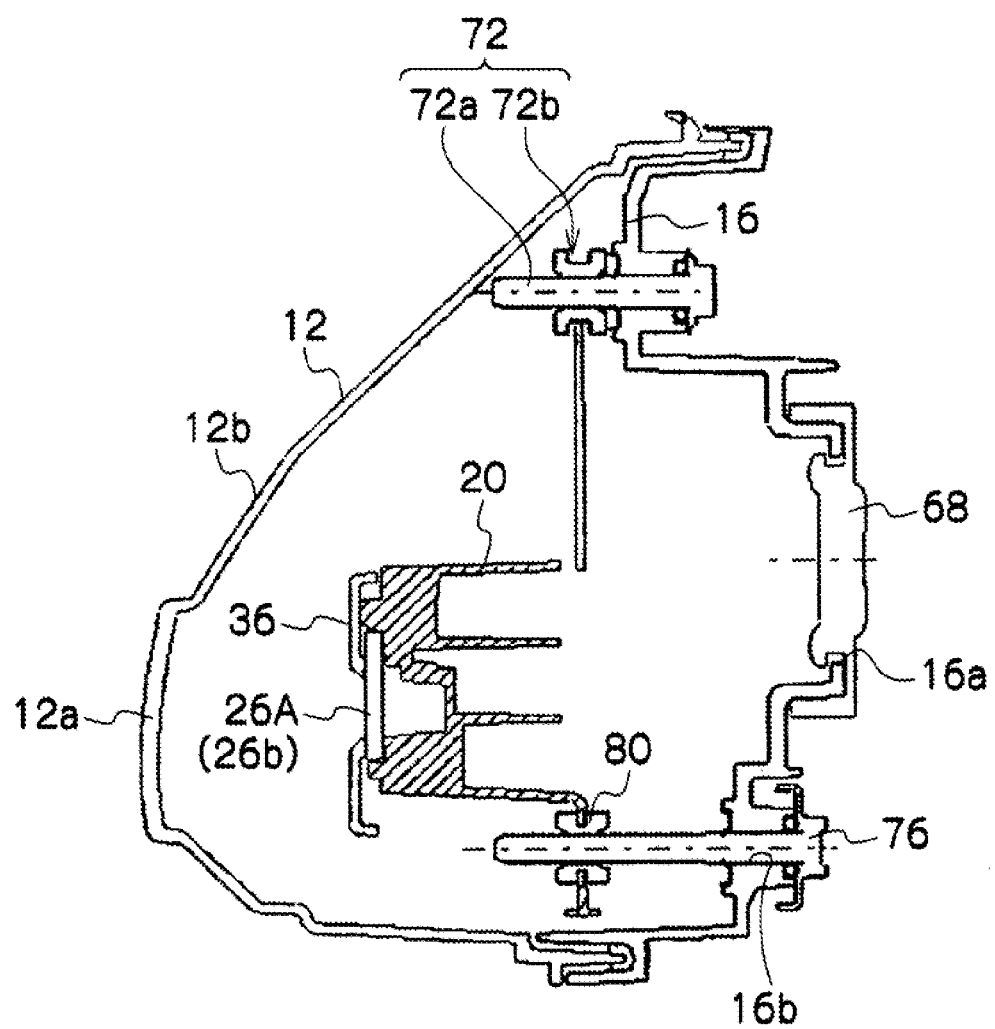
FIG. 19 is a cross-sectional view of the headlight taken along line C-C of FIG. 4.

The heat sink 20 with the above configuration can be supported by the housing 16 via the aiming mechanism 22 interposed therebetween such that the heat sink 20 can be inclined as illustrated in FIGS. 10 and 19 in such a state that, as illustrated in FIGS. 7 and 8, at least the first base section 38 and the second base section 40 are disposed inside the lighting chamber 14, the third base section 42 can cover the opening 16a formed in the housing 16, and the plurality of heat dissipation fins 44c can protrude through the opening 16a to the outside of the lighting chamber 14. FIG. 19 is a cross-sectional view of the headlight of FIG. 4 taken along line C-C.

Accordingly, the heat generated by the semiconductor light emitting devices 32 can be dissipated efficiently for cooling. This is because at least part of the heat sink (the plurality of heat dissipation fins 44c) protrudes through the opening 16a formed in the housing 16 outward.

As illustrated in FIGS. 10 and 19, the aiming mechanism 22 can include: a frame 70 extending in the vehicle width direction above the heat sink 20 so as to connect the pair of flange sections 48 and 50 of the heat sink 20 at its left and right ends; a connecting section 72 configured to connect one end of the frame 70 to the housing 16 such that the one end of the frame 70 can become a fulcrum point when the heat sink 20 is inclined, the connecting section 72 being configured by an aiming screw 72a and a nut 72b, for example; and a first aiming screw 74 and a second aiming screw 76 configured to adjust an optical axis.

The first aiming screw 74 can be screwed to a first nut 78 via a first through hole 16b formed in the housing 16. Here, the first nut 78 can be attached to the other end of the frame 70. The second aiming screw 76 can be screwed to a second nut 80 via a second through hole 16c formed in the housing 16. Here, the second nut 80 can be attached to the heat sink positioned below the connecting section 72.

Accordingly, the connecting section 72 configured to serve as a fulcrum point during inclination movement and the first nut 78 to which the first aiming screw 74 is screwed are not attached to the heat sink 20, but to the frame 70. This configuration can achieve the miniaturization of the headlight for a motorcycle.

Figure 24A:
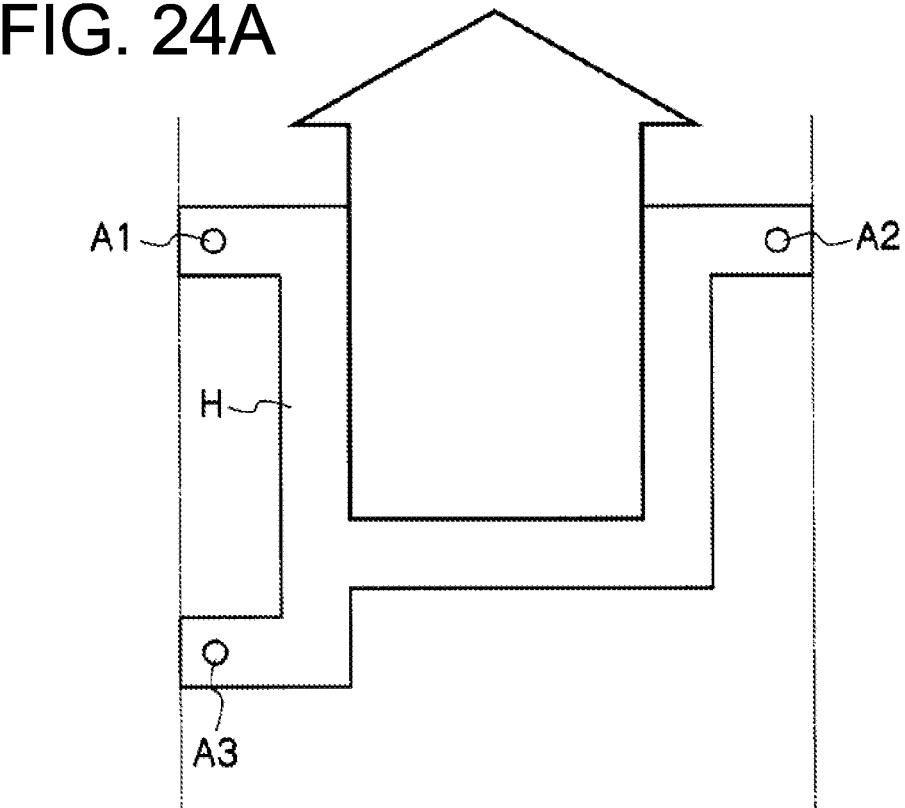
FIGS. 24A and 24B are a front view illustrating a problem and/or characteristic arising when the heat sink is molded by feeding a molten aluminum alloy into a cavity defined by a composite mold including a vertically drawn mold, and a front view illustrating the modification for addressing characteristics and/or solving problems illustrated in FIG. 24A, respectively.

Specifically, when the heat sink 20 is molded by injecting a molten aluminum alloy into a cavity defined by a combination of molds including a mold with a mold withdrawn direction being vertical (see the arrow in FIG. 24A), the portion that becomes a fulcrum point during inclination movement (reference symbol A1 in FIG. 24A) and the portions where a nut to which an aiming screw is screwed is attached (reference symbols A2 and A3 in FIG. 24A) are designed to project outward due to the mold withdrawn direction. Thus, this may prevent the miniaturization of a headlight for a motorcycle.

Figure 24B:
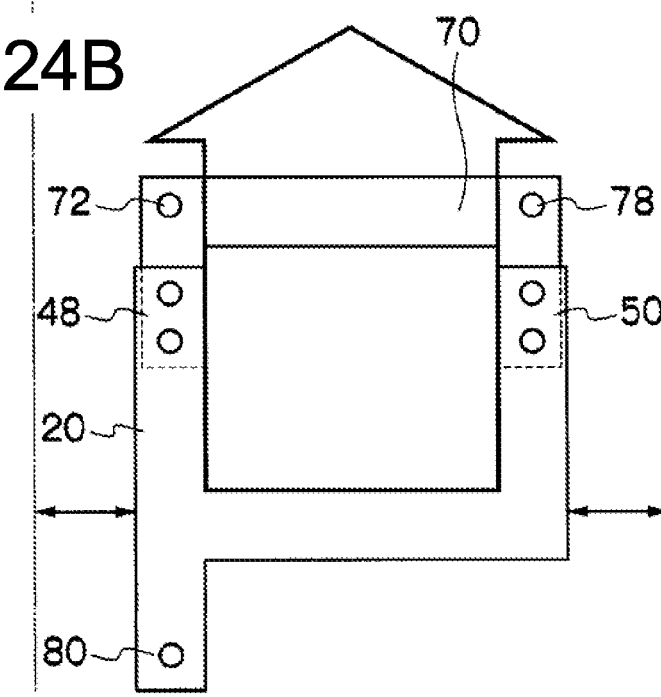

Contrary to this, the present exemplary embodiment can be configured such that the frame 70, as a separate component from the heat sink 20, can extend in the vehicle direction and connect the pair of flange sections 48 and 50. Therefore, as illustrated in FIGS. 10 and 24B, the connecting section 72 configured to serve as a fulcrum point during inclination movement and the first nut 78 to which the first aiming screw 74 is screwed are not attached to the heat sink 20 but to the frame 70. As a result, as illustrated in FIG. 24B, the connecting section 72 configured to serve as a fulcrum point during inclination movement and the portions where nuts 78 and 80 to which the respective aiming screws 74 and 76 are screwed are attached are not configured to project outward. Accordingly, the miniaturization of a headlight for a motorcycle can be achieved.

Furthermore, the pair of flanges 48 and 50 of the heat sink 20 are connected by means of the frame 70, and accordingly, the strength of the heat sink 20 can be enhanced.

As illustrated in FIGS. 7 to 9, the gap S2 between the opening 16a formed in the housing 16 and the plurality of heat dissipation fins 44c projected through the opening 16a can be covered with a stretchable cover 68 (or waterproof rubber cover). The cover 68 can be fit to the heat dissipation fins 44c (and/or the third base section 42) at its inner peripheral portion and to the rim of the opening 16a of the housing 16 at its outer peripheral portion.

The screwing amounts of the aiming screws 74 and 76 to the respective nuts 78 and 80 can be adjusted to collectively adjust the optical axes of the low-beam optical system 18A and the high-beam optical system 18B housed in the lighting chamber 14. This can be achieved because the low-beam optical system 18A and the high-beam optical system 18B are attached to the heat sink 20 and the aiming mechanism 22 is provided to support the heat sink 20 to which the low-beam optical system 18A and the high-beam optical system 18B are attached such that the heat sink 20 can be inclined with respect to the housing 16.

In addition, the cover 68 can prevent moisture and dusts from entering the gap S2 between the opening 16a formed in the housing 16 and part of the heat sink 20 projected through the opening 16a outward (the plurality of heat dissipation fins 44c) into the lighting chamber 14. In particular, even if the gap S2 between the opening 16a formed in the housing 16 and part of the heat sink 20 projected through the opening 16a outward is changed in shape due to the inclination movement of the heat sink 20, the entering of moisture and dusts through the gap S2 into the lighting chamber 14 can be surely prevented. This can be achieved by the stretchable single cover 68 (for example, rubber cover) covering the gap S2 between the opening 16a formed in the housing 16 and part of the heat sink 20 projected through the opening 16a outward while the stretchable single cover 68 can follow the shape change of the gap S2.

Figure 20:
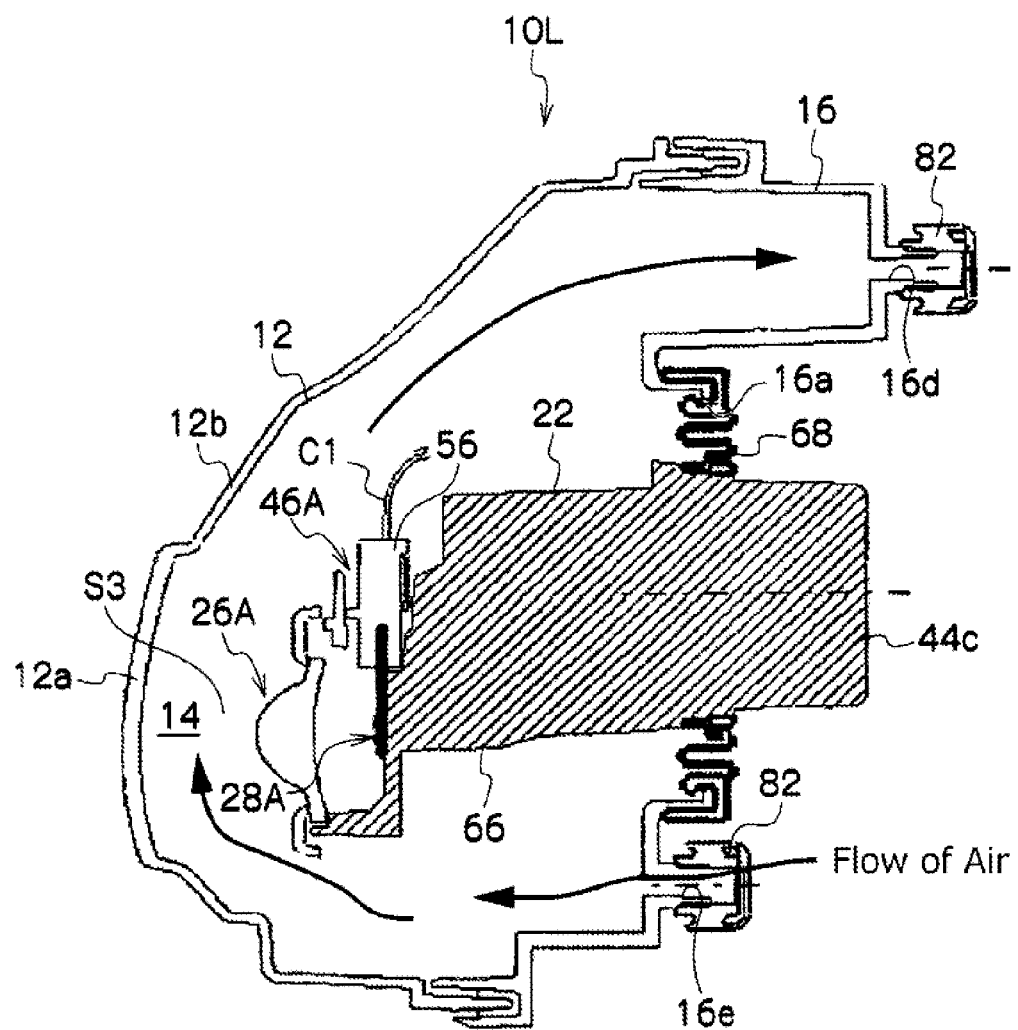
FIG. 20 is a cross-sectional view of the headlight taken along line D-D of FIG. 4.

FIG. 20 is a cross-sectional view of the headlight of FIG. 4 taken along line D-D.

As illustrated in FIG. 20, ventilation holes 16d and 16e passing through the lighting chamber 14 can be formed at vertically separated two locations in the rear surface of the housing 16. Each of the ventilation holes 16d and 16e can be tightly covered by a ventilation cap 82 (see FIG. 9).

The ventilation cap 82 can include a labyrinthine air passage to communicate with the ventilation hole 16d, 16e and/or a ventilation filter, thereby realizing a ventilation effect inside the lighting chamber 14 as well as preventing moisture from entering the lighting chamber 14. Examples of such a ventilation cap 82 may include those described in Japanese Patent Application Laid-Open Nos. 2010-170751 and 2011-181220. The lower ventilation hole 16e can be formed below the bottom surface 66 in the vertical direction (see FIG. 20).

The provision of the ventilation holes 16d and 16e can facilitate the cooling of the low-beam optical system 18A and the high-beam optical system 18B (in particular, the resin-made first and second lenses 26A and 26B). This can be achieved by generating convection flow wherein part of outside air entering through the lower ventilation hole 16e can be directed along the bottom surface 66 to the space S3 between the outer lens 12 and the low-beam optical system 18A (and the high-beam optical system 18B) due to the action of the bottom surface 66 closing the lower opening of the tubular section 64, ascend and pass through the space S3, and then exit through the upper ventilation hole 16d to the outside of the lighting chamber 14, as illustrated in FIG. 20.

Figure 25:
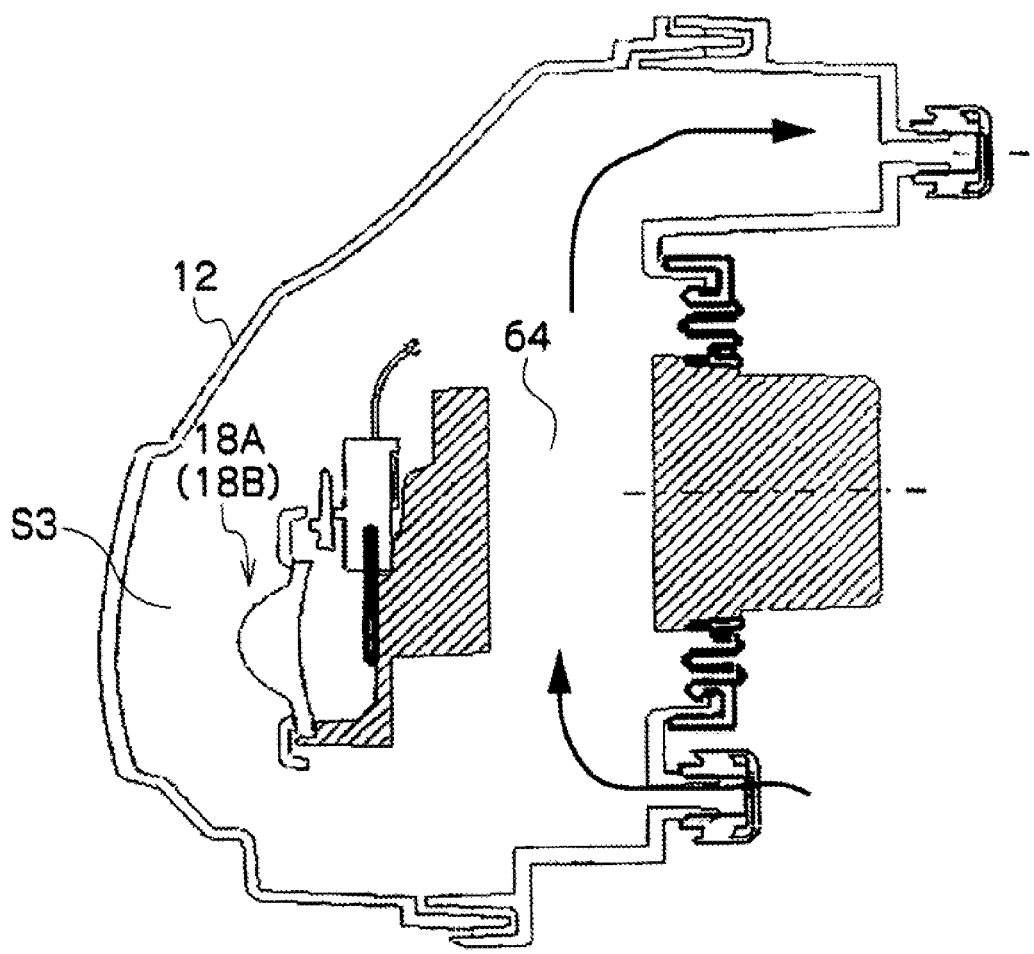
FIG. 25 is a diagram illustrating a problem and/or characteristic when lower end openings of a plurality of tubular portions are not closed by a bottom surface.

If the lower opening of each of the plurality of tubular sections 64 is not closed by the bottom surface 66, as illustrated in FIG. 25, any convection flow directed to the space S3 between the outer-lens 12 and the low-beam optical system 18A (the high-beam optical system 18B) is not generated, meaning that it is difficult to effectively cool the low-beam optical system 18A and the high-beam optical system 18B (in particular, the resin-made first and second lenses 26A and 26B).

Figure 21:
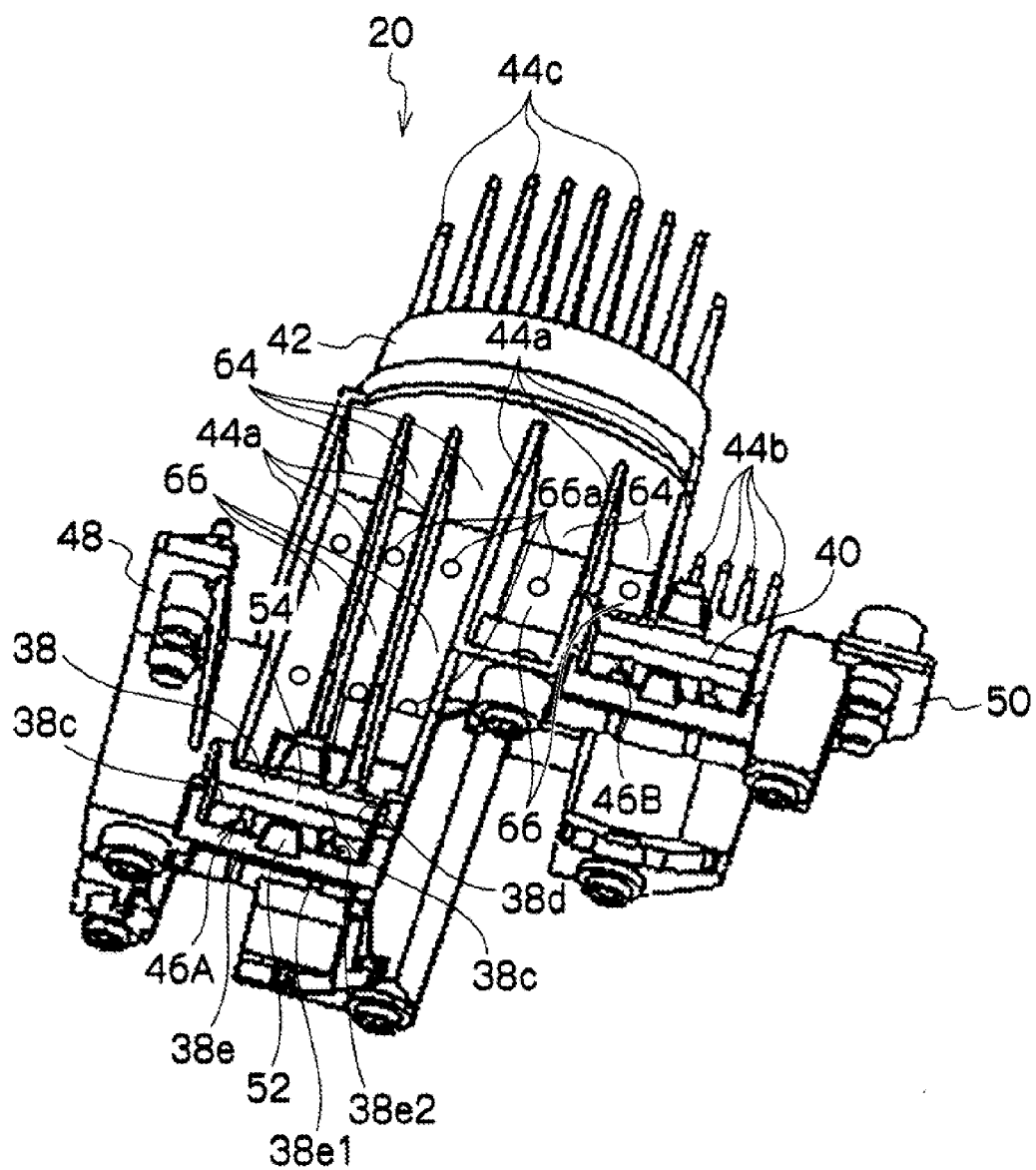
FIG. 21 is a perspective view of a modification of the heat sink.
Figure 22:
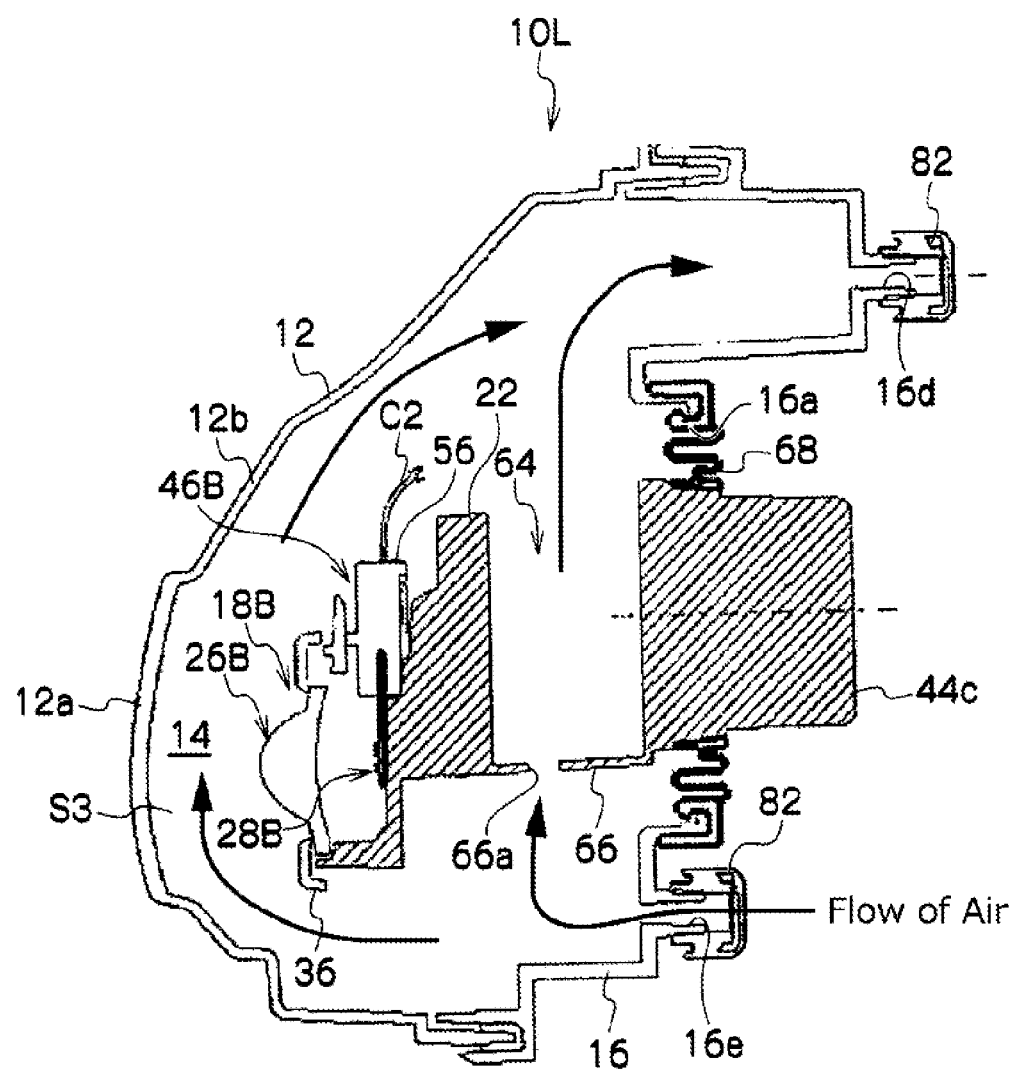
FIG. 22 is a cross-sectional view of the headlight (modification) taken along line D-D of FIG. 4.

Note that, as illustrated in FIGS. 21 and 22, there is at least one ventilation hole 66a passing through the bottom surface 66 in the vertical direction.

As illustrated in FIG. 22, part of outside air entering the lighting chamber 14 through the lower ventilation hole 16e can be directed by the action of the at least one ventilation hole 66a formed in the bottom surface 66 to pass the ventilation hole 66a and ascend inside the tubular section 64 (chimney effect) and exit through the upper ventilation hole 16d to the outside of the lighting chamber 14 so as to generate convection flow thereinside. Accordingly, the heat generated by the semiconductor light emitting devices 32 can be dissipated for cooling more efficiently.

Figure 23:
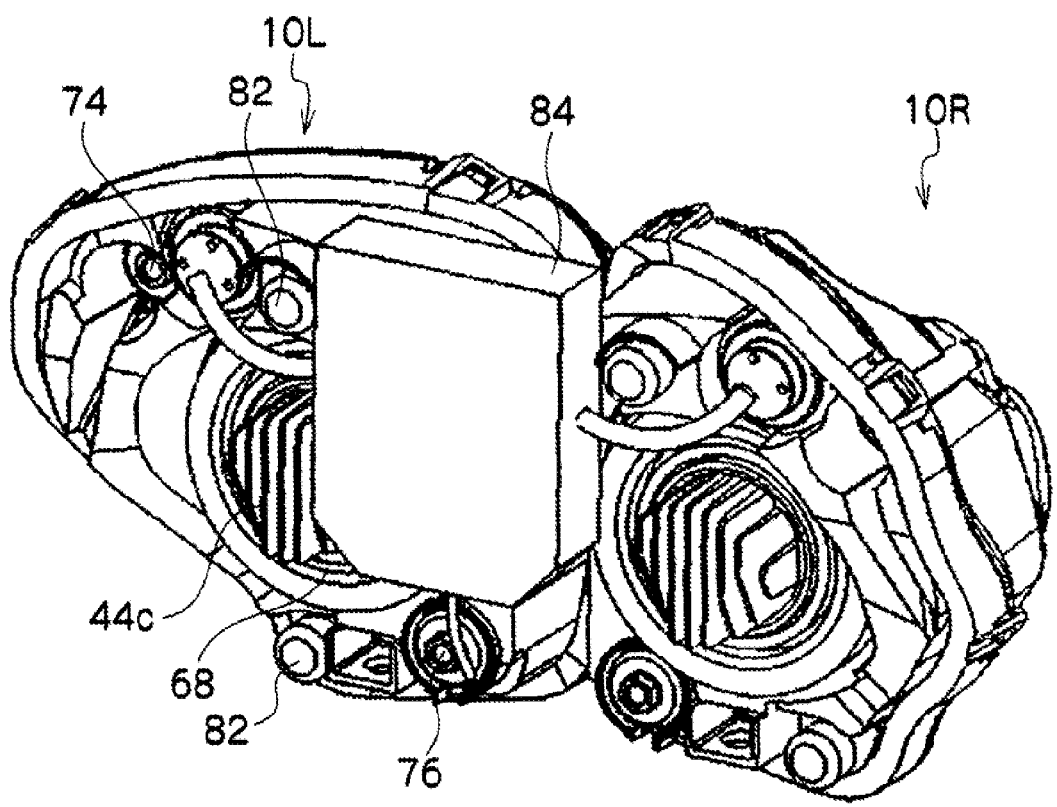
FIG. 23 is a rear-side perspective view of the headlight.
Figure 28:
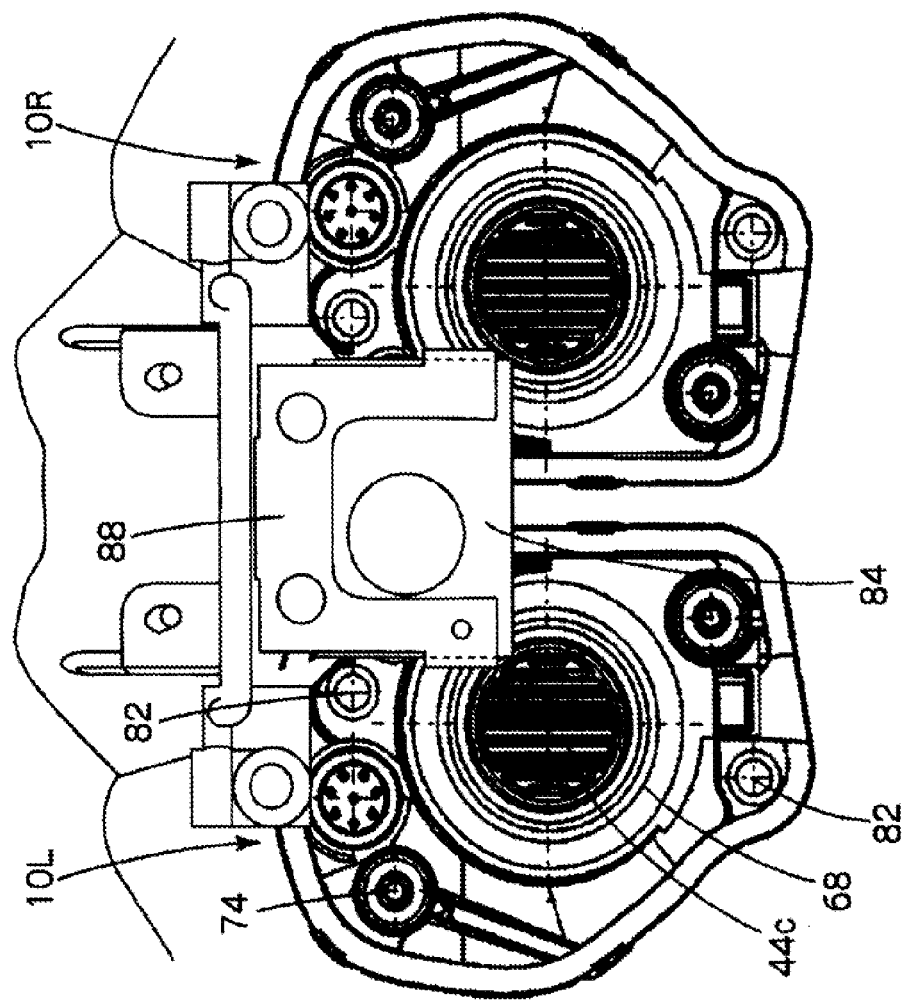
FIG. 28 is a rear side view of the headlight.

FIG. 23 is a rear-side perspective view of the headlight (with a stay 88 omitted) and FIG. 28 is a rear side view of the headlight (with the stay 88).

As illustrated in FIGS. 7, 8, 23, and 28, the case 84 housing the not-shown power circuit can be provided between the left headlight 10L and the right headlight 10R and behind the housing 16. The case 84 can serve as a common casing containing a power source circuit electrically connected to the first and second light sources 28A and 28B (semiconductor light emitting devices) disposed in the left lighting chamber 14 and configured to supply a driving current to the first and second light sources 28A and 28B (semiconductor light emitting devices), and a power source circuit electrically connected to the first and second light sources 28A and 28B (semiconductor light emitting devices) disposed in the right lighting chamber 14 and configured to supply a driving current to the first and second light sources 28A and 28B (semiconductor light emitting devices).

The case 84 can be formed from a resin and disposed between the left headlight 10L and the right headlight 10R and behind the housing 16 (see FIGS. 7 and 23) such that the travelling air introduced through the passage S1 formed between the extension portion 12b of the outer lens 12 and the cowling 24 (see the arrow in FIG. 8) can flow along the common case 84 and be directed to the plurality of heat dissipation fins 44c.

With this configuration, the travelling air can forcedly cool the plurality of heat dissipation fins 44c controlled by the common case 84, thereby facilitating the dissipation of heat generated by the semiconductor light emitting devices 32 more effectively.

Furthermore, with this configuration, the miniaturization of the headlights 10R and 10L can be realized. In conventional vehicle headlight, such as those disclosed in Japanese Patent Application Laid-Open No. 2004-276739, the power circuits are provided to left and right lighting chambers separately, meaning that two components should be provided to respective sites. On the contrary, the above configuration can realize the common case 84 housing these power circuits in a single site. This configuration can also reduce the number of required components as well as the steps of assembly.

Note that the common case 84 can be secured by interposing it between a vehicle body (body frame or front folk) and the housing 16 while the case 84 can be held by a stay 88 fixed to the housing 16 as in the structure illustrated in FIG. 28.

Next, a description will be given of the high-beam optical system 18B (18B1) in detail. FIGS. 29A, 29B, 29C, and 29D are a cross-sectional view of the high-beam optical system 18B1 taken along line A1-A1 of FIG. 29B, a front view, a perspective view, and a cross-sectional view of the optical system 18B1 for high-beam taken along line B1-B1 of FIG. 29B, respectively.

The high-beam optical system 18B1 can be a so-called direct projection type optical system, and as shown in FIGS. 29A to 29D, can include a second lens 26B1, a second light source 28B, and the like.

The second lens 26B 1 can be formed from a transparent resin and include a lens section 26a1 and a flange section 26b1 disposed on the periphery of the lens section 26a1.

The lens section 26a1 of the second lens 26B1 (corresponding to the projection lens in the presently disclosed subject matter) can be disposed on an optical axis $AX_2$ extending in the vehicle front-to-rear direction, and include a light emitting surface 90a1, a light incident surface 90b1 on which light to be projected through the light emitting surface 90a1 can be incident, and a reference point $F_1$ optically designed to be disposed in front of the light incident surface 90b1.

The second light source 28B can be disposed substantially at (i.e., at or near) the reference point $F_1$, and can emit white light that can be incident on the light incident surface 90b1 to enter the second lens 26B1 and projected forward through the light emitting surface 90a1.

Figure 30A:
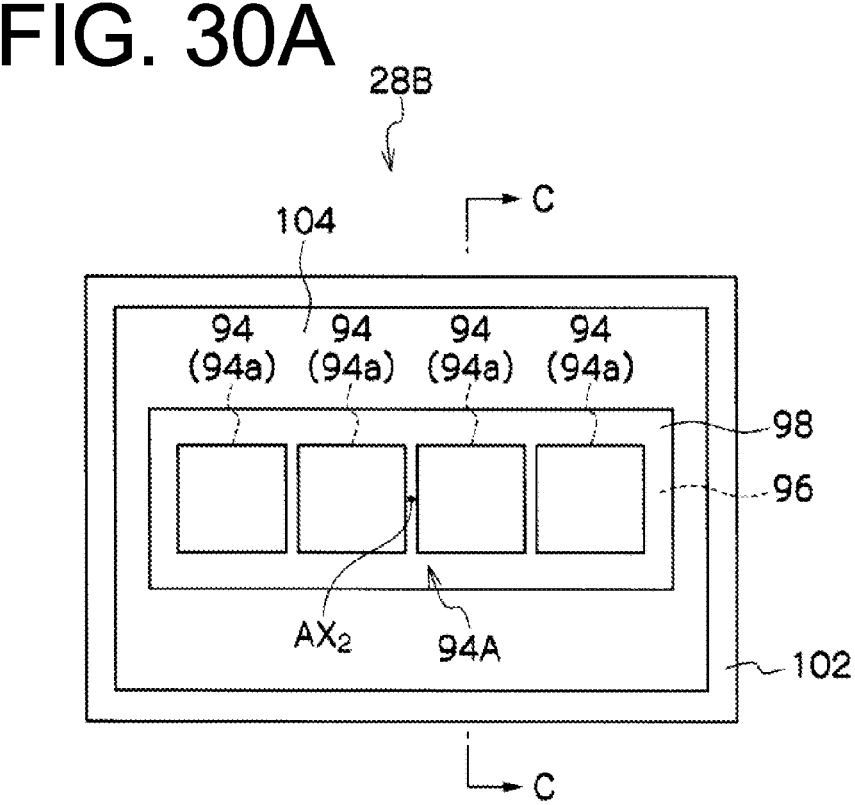
FIGS. 30A and 30B are a front view of a second light source 28B and a cross-sectional view of the second light source 28B taken along line C-C of FIG. 30A, respectively.
Figure 30B:
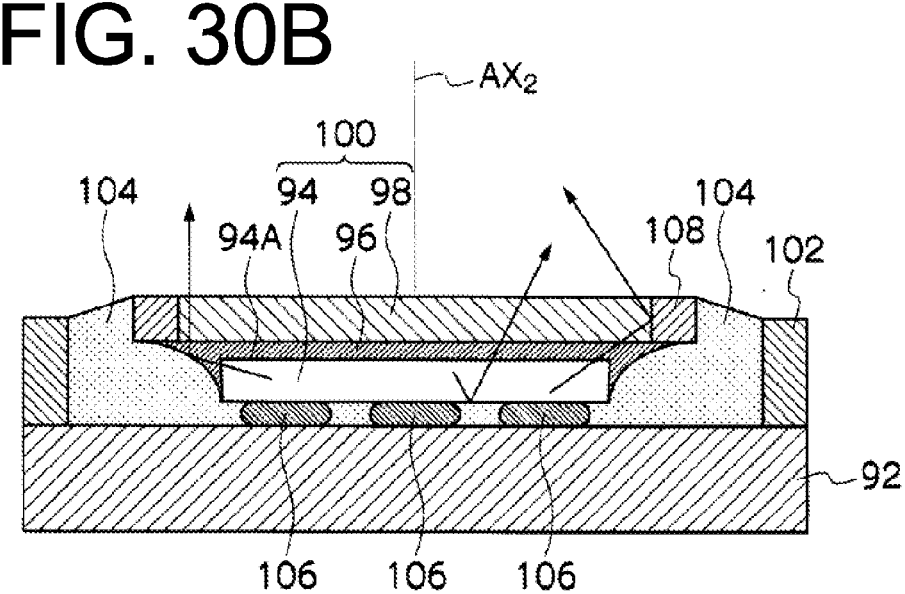

The second light source 28B can emit white light by color mixture of at least blue light (the first color light) and yellow light (the second color light). Specifically, as illustrated in FIGS. 30A and 30B, the second light source 28B can be configured by combining semiconductor light emitting devices 94 and a light-transmitting member 96 covering the semiconductor light emitting devices 94, and may include those described in Japanese Patent Application Laid-Open Nos. 2012-134355, 2011-204376, and 2010-93208, for example. Another example of the second light source 28B can be configured by color mixture of complementary color lights such as a combination of light blue light and pink light.

FIGS. 30A and 30B are a front view of a second light source 28B and a cross-sectional view of the second light source 28B taken along line C-C of FIG. 30A, respectively.

As illustrated in FIGS. 30A and 30B, the second light source 28B can include, for example, a substrate 92, a plurality of semiconductor light emitting devices 94 mounted on the surface of the substrate 92, a light-transmitting member 96 covering the plurality of semiconductor light emitting devices 94 (light emission surfaces 94a), a transparent plate 98 configured to cover the light-transmitting member 96 (top surface), a frame 102 configured to surround a structure body 100 including the semiconductor light emitting devices 94, the light-transmitting member 96, and the transparent plate 98 and secured to the surface of the substrate 92, a high reflectance member 104 filled in the space surrounded by the surface of the substrate 92 and the frame 102, and the like.

Reference numeral 106 in FIG. 30B denotes bumps configured to electrically connect the semiconductor light emitting devices 94 to a wiring pattern (not shown) on the surface of the substrate 92, and reference numeral 108 denotes a frame configured to support the peripheral of the transparent plate 98.

The plurality of semiconductor light emitting devices 94 can be blue LEDs (for example four light emitting diodes (or laser diodes) each having 1 mm side square light emission surface 94a), and can be mounted on the surface of the ceramic or metal substrate 92 in line at predetermined intervals so as to configure an elongated rectangular light emission surface 94A (for example, a light emission section with a size of 0.92 mm×4.52 mm) (see FIG. 30A). The number of semiconductor light emitting elements 94 is not limited to four, but may be one or more. The optical axis $AX_2$ extending the vehicle front-to-rear direction can pass through the second light source 28B (for example, the center of the elongated light emission surface 94A) and extend in the normal direction of the light emission surface 94A.

The light-transmitting member 96 can absorb at least part of the light (such as blue light) from the semiconductor light emitting devices 94 and convert the same to light with another color (such as yellow light, and can be a YAG phosphor emitting yellow light. The light-transmitting member 96 can be disposed between the semiconductor light emitting devices 94 (elongated rectangular light emission surface 94A) and the transparent plate 98 (lower surface) and have a substantially uniform thickness.

The transparent plate 98 can be a transparent plate made of glass, quartz, or the like inorganic material.

The high reflectance member 104 can be a white resin containing alumina or titania with a high concentration, and can be formed by filing a space defined by the substrate 92 surface and the frame 102 with a white resin to cover the side surface of the structure body 100. This configuration can improve the light extraction efficiency. This is because the high reflectance member 104 covering the side surface of the structure body 100 can reflect the light directed to the side surface of the structure body 100 to cause the light to be incident on the light-transmitting member 96 again. As a result, when compared with the case where the side surface of the structure body 100 is not covered with a high reflectance member 104, the configuration of the presently disclosed subject matter can improve the light extraction efficiency more.

Note that if the improvement of the light extraction efficiency cannot be provided due to some reason, the high reflectance member 104 can be omitted as well as the transparent plate 98 can be omitted.

The second light source 28B can be screwed to the heat sink 20 with screws or the like means such that the longer side of the elongated rectangular light emission surface 94A is directed horizontally, the light emission surface 94A faces forward (toward the light incident surface 90b1 of the second lens 26B1), and the center (or vicinity) of the light emission surface 94A is made coincident with the reference point $F_1$ of the second lens 26B 1.

In the second light source 28B with the above configuration, the light-transmitting member 96 having received blue light from the semiconductor light emitting devices 94 can emit white light by color mixture of part of the original blue light passing through the light-transmitting member 96 and yellow light emitted by a YAG phosphor, for example, as a result of excitation by blue light. The white light can pass through the transparent plate 98 and be extracted outside.

The present inventor has confirmed that in the second light source 28B with the above configuration the ratio of the amount of the blue light component in the white light directed toward the optical axis $AX_2$ is relatively large while the white light directed in the direction inclined by a larger angle with respect to the optical axis $AX_2$ contains the blue light component with smaller ratio and the yellow light component with larger ratio.

Figure 31:
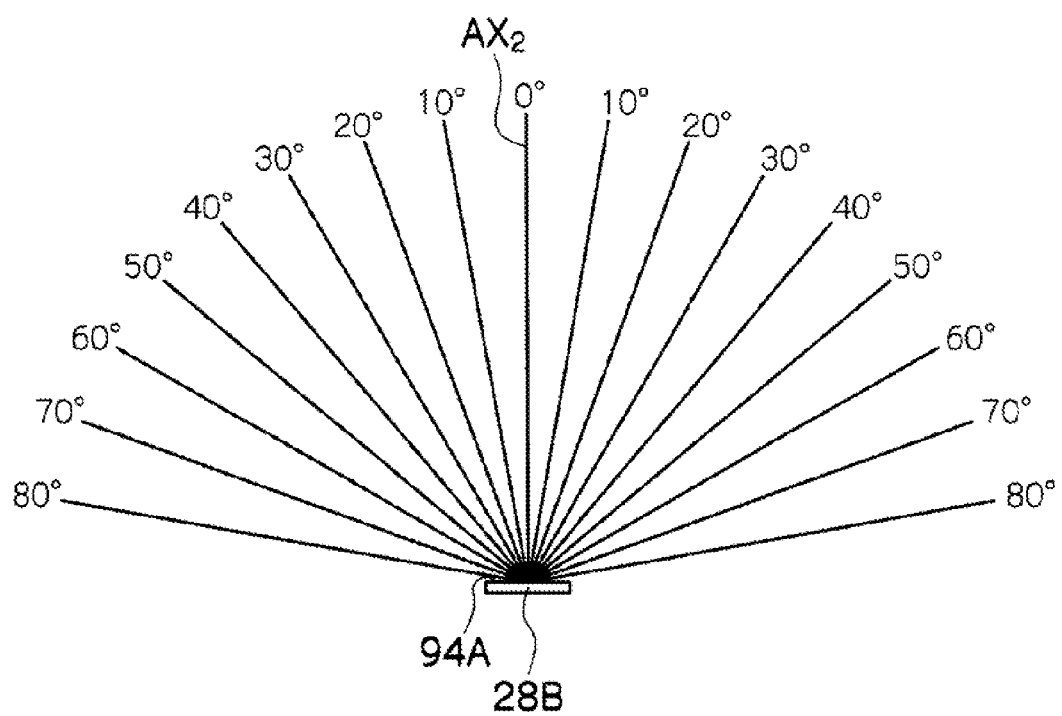
FIG. 31 is a diagram illustrating the measuring direction of chromaticity of the second light source 28B (measured with an increment of 10 degrees while 0 (zero) degrees is assumed to be the optical axis $AX_2$)

FIG. 31 is a diagram illustrating the measuring direction of chromaticity of the second light source 28B (measured with an increment of 10 degrees while 0 (zero) degrees is assumed to be the optical axis $AX_2$).

Figure 32A:
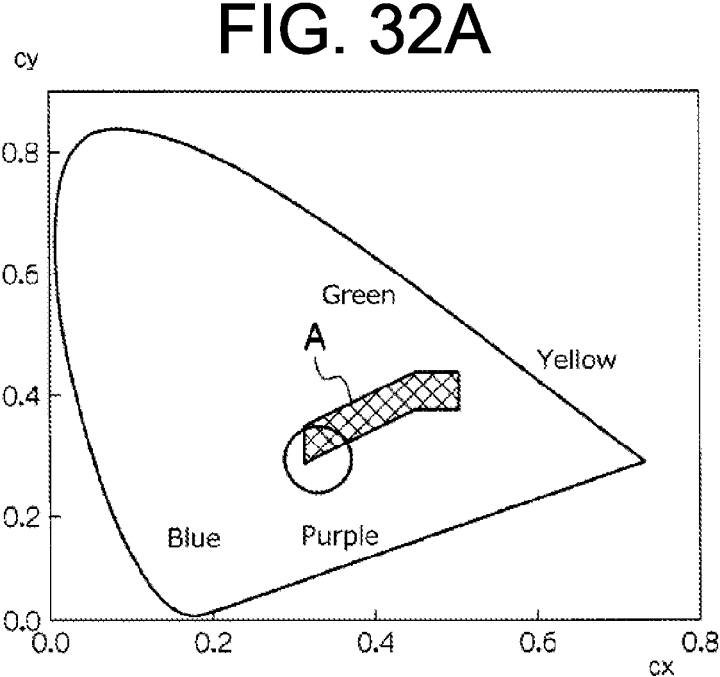
FIGS. 32A and 32B are a diagram illustrating the white area A under the provision of law (JIS D5500) on an xy chromaticity diagram, and a diagram showing the measured results of chromaticity of the second light source 28B for every predetermined angle plotted on the xy chromaticity diagram, respectively.
Figure 32B:
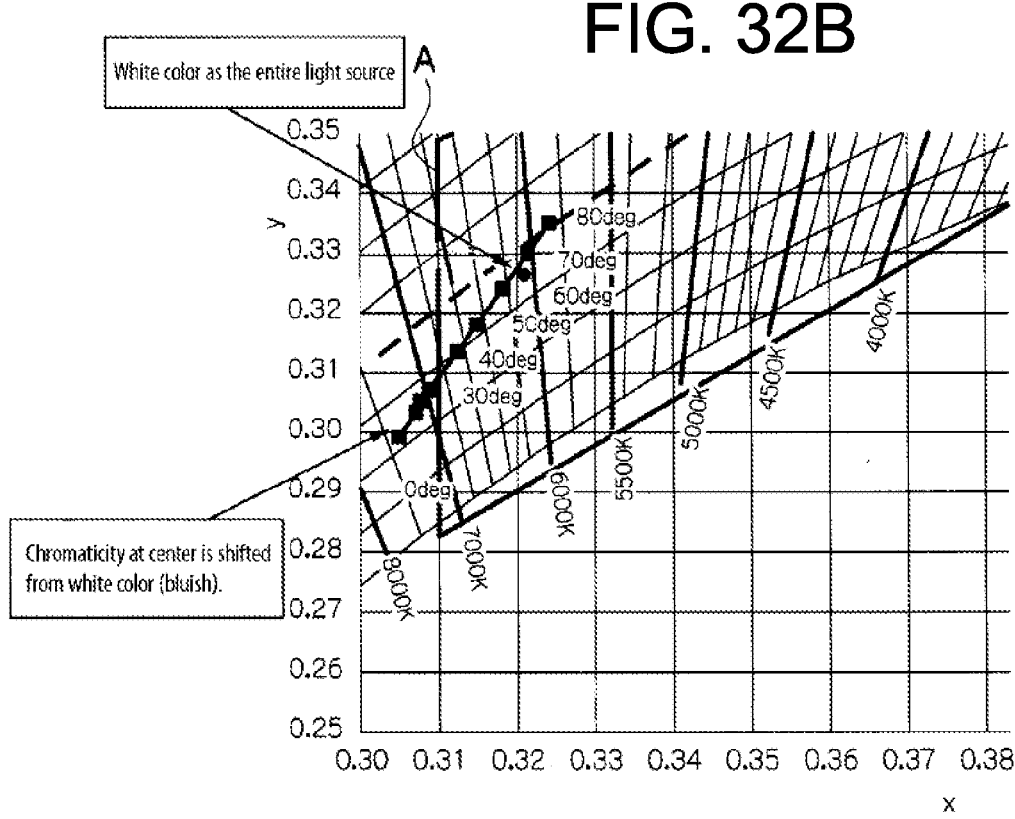

FIGS. 32A and 32B are a diagram illustrating the white area A under the provision of law (JIS D5500) on an xy chromaticity diagram, and a diagram showing the measured results of chromaticity of the second light source 28B for every predetermined angle plotted on the xy chromaticity diagram, respectively. Note that FIG. 32B is an enlarged diagram of the encircled area in the xy chromaticity diagram in FIG. 32A.

The white area A under the provision of law (JIS D5500) illustrated in FIG. 32A can be represented by the following expressions:

$0.500 \geq x \geq 0.310$ $y \leq 0.150 + 0.640 \cdot x$ $y \geq 0.050 + 0.750 \cdot x$ $0.440 \geq y \geq 0.382$ With reference to FIG. 32B, the chromaticity of the entire second light source 28B as measured using an integrating sphere falls within the white area A (as represented by solid large circles in FIG. 32B), but the chromaticity of white light directed in the directions with an angle range of 0 degrees to 30 degrees with respect to the optical axis $AX_2$ contains a relatively large amount of blue light component and thus partly falls outside the white area A (refer to solid squares in FIG. 32B).

This may be because of the following reason. In the second light source 28B configured to include the combination of the semiconductor light emitting devices 94 and the light-transmitting member 96 (see FIG. 30B), the blue light emitted from the semiconductor light emitting devices 94 and directed in the optical axis $AX_2$ may travel a shorter distance through the light-transmitting member 96 when compared with the blue light directed in an oblique direction by larger angles with respect to the optical axis $AX_2$. As a result, the blue light may not be sufficiently absorbed by the light-transmitting member 96, and not converted to yellow light.

Therefore, in the second light source 28B with the above configuration, the ratio of the amount of the blue light component in the white light directed toward the optical axis $AX_2$ is relatively large while the white light directed in the direction inclined by a larger angle with respect to the optical axis $AX_2$ contains the blue light component with smaller ratio and the yellow light component with larger ratio. As a result, the following problem or characteristic may arise.

Figure 33:
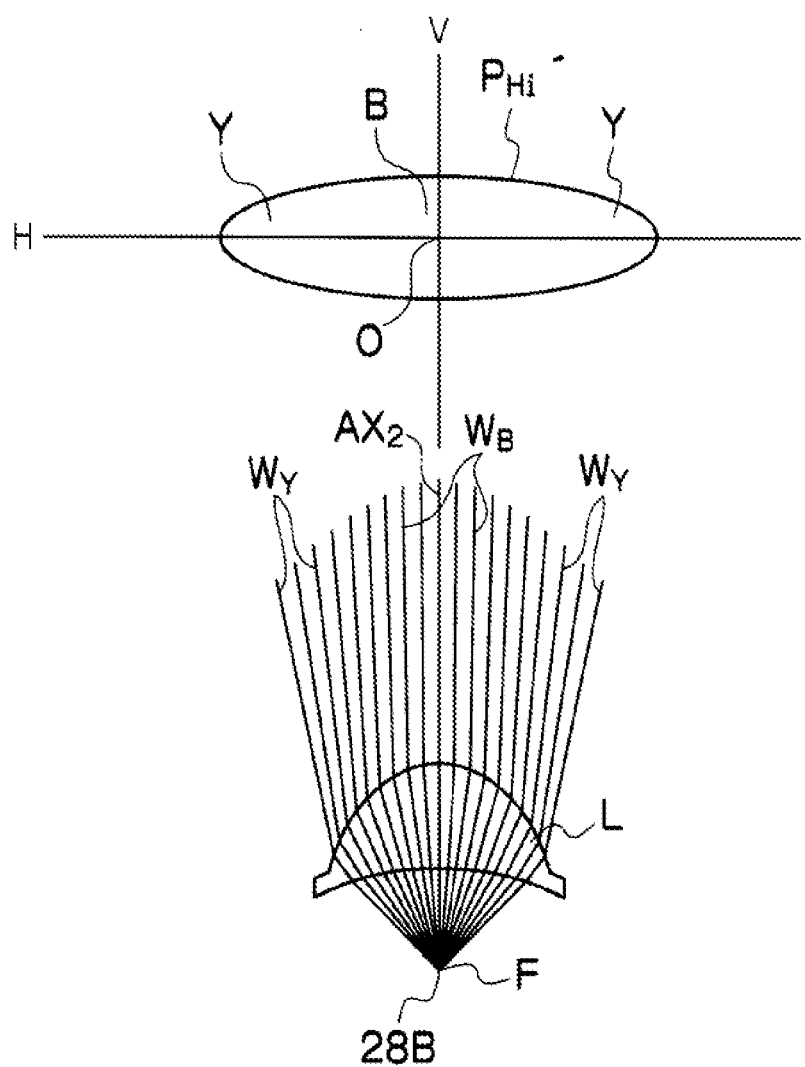
FIG. 33 is a diagram illustrating the problem and/or characteristic arising when the second light source 28B is disposed near an optical origin point F of a light-distribution controlling lens L that is designed such that the light $W_B$ near the optical axis $AX_2$ can mainly form part of the light distribution pattern with high illuminance and the light $W_Y$ directed obliquely with respect to the optical axis $AX_2$ by a certain larger angle can mainly form part of the light distribution pattern with a wider area extending in the horizontal direction.

FIG. 33 is a diagram illustrating the problem or characteristic arising when the second light source 28B is disposed near an optical origin point F of a light-distribution controlling lens L that is designed such that the light $W_B$ near the optical axis $AX_2$ can mainly form part of the light distribution pattern with high illuminance and the light $W_Y$ directed obliquely with respect to the optical axis $AX_2$ by a certain larger angle can mainly form part of the light distribution pattern with a wider area extending in the horizontal direction.

Figure 34A:
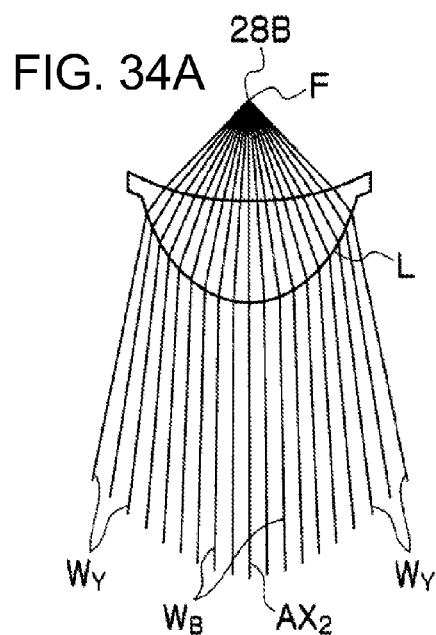
FIGS. 34A, 34B, 34C, and 34D are a cross-sectional view of the light distribution controlling lens L taken along line D-D of FIG. 34B, a front view, a perspective view, and a cross-sectional view of the light distribution controlling lens taken along line E-E of FIG. 34B, respectively.
Figure 34B:
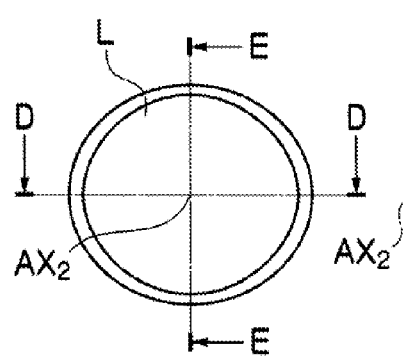
Figure 34C:
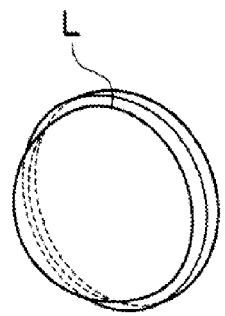
Figure 34D:
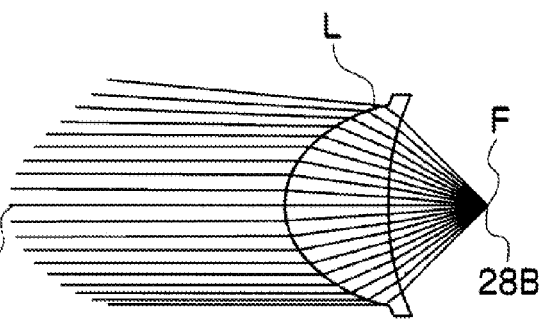
Figure 35:
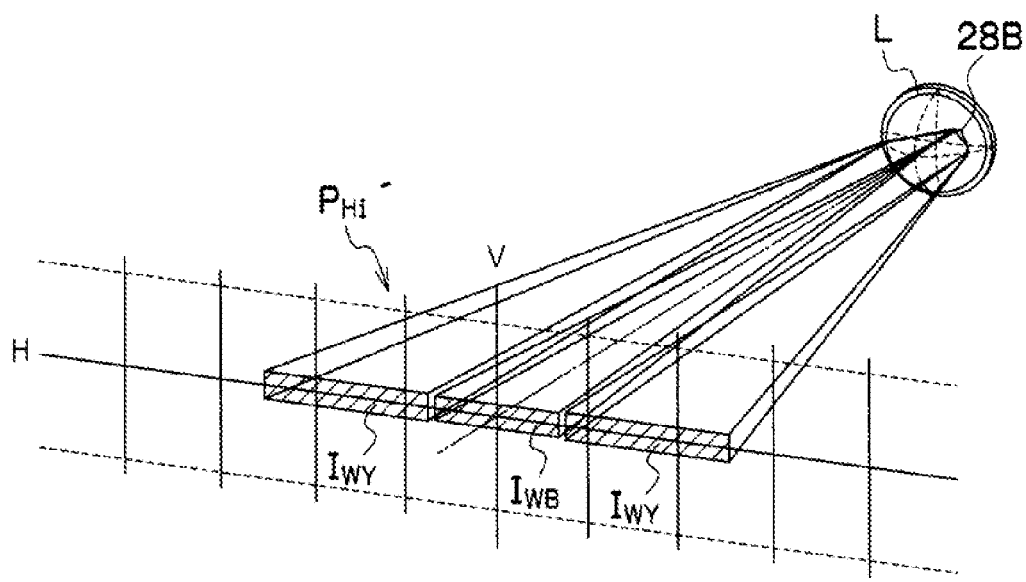
FIG. 35 is a diagram illustrating a high-beam light distribution pattern $P_{Hi}$' by use of a light source image $I_{WB}$ (the light source image by white light $W_B$ directed in the direction of the optical axis $AX_2$) and a light source image $I_{WY}$ (the light source image by white light $W_Y$ directed in the oblique direction with respect to the optical axis $AX_2$ by a certain larger angle) of the second light source 28B.

FIGS. 34A, 34B, 34C, and 34D are a cross-sectional view of the light distribution controlling lens L of FIG. 34B taken along line D-D, a front view, a perspective view, and a cross-sectional view of the light distribution controlling lens of FIG. 34B taken along line E-E. When the second light source 28B is disposed substantially at (i.e., at or near) the optical origin point F of the light distribution controlling lens L designed as described above, the direct light from the second light source 28B passing through the light distribution controlling lens L and projected forward can form the high-beam light distribution pattern $P_{Hi}'$. In this configuration, the high-beam light distribution pattern $P_{Hi}'$ can be a light distribution pattern with color unevenness composed of bluish color B near the crossing point O of the horizontal line H and the vertical line V and yellowish color Y near the horizontal ends. As illustrated in FIG. 35, the high-beam light distribution pattern $P_{Hi}'$ can be represented by use of a light source image $I_{WB}$ (the light source image by white light $W_B$ from the second light source 28B directed in the direction of the optical axis $AX_2$) and a light source image $I_{WY}$ (the light source image by white light $W_Y$ from the second light source 28B directed in the oblique direction with respect to the optical axis $AX_2$ by a certain larger angle) of the second light source 28B. As a result, there arises a problem or characteristic in that the chromaticity of the high-beam light distribution pattern $P_{Hi}'$ partly falls outside the white area A as determined under the law (for example, JIS D5500) (see FIG. 32B).

In order to adjust the entire chromaticity of the high-beam light distribution pattern to fall within the white area A, the light incident surface 90b1 of the second lens 26B1 of the present exemplary embodiment can be designed as follows. Note that the second lens 26B 1 of the present exemplary embodiment can be a lens designed to be a projection lens with both convex surfaces as a basic lens design while the light emitting surface 90a1 can be a convex surface similar to that of a common plano-convex projection lens.

Figure 29A:
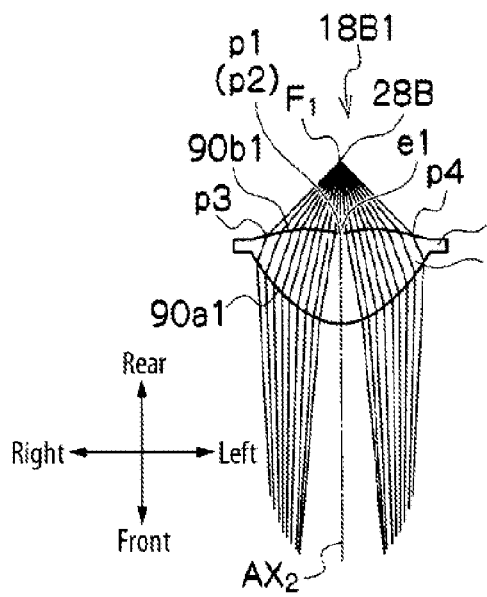
FIGS. 29A, 29B, 29C, and 29D are a cross-sectional view of an optical system 18B1 for high-beam taken along line A1-A1 of FIG. 29B, a front view, a perspective view, and a cross-sectional view of the optical system 18B1 for high-beam taken along line B1-B1 of FIG. 29B, respectively.
Figure 29C:
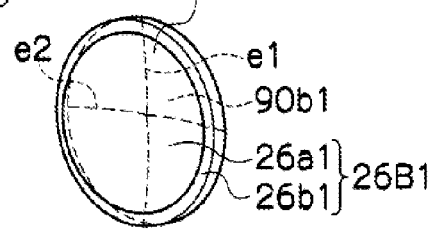
Figure 29B:
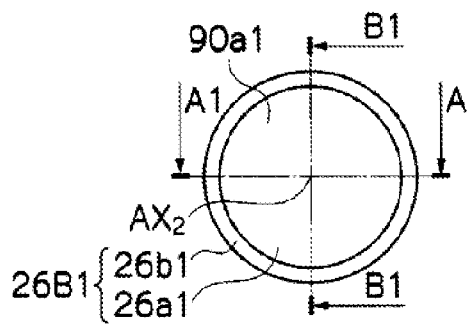

A description will now be given of the horizontal cross section of the light incident surface 90b1. As illustrated in FIGS. 29A and 29C, the light incident surface 90b1 can include a left optical control surface and a right optical control surface while including a portion where the left and right optical control surfaces cross on the optical axis $A_{X2}$. That portion is denoted by a recessed edge e1. In FIG. 29C, the edge e1 can extend from the upper portion of the light incident surface 90b1 to the lower portion while passing through the center of the light incident surface 90b1. The edge e1 can appear when the light incident surface 90b1 is designed as follows.

Specifically, the light incident surface 90b1 of the second lens 26B1 (the horizontal cross section of the light incident surface 90b1) is designed in the following manner.

As illustrated in FIG. 29A, the right portion of the light incident surface 90b1 on the right side with respect to the vertical plane including the optical axis $AX_2$ can have a horizontal cross section designed to control the light emitted from the reference point $F_1$ and directed in a 0° (zero degrees) direction with respect to the optical axis $AX_2$ (in the optical axis direction $AX_2$ or forward) to the direction rightward by 10° with respect to the optical axis $AX_2$ and also control the light emitted from the reference point $F_1$ and directed in directions ranging from the 0° (zero degrees) direction to a 45 degrees rightward direction to the directions rightward by 10° to 0° direction as the light emission direction is gradually changed from 0° to 45° rightward.

Similarly, the left portion of the light incident surface 90b1 on the left side with respect to the vertical plane including the optical axis $AX_2$ can have a horizontal cross section designed to control the light emitted from the reference point $F_1$ and directed in a 0° (zero degrees) direction with respect to the optical axis $AX_2$ (in the optical axis direction $AX_2$ or forward) to the direction leftward by 10° with respect to the optical axis $AX_2$ and also control the light emitted from the reference point $F_1$ and directed in directions ranging from the 0° (zero degrees) direction to a 45 degrees leftward direction to the directions leftward by 10° to 0° direction as the light emission direction is gradually changed from 0° to 45° leftward.

Figure 36:
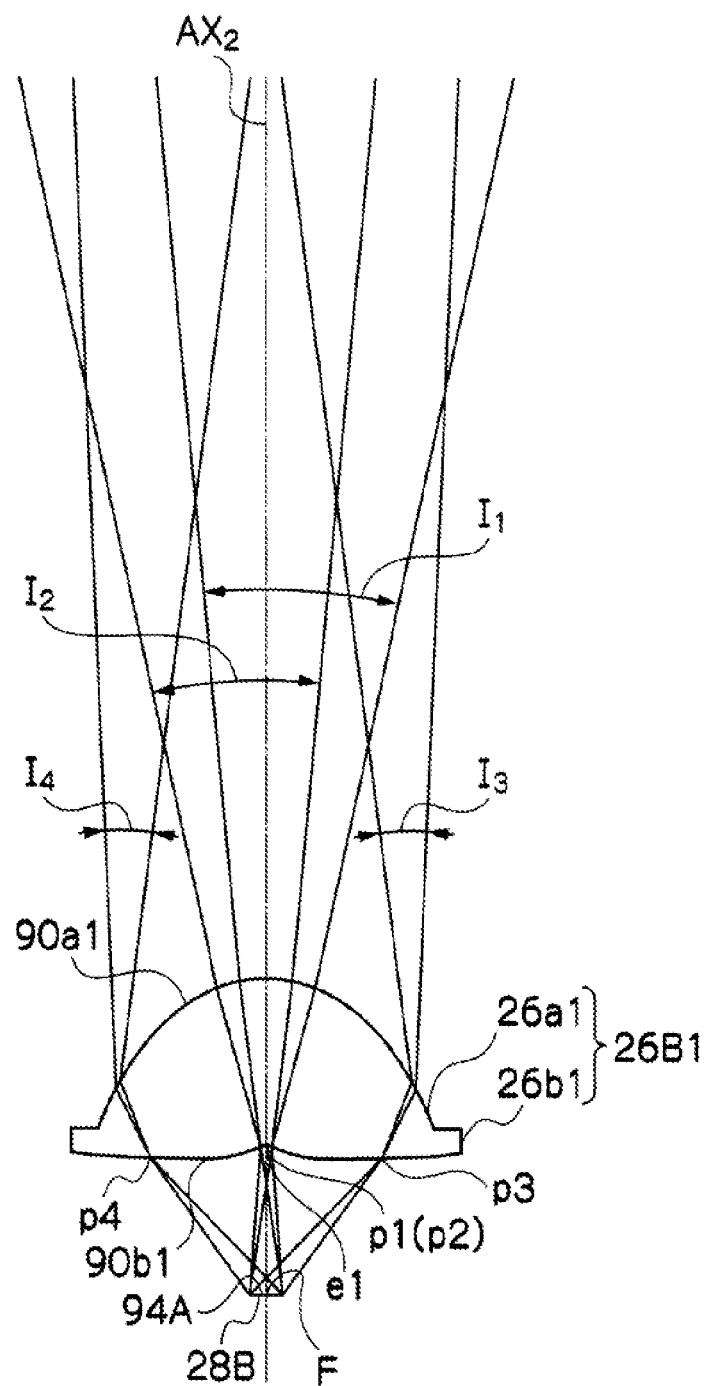
FIG. 36 is a diagram illustrating the optical path of actual light (light source image) emitted from the second light source 26B (from the horizontally elongated light emission surface 94A thereof)
Figure 37:
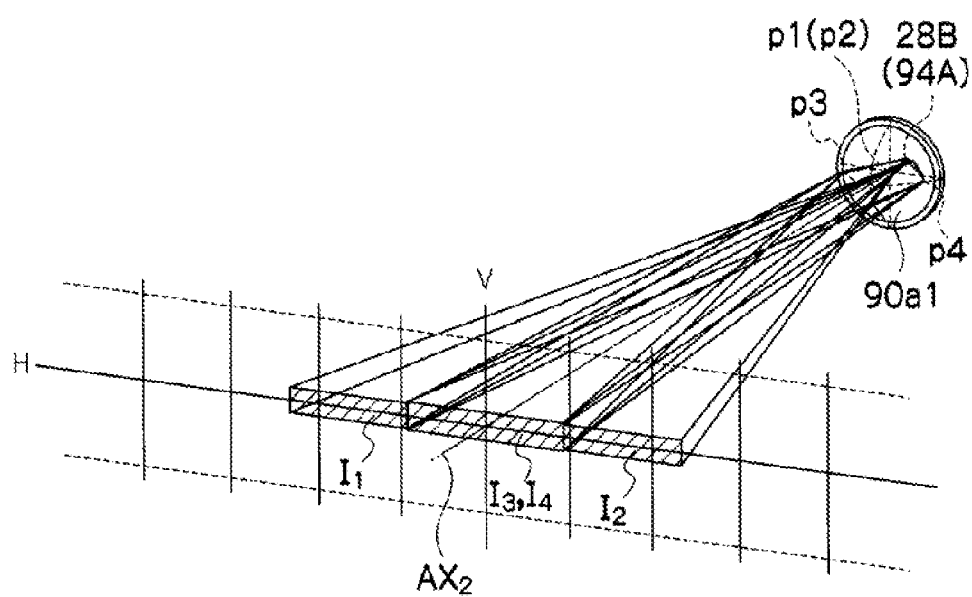
FIG. 37 is a diagram illustrating a high-beam light distribution pattern Phi by use of light source images $I_1$, $I_2$, $I_3$, and $I_4$ of the second light source 28B.
Figure 38A:
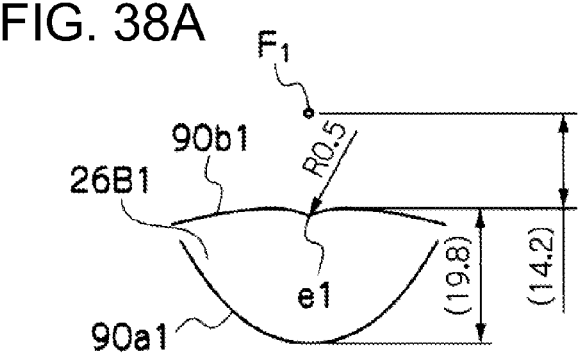
FIGS. 38A, 38B, and 38C are a cross-sectional view of a second lens 26B1 taken along line F-F of FIG. 38B (also showing its size), a front view (also showing its size), and a cross-sectional view of the second lens 26B1 taken along line G-G of FIG. 38B (also showing its size), respectively.
Figure 38B:
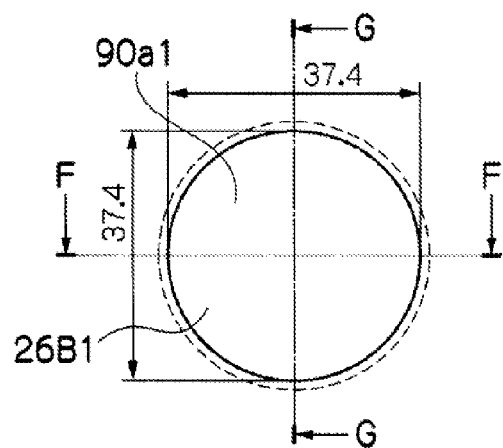
Figure 38C:
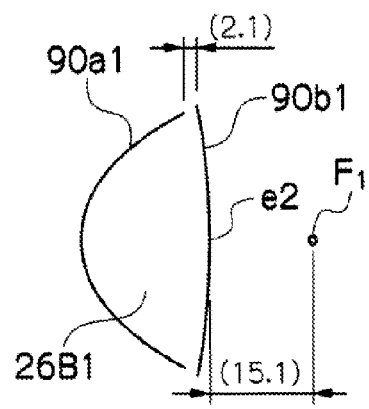
Figure 39A:
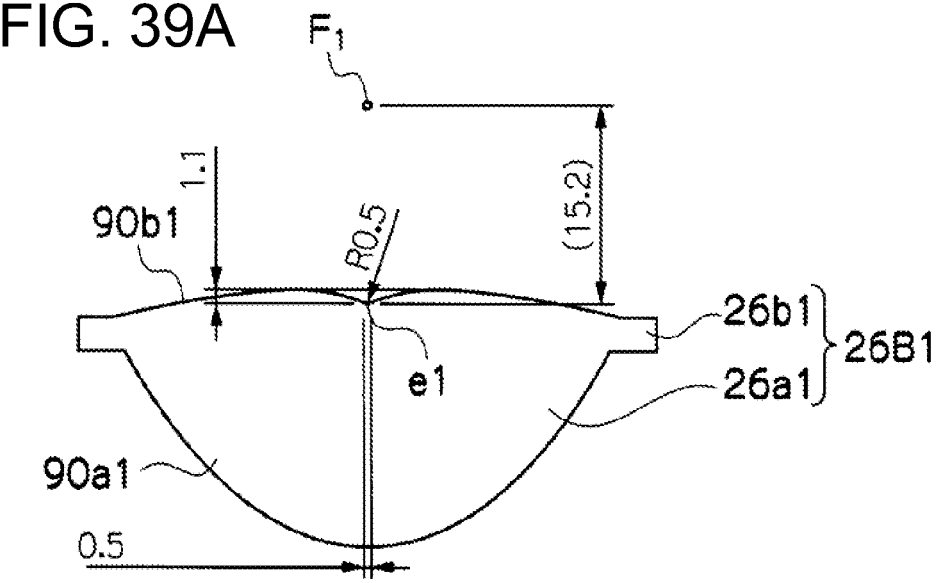
FIGS. 39A and 39B are a horizontal cross-sectional view of the second lens 26B1 (also showing its size), and a vertical cross-sectional view (also showing its size), respectively.
Figure 39B:
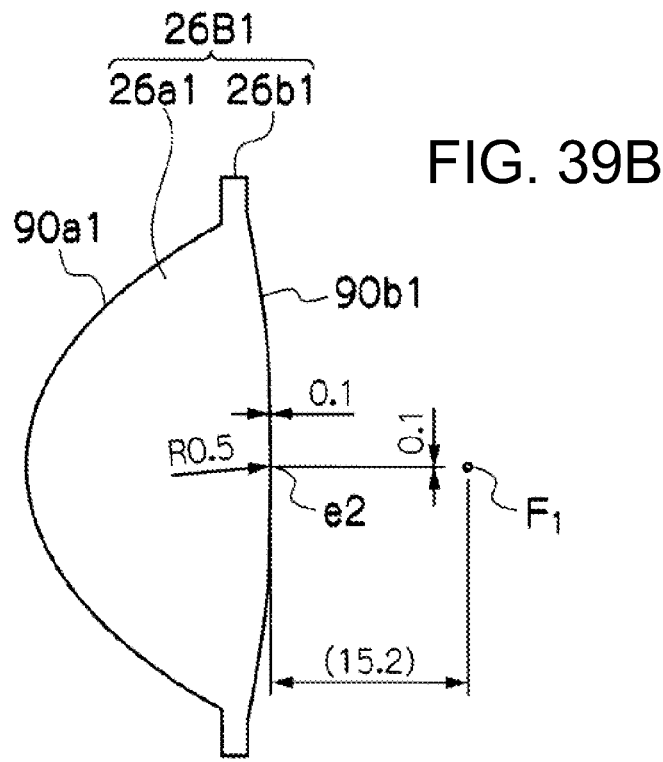

Note that as the second light source 28B can have the horizontally elongated rectangular light emission surface 94A with a certain size (not a point light source), the light emitted from the second light source 28B and incident on the light incident surface 90b1 (horizontal cross section) of the second lens 26B1 can travel along the light paths as illustrated in FIGS. 36 and 37. Reference symbols $I_1$, $I_2$, $I_3$, and $I_4$ in FIGS. 35 and 36 represent the size (light emission angle) of the image of the second light source 28B (the horizontally elongated rectangular light emission surface 94A) when the light from the second light source 28B is incident on the light incident surface 90b1 at p1 (a position slightly on the right side of the optical axis $AX_2$), p2 (a position slightly on the left side of the optical axis $AX_2$), p3, and p4, respectively.

A description will now be given of the vertical cross section of the light incident surface 90b1. As illustrated in FIGS. 29A and 29C, the light incident surface 90b1 can include an upper optical control surface and a lower optical control surface while including a portion where the upper and lower optical control surfaces cross on the optical axis $A_{X2}$. That portion is denoted by a recessed edge e2. In FIG. 29C, the edge e2 can extend from the left portion of the light incident surface 90b1 to the right portion while passing through the center of the light incident surface 90b1. The edge e2 can appear when the light incident surface 90b1 is designed as follows.

Specifically, the light incident surface 90b1 of the second lens 26B1 (the vertical cross section of the light incident surface 90b1) is designed in the following manner.

Figure 29D:
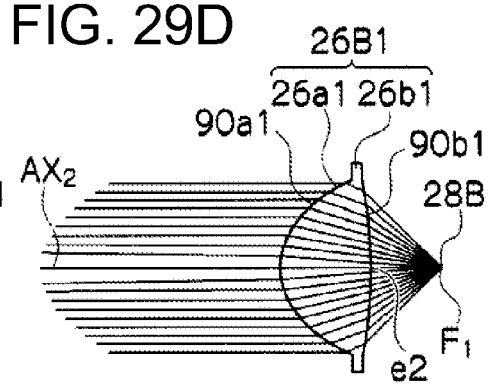

As illustrated in FIG. 29D, the lower portion of the light incident surface 90b1 on the lower side with respect to the horizontal plane including the optical axis $AX_2$ can have a vertical cross section designed to control the light emitted from the reference point $F_1$ and directed in a 0° (zero degrees) direction with respect to the optical axis $AX_2$ (in the optical axis direction $AX_2$ or forward) to the direction downward by 2° with respect to the optical axis $AX_2$ and also control the light emitted from the reference point $F_1$ and directed in directions ranging from the 0° (zero degrees) direction to a 45 degrees downward direction to the directions downward by 2° to 0° direction as the light emission direction is gradually changed from 0° to 45° downward.

Similarly, the upper portion of the light incident surface 90b1 on the upper side with respect to the horizontal plane including the optical axis $AX_2$ can have a vertical cross section designed to control the light emitted from the reference point $F_1$ and directed in a 0° (zero degrees) direction with respect to the optical axis $AX_2$ (in the optical axis direction $AX_2$ or forward) to the direction upward by 2° with respect to the optical axis $AX_2$ and also control the light emitted from the reference point $F_1$ and directed in directions ranging from the 0° (zero degrees) direction to a 45 degrees upward direction to the directions upward by 2° to 0° direction as the light emission direction is gradually changed from 0° to 45° upward.

Note that as the second light source 28B can have the horizontally elongated rectangular light emission surface 94A with a certain size (not a point light source), the light emitted from the second light source 28B and incident on the light incident surface 90b1 (vertical cross section) of the second lens 26B1 can travel along the light paths as illustrated in FIGS. 36 and 37.

Specific examples of the sizes of the second lens 26B 1 may include the numerical values indicated in FIGS. 38A to 38C, and 39A and 39B. Note that the sizes of the second lens 26B 1 can appropriately be changed depending on the sizes of the desired high-beam light distribution pattern $P_{Hi}$ and the shape and sizes of the second light source 28B (the horizontally elongated rectangular light emission surface 94A).

The present inventor has confirmed that the high-beam optical system 18B1 utilizing the second lens 26B 1 with the above configuration can form a high-beam light distribution pattern $P_{Hi}$ with the entire chromaticity falls within the white area A.

Figure 40:
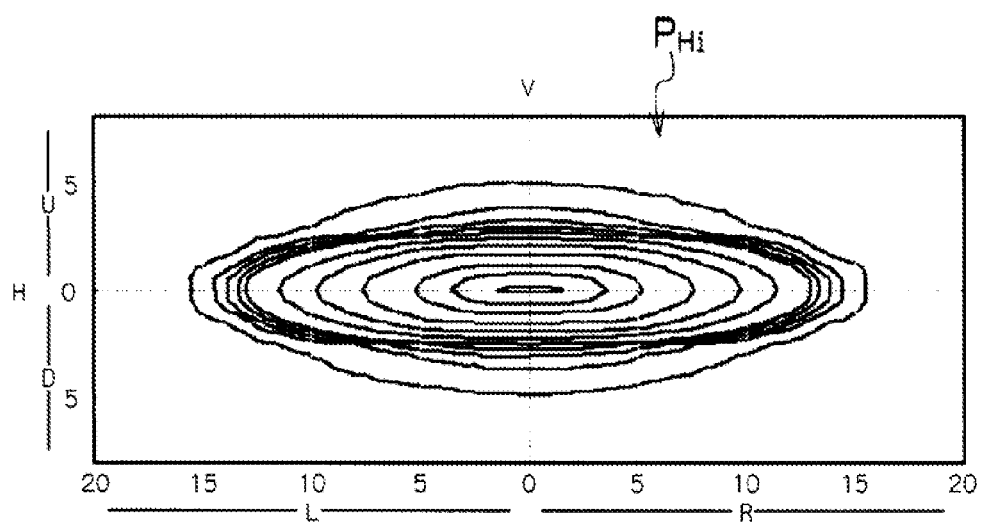
FIG. 40 is a diagram illustrating an exemplary high-beam light distribution pattern $P_{Hi}$ formed by the high-beam optical system 18B1 on a virtual vertical screen assumed to be formed in front of a vehicle body approximately 25 m away from the vehicle body.
Figure 41:
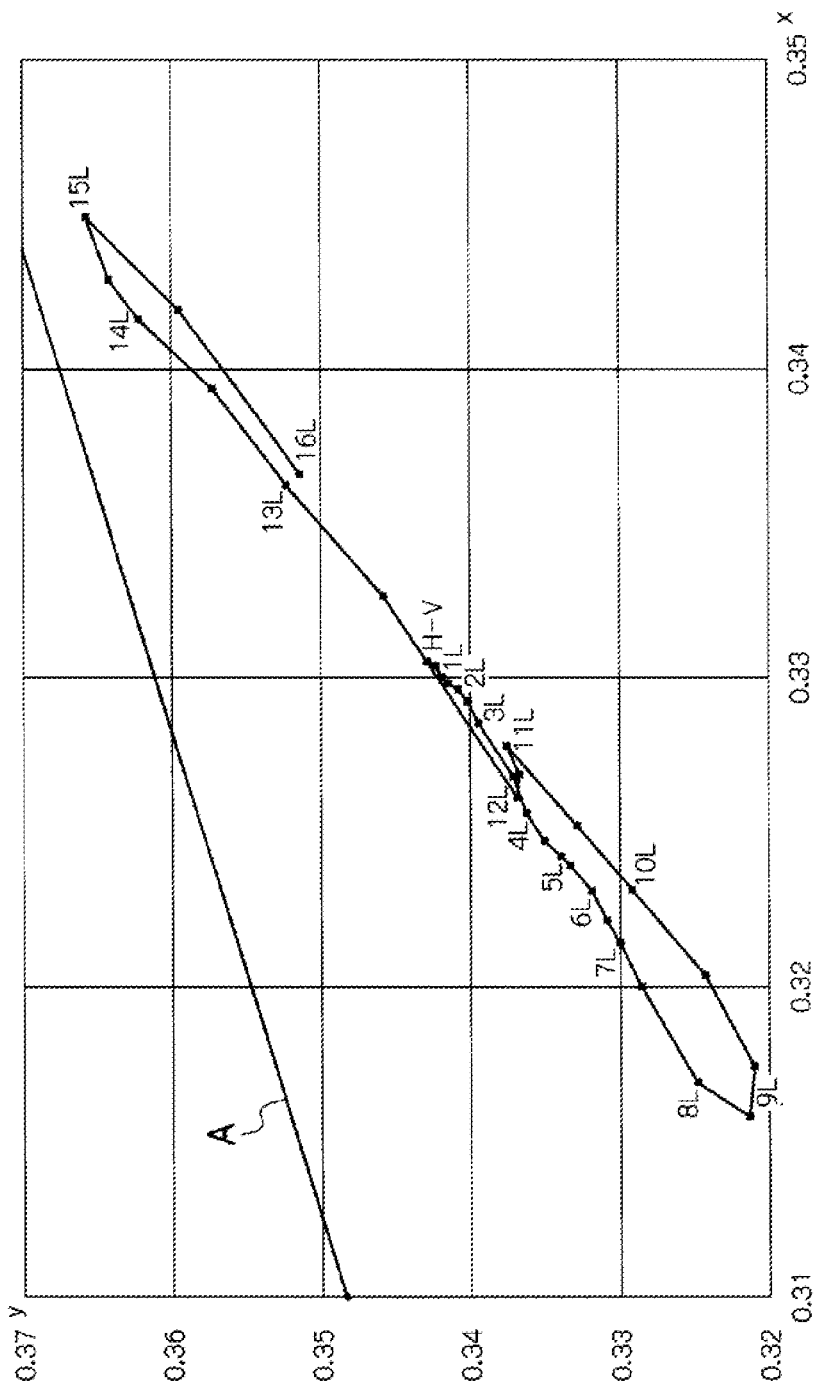
FIG. 41 is a diagram illustrating the chromaticity of the high-beam light distribution pattern $P_{Hi}$ of FIG. 40 on the xy chromaticity diagram (as measured every 1 degree in the left direction with the crossing point between the horizontal line H and the vertical line V assumed to be 0 (zero) degrees)

FIG. 40 is a diagram illustrating an exemplary high-beam light distribution pattern $P_{Hi}$ formed by the high-beam optical system 18B1 utilizing the second lens 26B 1 with the above configuration on a virtual vertical screen assumed to be formed in front of a vehicle body approximately 25 m away from the vehicle body. FIG. 41 is a diagram illustrating the chromaticity of the high-beam light distribution pattern $P_{Hi}$ of FIG. 40 on the xy chromaticity diagram (as measured every 1 degree in the left direction with the crossing point between the horizontal line H and the vertical line V assumed to be 0 (zero) degrees).

With reference to FIG. 41, it can be seen that the entire chromaticity of the high-beam light distribution pattern $P_{Hi}$ formed by the high-beam optical system 18B1 utilizing the second lens 26B1 with the above configuration falls within the white area A. Note that "H-V" in FIG. 41 represents the crossing point between the horizontal line H and the vertical line V, and "1L" and the like represent the leftward angle from the crossing point between the horizontal line H and the vertical line V.

With the high-beam optical system 18B1 of the present exemplary embodiment described above, the following advantageous effects can be obtained.

First, the entire chromaticity of the obtained light distribution pattern (for example, high-beam light distribution pattern $P_{Hi}$) can be caused to fall within the white area A.

This can be achieved by designing the light incident surface 90b1 of the second lens 26B that is capable of: controlling the light incident on the light incident surface 90b1 at the first position p1 (p2) on the optical axis $AX_2$ (or its vicinity) (white light with a relatively large amount of blue light component) to be directed in a direction not parallel to the optical axis $AX_2$; controlling the light incident on the light incident surface 90b1 at the second position p3 (p4) away from the optical axis $AX_2$ (white light with a relatively large amount of yellow light component) to be directed in a direction parallel to the optical axis $AX_2$; and controlling the light incident on the light incident surface 90b1 at positions between the first and second positions p1 and p3 (p2 and p4) to be directed in directions closer to the direction parallel to the optical axis $AX_2$ as the incident position is gradually changed from the first position p1 (p2) to the second position p3 (p4). Therefore, the light source images $I_1$, $I_2$, $I_3$, and $I_4$ of the second light source 28B (the horizontally elongated rectangular light emission surface 94A) can be disposed as illustrated FIG. 37 by means of the specifically designed light incident surface 90b1.

Second, it is possible to prevent the color unevenness or dark area of the predetermined light distribution pattern (for example, high-beam light distribution pattern $P_{Hi}$) from being generated.

This is because the light incident surface 90b1 of the second lens 26B is designed such that the light incident on the light incident surface 90b1 at positions between the first position p1 (p2) and the second position p3 (p4) can be controlled to be directed in directions closer to the direction parallel to the optical axis $AX_2$ as the incident position is gradually changed from the first position p1 (p2) to the second position p3 (p4).

Third, it is possible to provide the second lens 26B1 with a novel appearance including the edges e1 and e2 on the light incident surface 90b1 and the high-beam optical system 18B1 with the novel appearance second lens 26B 1.

A modification will next be described. First, a modification of the second light source 28B will be described.

The second light source 28B can have any structure as long as it is a white light source that can emit white light toward the optical axis $AX_2$ with a relatively larger amount of the blue light component and white light in the direction inclined by a larger angle with respect to the optical axis $AX_2$ with a relatively smaller amount of the blue light component and a relatively larger amount of the yellow light component.

Figure 42A:
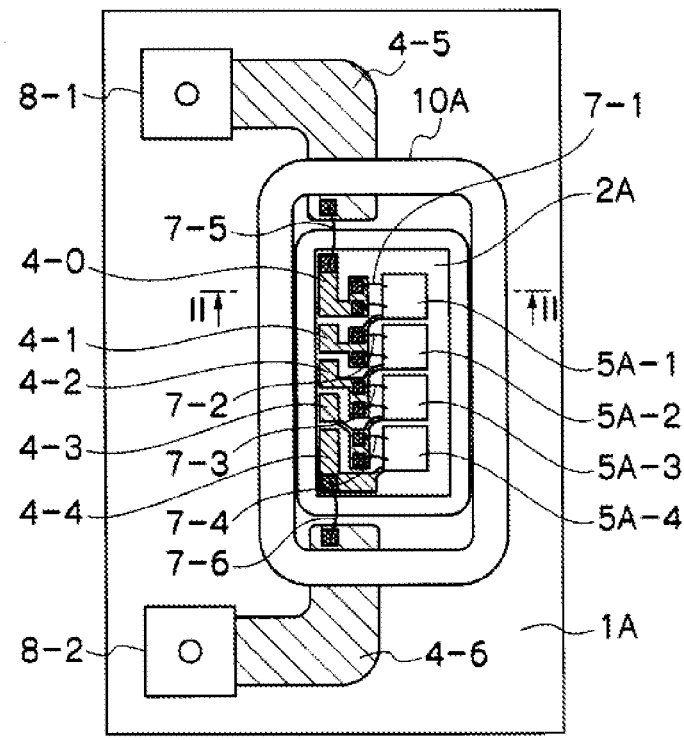
FIGS. 42A and 42B are a front view of a modification of the second light source 28B, and a cross-sectional view of the second light source 28B taken along line II-II of FIG. 42A, respectively.
Figure 42B:
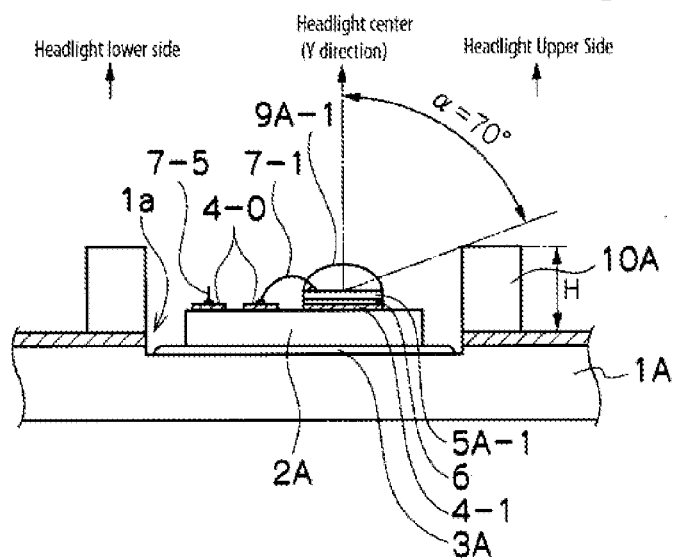

As illustrated in FIGS. 42A and 42B, examples of the second light source 28B can include those described in Japanese Patent Application Laid-Open No. 2011-77263, such as an LED module including a heat dissipation substrate 1A, a sub-substrate 2A secured on the heat dissipation substrate 1A by an adhesive 3A, at least one LED chip(s) (blue LEDs) 5A-1, 5A-2, 5A-3, and 5A-4 mounted on the sub-substrate 2A, a phosphor resin body 9A-1, 9A-2, 9A-3, and 9A-4 (being formed of YAG:Ce phosphor mixed in a silicon resin) coated over the LED chips 5A-1, 5A-2, 5A-3, and 5A-4, a wall body 10A formed on the heat dissipation substrate 1A to absorb light from the LED chips 5A-1, 5A-2, 5A-3, and 5A-4 that may become glare light reflected by the sub-substrate 2A.

Figure 43A:
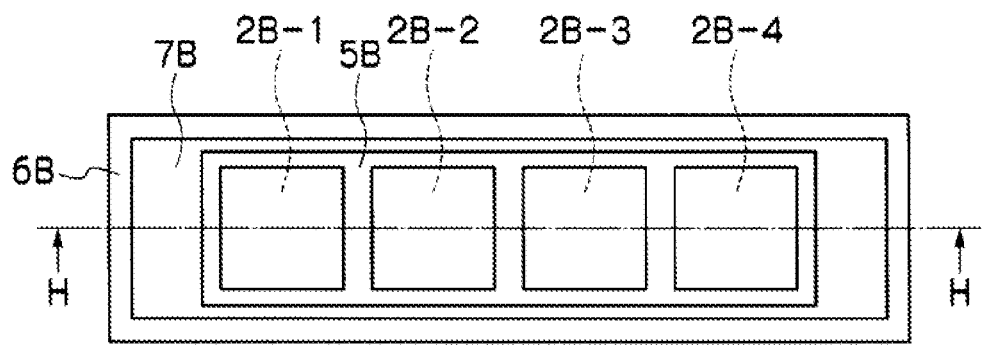
FIGS. 43A and 43B are a front view of a modification of the second light source 28B, and a cross-sectional view of the second light source 28B taken along line H-H of FIG. 43A, respectively.
Figure 43B:
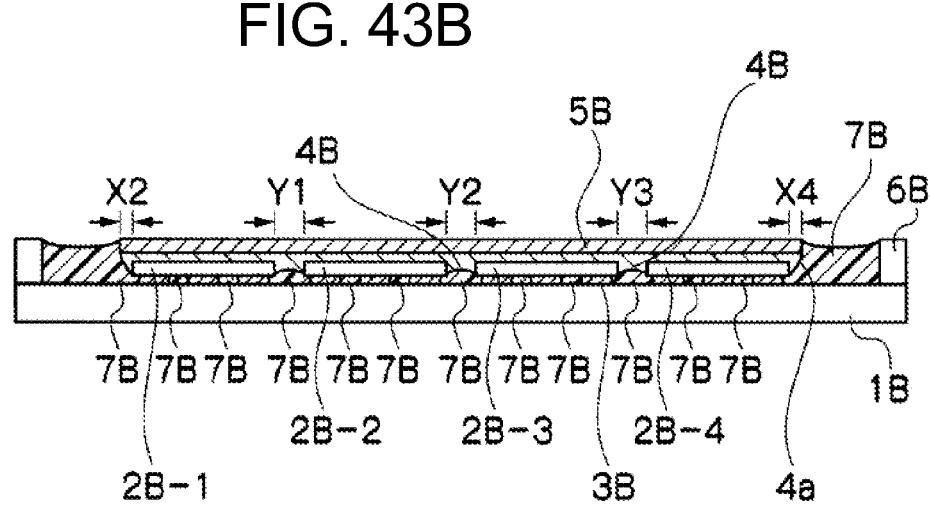

Further, as illustrated in FIGS. 43A and 43B, examples of the second light source 28B can include those described in Japanese Patent Application Laid-Open No. 2012-204438, such as an LED module including a substrate 1B, at least a flip-chip type blue light emitting device(s) 2B-1, 2B-2, 2B-3, and 2B-4 mounted on the substrate 1B, a wavelength conversion layer 4B (formed of a YAG phosphor) provided over the light emitting devices 2B-1, 2B-2, 2B-3, and 2B-4, a glass plate 5B provided on the wavelength conversion layer 4B, a frame 6B provided along the outer periphery of the substrate 1B, a white resin layer 7B (reflecting member) provided between the frame 6B, and the light emitting devices 2B-1, 2B-2, 2B-3, and 2B-4, wavelength conversion layer 4B and glass plate 5B, and the like.

Next, a high-beam optical system 18B2 as a first modification of the high-beam optical system 18B (18B1) will be described.

Figure 44A:
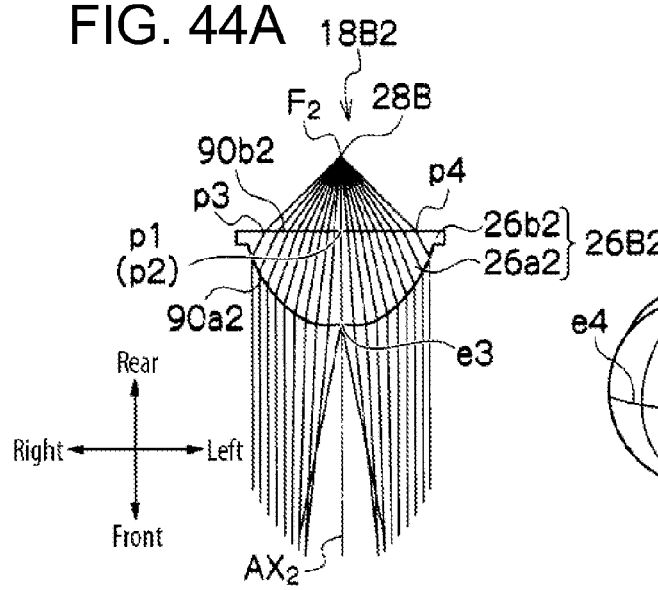
FIGS. 44A, 44B, 44C and 44D are a cross-sectional view of a high-beam optical system 18B2 taken along line A2-A2 of FIG. 44B, a front view, a perspective view, and a cross-sectional view of the high-beam optical system 18B2 taken along line B2-B2 of FIG. 44B, respectively.
Figure 44C:
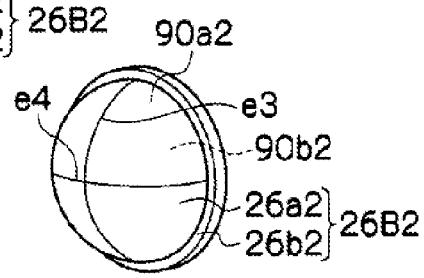
Figure 44B:
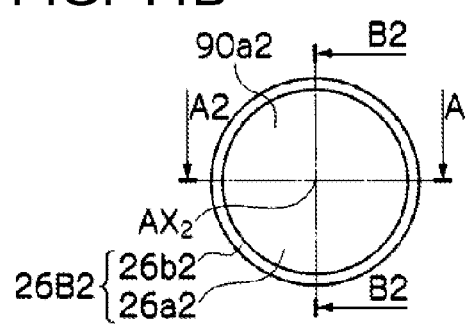

The high-beam optical system 18B2 can have the same or similar structure as that of the high-beam optical system 18B1 except for the following points. A description will be given of the different points. FIGS. 44A, 44B, and 44C are a cross-sectional view of the high-beam optical system 18B2 of FIG. 44B taken along line A2-A2, a front view, and a cross-sectional view of the high-beam optical system 18B2 of FIG. 44B taken along line B2-B2, respectively.

In order to adjust the entire chromaticity of the high-beam light distribution pattern to fall within the white area A, the light emitting surface 90a2 of the second lens 26B2 of the present modification can be designed as follows. Note that the second lens 26B2 of the present modification can be a lens designed to be a plano-convex projection lens as a basic lens design while the light incident surface 90b2 can be a convex surface similar to that of a common plano-convex projection lens.

A description will now be given of the horizontal cross section of the light emitting surface 90a2. As illustrated in FIGS. 44A and 44C, the light emitting surface 90a2 can include a left optical control surface and a right optical control surface while including a portion where the left and right optical control surfaces cross on the optical axis $AX_2$. That portion is denoted by a recessed edge e3. In FIG. 44C, the edge e3 can extend from the upper portion of the light emitting surface 90a2 to the lower portion while passing through the center of the light emitting surface 90a2. The edge e3 can appear when the light emitting surface 90a2 is designed as follows.

Specifically, the light emitting surface 90a2 of the second lens 26B2 (the horizontal cross section of the light emitting surface 90a2) is designed in the following manner.

As illustrated in FIG. 44A, the right portion of the light emitting surface 90a2 on the right side with respect to the vertical plane including the optical axis $AX_2$ can have a horizontal cross section designed to control the light emitted from the reference point $F_2$ and directed in a 0° (zero degrees) direction with respect to the optical axis $AX_2$ (in the optical axis direction $AX_2$ or forward) to the direction rightward by 10° with respect to the optical axis $AX_2$ and also control the light emitted from the reference point $F_2$ and directed in directions ranging from the 0° (zero degrees) direction to a 10 degrees rightward direction to the directions rightward by 10° to 0° direction as the light emission direction is gradually changed from 0° to 10° rightward.

Furthermore, the right portion of the light emitting surface 90a2 on the right side with respect to the vertical plane including the optical axis $AX_2$ can have a horizontal cross section designed to control the light emitted from the reference point $F_2$ and directed in a 10° direction or larger angle direction rightward with respect to the optical axis $AX_2$ to the 0° direction with respect to the optical axis $AX_2$ or in the optical axis $AX_2$ direction (forward).

Similarly, the left portion of the light emitting surface 90a2 on the left side with respect to the vertical plane including the optical axis $AX_2$ can have a horizontal cross section designed to control the light emitted from the reference point $F_2$ and directed in a 0° (zero degrees) direction with respect to the optical axis $AX_2$ to the direction leftward by 10° with respect to the optical axis $AX_2$ and also control the light emitted from the reference point $F_2$ and directed in directions ranging from the 0° (zero degrees) direction to a 10 degrees leftward direction to the directions leftward by 10° to 0° direction as the light emission direction is gradually changed from 0° to 10° leftward.

Furthermore, the left portion of the light emitting surface 90a2 on the left side with respect to the vertical plane including the optical axis $AX_2$ can have a horizontal cross section designed to control the light emitted from the reference point $F_2$ and directed in a 10° direction or larger angle direction leftward with respect to the optical axis $AX_2$ to the 0° direction with respect to the optical axis $AX_2$ or in the optical axis $AX_2$ direction (forward).

Note that as the second light source 28B can have the horizontally elongated rectangular light emission surface 94A with a certain size (not a point light source), the light emitted from the second light source 28B and incident on the light incident surface 90b2 (horizontal cross section) of the second lens 26B2 can travel along the light paths as illustrated in FIGS. 36 and 37.

A description will now be given of the vertical cross section of the light emitting surface 90a2. As illustrated in FIGS. 44A and 44C, the light emitting surface 90a2 can include an upper optical control surface and a lower optical control surface while including a portion where the upper and lower optical control surfaces cross on the optical axis $AX_2$. That portion is denoted by a recessed edge e4. In FIG. 43C, the edge e4 can extend from the left portion of the light emitting surface 90a2 to the right portion while passing through the center of the light emitting surface 90a2. The edge e4 can appear when the light emitting surface 90a2 is designed as follows.

Specifically, the light emitting surface 90a2 of the second lens 26B2 (the vertical cross section of the light emitting surface 90a2) is designed in the following manner.

Figure 44D:
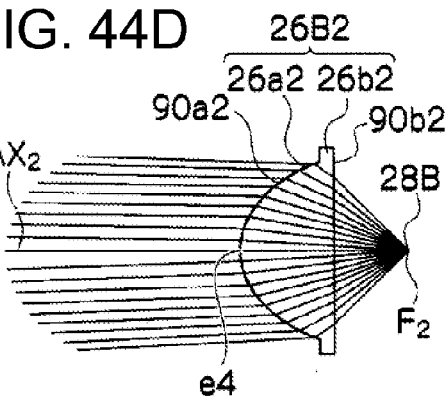

As illustrated in FIG. 44D, the lower portion of the light emitting surface 90a2 on the lower side with respect to the horizontal plane including the optical axis $AX_2$ can have a vertical cross section designed to control the light emitted from the reference point $F_2$ and directed in a 0° (zero degrees) direction or more downward with respect to the optical axis $AX_2$ to the direction downward by 2° with respect to the optical axis $AX_2$.

Similarly, the upper portion of the light emitting surface 90a2 on the upper side with respect to the horizontal plane including the optical axis $AX_2$ can have a vertical cross section designed to control the light emitted from the reference point $F_2$ and directed in a 0° (zero degrees) direction or more upward with respect to the optical axis $AX_2$ to the direction substantially parallel to the optical axis $AX_2$.

Note that as the second light source 28B can have the horizontally elongated rectangular light emission surface 94A with a certain size (not a point light source), the light emitted from the second light source 28B and incident on the light incident surface 90b2 (vertical cross section) of the second lens 26B2 can travel along the light paths as illustrated in FIGS. 36 and 37.

Note that the sizes of the second lens 26B2 can appropriately be changed depending on the sizes of the desired high-beam light distribution pattern $P_{Hi}$ and the shape and sizes of the second light source 28B (the horizontally elongated rectangular light emission surface 94A).

The modification of the high-beam optical system 18B2 can provide the following advantageous effects similar to the previous exemplary embodiment.

First, the entire chromaticity of the obtained light distribution pattern (for example, high-beam light distribution pattern $P_{Hi}$) can be caused to fall within the white area A.

This can be achieved by designing the light emitting surface 90a2 of the second lens 26B2 that is capable of: controlling the light incident on the light incident surface 90b2 at the first position p1 (p2) on the optical axis $AX_2$ (or its vicinity) (white light with a relatively large amount of blue light component) to be directed in a direction not parallel to the optical axis $AX_2$; controlling the light incident on the light incident surface 90b2 at the second position p3 (p4) away from the optical axis $AX_2$ (white light with a relatively large amount of yellow light component) to be directed in a direction parallel to the optical axis $AX_2$; and controlling the light incident on the light incident surface 90b2 at positions between the first and second positions p1 and p3 (p2 and p4) to be directed in directions closer to the direction parallel to the optical axis $AX_2$ as the incident position is gradually changed from the first position p1 (p2) to the second position p3 (p4). Therefore, the light source images of the second light source 28B (the horizontally elongated rectangular light emission surface 94A) can be disposed as illustrated FIG. 37 by means of the specifically designed light emitting surface 90a2.

Second, it is possible to prevent the color unevenness or dark area of the predetermined light distribution pattern (for example, high-beam light distribution pattern $P_{Hi}$) from being generated.

This is because the light incident surface 90b2 of the second lens 26B is designed such that the light incident on the light incident surface 90b2 at positions between the first position p1 (p2) and the second position p3 (p4) can be controlled to be directed in directions closer to the direction parallel to the optical axis $AX_2$ as the incident position is gradually changed from the first position p1 (p2) to the second position p3 (p4).

Third, it is possible to provide the second lens 26B2 with a novel appearance including the edges e3 and e4 on the light emitting surface 90a2 and the high-beam optical system 18B2 with the novel appearance second lens 26B2.

Next, a high-beam optical system 18B3 as a second modification of the high-beam optical system 18B (18B1) will be described.

Figures 45A, 45B, 45C, 45D:
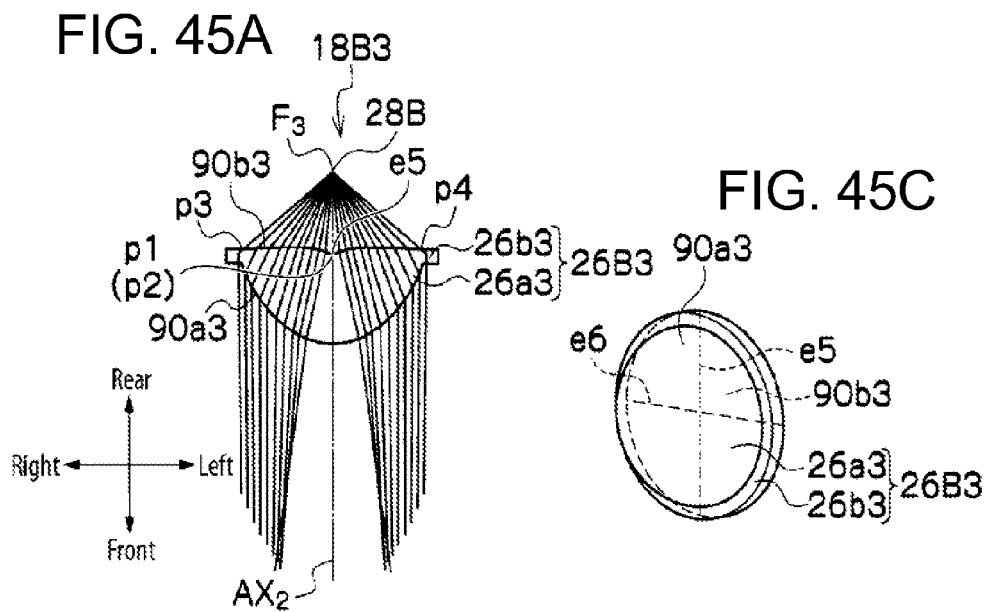
FIGS. 45A, 45B, 45C and 45D are a cross-sectional view of a high-beam optical system 18B3 taken along line A3-A3 of FIG. 45B, a front view, a perspective view, and a cross-sectional view of the high-beam optical system 18B3 taken along line B3-B3 of FIG. 45B, respectively.

The high-beam optical system 18B3 can have the same or similar structure as that of the high-beam optical system 18B1 except for the following points. A description will be given of the different points. FIGS. 45A, 45B, and 45C are a cross-sectional view of the high-beam optical system 18B3 of FIG. 45B taken along line A3-A3, a front view, and a cross-sectional view of the high-beam optical system 18B3 of FIG. 45B taken along line B3-B3, respectively.

In order to adjust the entire chromaticity of the high-beam light distribution pattern to fall within the white area A, the light incident surface 90b3 of the second lens 26B3 of the present modification can be designed as follows. Note that the second lens 26B3 of the present modification can be a lens designed to be a plano-convex projection lens as a basic lens design while the light emitting surface 90a3 can be a convex surface similar to that of a common plano-convex projection lens.

A description will now be given of the horizontal cross section of the light incident surface 90b3. As illustrated in FIGS. 45A and 45C, the light incident surface 90b3 can include a left optical control surface and a right optical control surface while including a portion where the left and right optical control surfaces cross on the optical axis $AX_2$. That portion is denoted by a recessed edge e5. In FIG. 45C, the edge e5 can extend from the upper portion of the light incident surface 90b3 to the lower portion while passing through the center of the light incident surface 90b3. The edge e5 can appear when the light incident surface 90b3 is designed as follows.

Specifically, the light incident surface 90b3 of the second lens 26B (the horizontal cross section of the light incident surface 90b3) is designed in the following manner.

As illustrated in FIG. 45A, the right portion of the light incident surface 90b3 on the right side with respect to the vertical plane including the optical axis $AX_2$ can have a horizontal cross section designed to control the light emitted from the reference point $F_3$ and directed in a 0° (zero degrees) direction with respect to the optical axis $AX_2$ (in the optical axis direction $AX_2$ or forward) to the direction rightward by 10° with respect to the optical axis $AX_2$ and also control the light emitted from the reference point $F_3$ and directed in directions ranging from the 0° (zero degrees) direction to a 10 degrees rightward direction to the directions rightward by 10° to 0° direction as the light emission direction is gradually changed from 0° to 10° rightward.

Furthermore, the right portion of the light incident surface 90b3 on the right side with respect to the vertical plane including the optical axis $AX_2$ can have a horizontal cross section designed to control the light emitted from the reference point $F_3$ and directed in a 10° direction or larger angle direction rightward with respect to the optical axis $AX_2$ to the 0° direction with respect to the optical axis $AX_2$ or in the optical axis $AX_2$ direction (forward).

Similarly, the left portion of the light incident surface 90b3 on the left side with respect to the vertical plane including the optical axis $AX_2$ can have a horizontal cross section designed to control the light emitted from the reference point $F_3$ and directed in a 0° (zero degrees) direction with respect to the optical axis $AX_2$ to the direction leftward by 10° with respect to the optical axis $AX_2$ and also control the light emitted from the reference point $F_3$ and directed in directions ranging from the 0° (zero degrees) direction to a 10 degrees leftward direction to the directions leftward by 10° to 0° direction as the light emission direction is gradually changed from 0° to 10° leftward.

Furthermore, the left portion of the light incident surface 90b3 on the left side with respect to the vertical plane including the optical axis $AX_2$ can have a horizontal cross section designed to control the light emitted from the reference point $F_3$ and directed in a 10° direction or larger angle direction leftward with respect to the optical axis $AX_2$ to the 0° direction with respect to the optical axis $AX_2$ or in the optical axis $AX_2$ direction (forward).

Note that as the second light source 28B can have the horizontally elongated rectangular light emission surface 94A with a certain size (not a point light source), the light emitted from the second light source 28B and incident on the light incident surface 90b3 (horizontal cross section) of the second lens 26B2 can travel along the light paths as illustrated in FIGS. 36 and 37.

A description will now be given of the vertical cross section of the light incident surface 90b3. As illustrated in FIGS. 45C and 45D, the light incident surface 90b3 can include an upper optical control surface and a lower optical control surface while including a portion where the upper and lower optical control surfaces cross on the optical axis $AX_2$. That portion is denoted by a recessed edge e6. In FIG. 45C, the edge e6 can extend from the left portion of the light incident surface 90b3 to the right portion while passing through the center of the light incident surface 90b3. The edge e6 can appear when the light incident surface 90b3 is designed as follows.

Specifically, the light incident surface 90b3 of the second lens 26B (the vertical cross section of the light incident surface 90b3) is designed in the following manner.

As illustrated in FIG. 44D, the lower portion of the light incident surface 90b3 on the lower side with respect to the horizontal plane including the optical axis $AX_2$ can have a vertical cross section designed to control the light emitted from the reference point $F_3$ and directed in a 0° (zero degrees) direction with respect to the optical axis $AX_2$ (in the optical axis direction $AX_2$ or forward) to the direction upward by 2° with respect to the optical axis $AX_2$ and also control the light emitted from the reference point $F_3$ and directed in directions ranging from the 0° (zero degrees) direction to a 45 degrees downward direction to the directions upward by 2° to 0° direction as the light emission direction is gradually changed from 0° to 45° downward.

Similarly, the upper portion of the light incident surface 90b3 on the upper side with respect to the horizontal plane including the optical axis $AX_2$ can have a vertical cross section designed to control the light emitted from the reference point $F_3$ and directed in a 0° (zero degrees) direction with respect to the optical axis $AX_2$ (in the optical axis direction $AX_2$ or forward) to the direction downward by 2° with respect to the optical axis $AX_2$ and also control the light emitted from the reference point $F_3$ and directed in directions ranging from the 0° (zero degrees) direction to a 45 degrees upward direction to the directions downward by 2° to 0° direction as the light emission direction is gradually changed from 0° to 45° upward.

Note that as the second light source 28B can have the horizontally elongated rectangular light emission surface 94A with a certain size (not a point light source), the light emitted from the second light source 28B and incident on the light incident surface 90b3 (vertical cross section) of the second lens 26B3 can travel along the light paths as illustrated in FIGS. 36 and 37.

Note that the sizes of the second lens 26B3 can appropriately be changed depending on the sizes of the desired high-beam light distribution pattern $P_{Hi}$ and the shape and sizes of the second light source 28B (the horizontally elongated rectangular light emission surface 94A).

The modification of the high-beam optical system 18B3 can provide the following advantageous effects similar to the previous exemplary embodiment.

First, the entire chromaticity of the obtained light distribution pattern (for example, high-beam light distribution pattern $P_{Hi}$) can be caused to fall within the white area A.

This can be achieved by designing the light incident surface 90b3 of the second lens 26B3 that is capable of: controlling the light incident on the light incident surface 90b3 at the first position p1 (p2) on the optical axis $AX_2$ (or its vicinity) (white light with a relatively large amount of blue light component) to be directed in a direction not parallel to the optical axis $AX_2$; controlling the light incident on the light incident surface 90b3 at the second position p3 (p4) away from the optical axis $AX_2$ (white light with a relatively large amount of yellow light component) to be directed in a direction parallel to the optical axis $AX_2$; and controlling the light incident on the light incident surface 90b3 at positions between the first and second positions p1 and p3 (p2 and p4) to be directed in directions closer to the direction parallel to the optical axis $AX_2$ as the incident position is gradually changed from the first position p1 (p2) to the second position p3 (p4). Therefore, the light source images of the second light source 28B (the horizontally elongated rectangular light emission surface 94A) can be disposed as illustrated FIG. 37 by means of the specifically designed light incident surface 90b3.

Second, it is possible to prevent the color unevenness or dark area of the predetermined light distribution pattern (for example, high-beam light distribution pattern $P_{Hi}$) from being generated.

This is because the light incident surface 90b3 of the second lens 26B is designed such that the light incident on the light incident surface 90b3 at positions between the first position p1 (p2) and the second position p3 (p4) can be controlled to be directed in directions closer to the direction parallel to the optical axis $AX_2$ as the incident position is gradually changed from the first position p1 (p2) to the second position p3 (p4).

Third, it is possible to provide the second lens 26B3 with a novel appearance including the edges e5 and e6 on the light incident surface 90b3 and the high-beam optical system 18B3 with the novel appearance second lens 26B3.

Figure 46A:
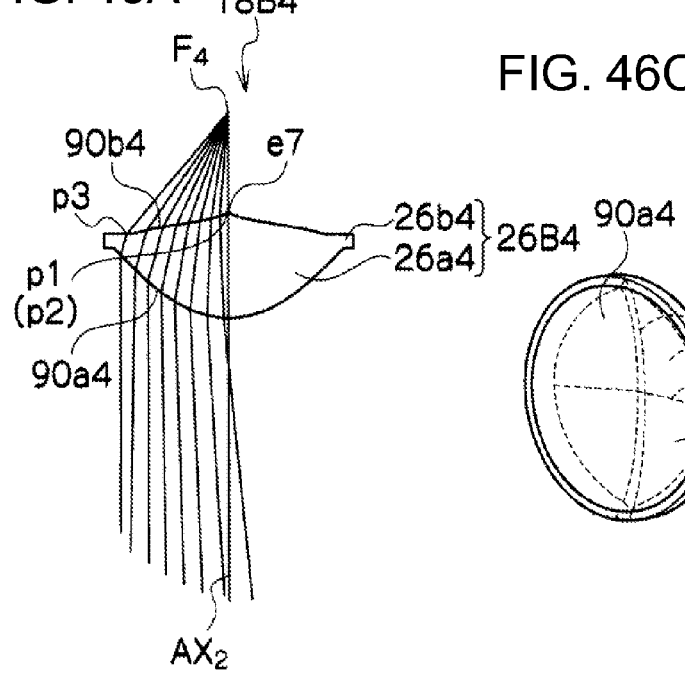
FIGS. 46A, 46B, 46C and 46D are a cross-sectional view of a high-beam optical system 18B4 taken along line A4-A4 of FIG. 46B, a front view, a perspective view, and a cross-sectional view of the high-beam optical system 18B4 taken along line B4-B4 of FIG. 46B, respectively.
Figure 46C:
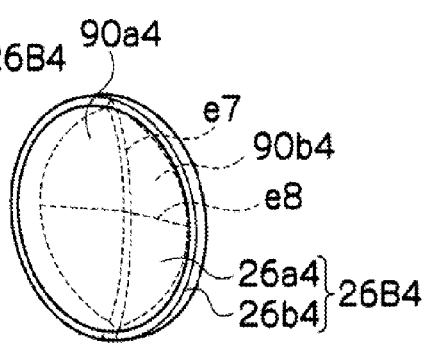
Figure 46B:
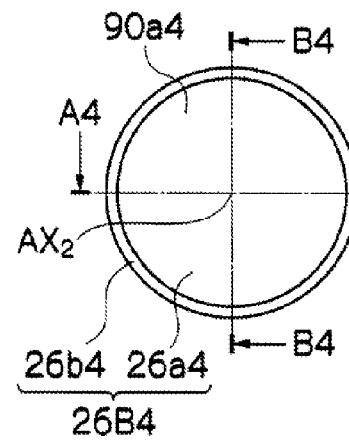

Next, a high-beam optical system 18B4 as a third modification of the high-beam optical system 18B (18B1) will be described. The high-beam optical system 18B4 can have the same or similar structure as that of the high-beam optical system 18B1 except for the following points. A description will be given of the different points. FIGS. 46A, 46B, and 46C are a cross-sectional view of the high-beam optical system 18B4 of FIG. 46B taken along line A4-A4, a front view, and a cross-sectional view of the high-beam optical system 18B4 of FIG. 46B taken along line B4-B4, respectively.

In order to adjust the entire chromaticity of the high-beam light distribution pattern to fall within the white area A, the light incident surface 90b4 of the second lens 26B4 of the present modification can be designed as follows. Note that the second lens 26B4 of the present modification can be a lens designed to be a plano-convex projection lens as a basic lens design while the light emitting surface 90a4 can be a convex surface similar to that of a common plano-convex projection lens.

A description will now be given of the horizontal cross section of the light incident surface 90b4. As illustrated in FIGS. 46A and 46C, the light incident surface 90b4 can include a left optical control surface and a right optical control surface while including a portion where the left and right optical control surfaces cross on the optical axis $AX_2$. That portion is denoted by a recessed edge e7. In FIG. 46C, the edge e7 can extend from the upper portion of the light incident surface 90b4 to the lower portion while passing through the center of the light incident surface 90b4. The edge e7 can appear when the light incident surface 90b4 is designed as follows. Specifically, the light incident surface 90b4 of the second lens 26B4 (the horizontal cross section of the light incident surface 90b4) is designed in the following manner.

As illustrated in FIG. 46A, the right portion of the light incident surface 90b4 on the right side with respect to the vertical plane including the optical axis $AX_2$ can have a horizontal cross section designed to control the light emitted from the reference point $F_4$ and directed in a 0° (zero degrees) direction with respect to the optical axis $AX_2$ (in the optical axis direction $AX_2$ or forward) to the direction leftward by 10° with respect to the optical axis $AX_2$ and also control the light emitted from the reference point $F_4$ and directed in directions ranging from the 0° (zero degrees) direction to a 45 degrees rightward direction to the directions leftward by 10° to 0° direction as the light emission direction is gradually changed from 0° to 45° rightward.

Similarly, the left portion of the light incident surface 90b4 on the left side with respect to the vertical plane including the optical axis $AX_2$ can have a horizontal cross section designed to control the light emitted from the reference point $F_4$ and directed in a 0° (zero degrees) direction with respect to the optical axis $AX_2$ to the direction rightward by 10° with respect to the optical axis $AX_2$ and also control the light emitted from the reference point $F_4$ and directed in directions ranging from the 0° (zero degrees) direction to a 45 degrees leftward direction to the directions rightward by 10° to 0° direction as the light emission direction is gradually changed from 0° to 45° leftward.

Note that as the second light source 28B can have the horizontally elongated rectangular light emission surface 94A with a certain size (not a point light source), the light emitted from the second light source 28B and incident on the light incident surface 90b4 (horizontal cross section) of the second lens 26B4 can travel along the light paths as illustrated in FIGS. 36 and 37.

Figure 46D:
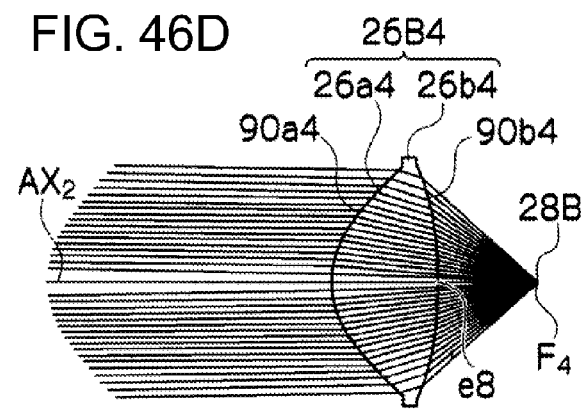

A description will now be given of the vertical cross section of the light incident surface 90b4. As illustrated in FIGS. 46C and 46D, the light incident surface 90b4 can include an upper optical control surface and a lower optical control surface while including a portion where the upper and lower optical control surfaces cross on the optical axis $AX_2$. That portion is denoted by a recessed edge e8. In FIG. 46C, the edge e8 can extend from the left portion of the light incident surface 90b4 to the right portion while passing through the center of the light incident surface 90b4. The edge e8 can appear when the light incident surface 90b4 is designed as follows.

Specifically, the light incident surface 90b4 of the second lens 26B4 (the vertical cross section of the light incident surface 90b4) is designed in the following manner.

As illustrated in FIG. 46D, the lower portion of the light incident surface 90b4 on the lower side with respect to the horizontal plane including the optical axis $AX_2$ can have a vertical cross section designed to control the light emitted from the reference point $F_4$ and directed in a 0° (zero degrees) direction with respect to the optical axis $AX_2$ (in the optical axis direction $AX_2$ or forward) to the direction downward by 2° with respect to the optical axis $AX_2$ and also control the light emitted from the reference point $F_4$ and directed in directions ranging from the 0° (zero degrees) direction to a 45 degrees downward direction to the directions downward by 2° to 0° direction as the light emission direction is gradually changed from 0° to 45° downward.

Similarly, the upper portion of the light incident surface 90b4 on the upper side with respect to the horizontal plane including the optical axis $AX_2$ can have a vertical cross section designed to control the light emitted from the reference point $F_4$ and directed in a 0° (zero degrees) direction with respect to the optical axis $AX_2$ (in the optical axis direction $AX_2$ or forward) to the direction upward by 2° with respect to the optical axis $AX_2$ and also control the light emitted from the reference point $F_4$ and directed in directions ranging from the 0° (zero degrees) direction to a 45 degrees upward direction to the directions upward by 2° to 0° direction as the light emission direction is gradually changed from 0° to 45° upward.

Note that as the second light source 28B can have the horizontally elongated rectangular light emission surface 94A with a certain size (not a point light source), the light emitted from the second light source 28B and incident on the light incident surface 90b4 (vertical cross section) of the second lens 26B4 can travel along the light paths as illustrated in FIGS. 36 and 37.

Note that the sizes of the second lens 26B4 can appropriately be changed depending on the sizes of the desired high-beam light distribution pattern $P_{Hi}$ and the shape and sizes of the second light source 28B (the horizontally elongated rectangular light emission surface 94A).

The modification of the high-beam optical system 18B3 can provide the following advantageous effects.

First, the entire chromaticity of the obtained light distribution pattern (for example, high-beam light distribution pattern $P_{Hi}$) can be caused to fall within the white area A.

This can be achieved by designing the light incident surface 90b4 of the second lens 26B4 that is capable of: controlling the light incident on the light incident surface 90b4 at the first position p1 (p2) on the optical axis $AX_2$ (or its vicinity) (white light with a relatively large amount of blue light component) to be directed in a direction not parallel to the optical axis $AX_2$; controlling the light incident on the light incident surface 90b4 at the second position p3 (p4) away from the optical axis $AX_2$ (white light with a relatively large amount of yellow light component) to be directed in a direction parallel to the optical axis $AX_2$; and controlling the light incident on the light incident surface 90b4 at positions between the first and second positions p1 and p3 (p2 and p4) to be directed in directions closer to the direction parallel to the optical axis $AX_2$ as the incident position is gradually changed from the first position p1 (p2) to the second position p3 (p4). Therefore, the light source images of the second light source 28B (the horizontally elongated rectangular light emission surface 94A) can be disposed as illustrated FIG. 37 by means of the specifically designed light incident surface 90b4.

Second, it is possible to prevent the color unevenness or dark area of the predetermined light distribution pattern (for example, high-beam light distribution pattern $P_{Hi}$) from being generated.

This is because the light incident surface 90b4 of the second lens 26B is designed such that the light incident on the light incident surface 90b4 at positions between the first position p1 (p2) and the second position p3 (p4) can be controlled to be directed in directions closer to the direction parallel to the optical axis $AX_2$ as the incident position is gradually changed from the first position p1 (p2) to the second position p3 (p4).

Third, it is possible to provide the second lens 26B4 with a novel appearance including the edges e7 and e8 on the light incident surface 90b4 and the high-beam optical system 18B4 with the novel appearance second lens 26B4.

The above exemplary embodiment and respective modifications have illustrated examples applied to the high-beam optical system 18B (18B1 to 18B4) configured to form a high-beam light distribution pattern, but the presently disclosed subject matter is not limited to these. They can be applied to a low-beam optical system configured to form a low-beam light distribution pattern (for example, the low-beam optical system 18A).

Next, a description will be given of the low-beam optical system 18A in detail. FIGS. 47A, 47B, and 47C are a cross-sectional view of the low-beam optical system 18A of FIG. 47B taken along line A5-A5, a front view, and a cross-sectional view of the low-beam optical system 18A of FIG. 47B taken along line B5-B5.

The low-beam optical system 18A can be a so-called direct projection type optical system, and as shown in FIGS. 47A to 47D, can include a first lens 26A, a first light source 28A, and the like.

The first lens 26A can be formed from a transparent resin and include a lens section 26a5 and a flange section 26b5 disposed on the periphery of the lens section 26a5.

The lens section 26a5 of the first lens 26A (corresponding to the projection lens in the presently disclosed subject matter) can be disposed on an optical axis $AX_1$ extending in the vehicle front-to-rear direction, and include a light emitting surface 90a5, a light incident surface 90b5 on which light to be projected through the light emitting surface 90a5 can be incident, and a reference point $F_5$ optically designed to be disposed in front of the light incident surface 90b5.

The first light source 28A can be disposed substantially at (i.e., at or near) the reference point $F_5$, and can emit white light that can be incident on the light incident surface 90b5 to enter the first lens 26A and projected forward through the light emitting surface 90a5.

As in the second light source 28B, the first light source 28A can emit white light by color mixture of at least blue light (the first color light) and yellow light (the second color light).

As in the second light source 28B, the first light source 28A can be screwed to the heat sink 20 with screws or the like means such that the longer side of the elongated rectangular light emission surface 94A is directed horizontally, the light emission surface 94A faces forward (toward the light incident surface 90b5 of the first lens 26A), and the center (or vicinity) of the light emission surface 94A is made coincident with the reference point $F_5$ of the first lens 26A.

In order to adjust the entire chromaticity of the low-beam light distribution pattern to fall within the white area A, the light incident surface 90b5 of the first lens 26A of the present modification can be designed as follows. Note that the first lens 26A of the present modification can be a lens designed to be a projection lens with both convex surfaces as a basic lens design while the light emitting surface 90a5 can be a convex surface similar to that of a common plano-convex projection lens.

A description will now be given of the horizontal cross section of the light incident surface 90b5. As illustrated in FIGS. 47A and 47C, the light incident surface 90b5 can include a left optical control surface and a right optical control surface while including a portion where the left and right optical control surfaces cross on the optical axis $A_{X1}$. That portion is denoted by a recessed edge e9. In FIG. 47C, the edge e9 can extend from the upper portion of the light incident surface 90b5 to the lower portion while passing through the center of the light incident surface 90b5. The edge e9 can appear when the light incident surface 90b5 is designed as follows.

Specifically, the light incident surface 90b5 of the first lens 26A (the horizontal cross section of the light incident surface 90b5) is designed in the following manner.

As illustrated in FIG. 47A, the right portion of the light incident surface 90b5 on the right side with respect to the vertical plane including the optical axis $AX_1$ can have a horizontal cross section designed to control the light emitted from the reference point $F_5$ and directed in a 0° (zero degrees) direction with respect to the optical axis $AX_1$ (in the optical axis direction $AX_1$ or forward) to the direction rightward by 20° with respect to the optical axis $AX_1$ and also control the light emitted from the reference point $F_5$ and directed in directions ranging from the 0° (zero degrees) direction to a 45 degrees rightward direction to the directions rightward by 20° to 0° direction as the light emission direction is gradually changed from 0° to 45° rightward.

Similarly, the left portion of the light incident surface 90b5 on the left side with respect to the vertical plane including the optical axis $AX_1$ can have a horizontal cross section designed to control the light emitted from the reference point $F_5$ and directed in a 0° (zero degrees) direction with respect to the optical axis $AX_1$ (in the optical axis direction $AX_1$ or forward) to the direction leftward by 20° with respect to the optical axis $AX_1$ and also control the light emitted from the reference point $F_5$ and directed in directions ranging from the 0° (zero degrees) direction to a 45 degrees leftward direction to the directions leftward by 20° to 0° direction as the light emission direction is gradually changed from 0° to 45° leftward.

Note that as the first light source 28A can have the horizontally elongated rectangular light emission surface 94A with a certain size (not a point light source), the light emitted from the first light source 28A and incident on the light incident surface 90b5 (horizontal cross section) of the first lens 26A can travel along the light paths as illustrated in FIGS. 36 and 37.

A description will now be given of the vertical cross section of the light incident surface 90b5. Specifically, the light incident surface 90b5 of the first lens 26A (the vertical cross section of the light incident surface 90b5) is designed in the following manner.

The light incident surface 90b5 can have a vertical cross section designed to control the light emitted from the reference point $F_5$ and directed in an upward 35 degrees direction to a downward 35 degrees direction with respect to the optical axis $AX_1$ to the directions covering the area below a predetermined position (a position 0.6 degrees below) as an upper limit.

Note that the sizes of the first lens 26A can appropriately be changed depending on the sizes of the desired low-beam light distribution pattern and the shape and sizes of the first light source 28A (the horizontally elongated rectangular light emission surface 94A).

With the low-beam optical system 18A of the present modification described above, the following advantageous effects can be obtained.

First, the entire chromaticity of the obtained light distribution pattern (for example, low-beam light distribution pattern) can be caused to fall within the white area A.

This can be achieved by designing the light incident surface 90b5 of the first lens 26A that is capable of: controlling the light incident on the light incident surface 90b5 at the first position p1 (p2) on the optical axis $AX_1$ (or its vicinity) (white light with a relatively large amount of blue light component) to be directed in a direction not parallel to the optical axis $AX_1$; controlling the light incident on the light incident surface 90b5 at the second position p3 (p4) away from the optical axis $AX_1$ (white light with a relatively large amount of yellow light component) to be directed in a direction parallel to the optical axis $AX_1$; and controlling the light incident on the light incident surface 90b5 at positions between the first and second positions p1 and p3 (p2 and p4) to be directed in directions closer to the direction parallel to the optical axis $AX_1$ as the incident position is gradually changed from the first position p1 (p2) to the second position p3 (p4). Therefore, the light source images of the first light source 28A (the horizontally elongated rectangular light emission surface 94A) can be disposed as illustrated FIG. 37 by means of the specifically designed light incident surface 90b5.

Second, it is possible to prevent the color unevenness or dark area of the predetermined light distribution pattern (for example, high-beam light distribution pattern $P_{Hi}$) from being generated.

This is because the light incident surface 90b5 of the first lens 26A is designed such that the light incident on the light incident surface 90b5 at positions between the first position p1 (p2) and the second position p3 (p4) can be controlled to be directed in directions closer to the direction parallel to the optical axis $AX_2$ as the incident position is gradually changed from the first position p1 (p2) to the second position p3 (p4).

Third, it is possible to provide the first lens 26A with a novel appearance including the edge e9 on the light incident surface 90b5 and the low-beam optical system 18A with the novel appearance first lens 26A.

The exemplary embodiments and modifications have been described as to any one of the light incident surface 90b (90b1 to 90b4) and the light emitting surface 90a (90a1 to 90a4) of the second lens 26B in order for the entire chromaticity of a predetermined light distribution pattern (high-beam light distribution pattern, low-beam light distribution pattern, or the like) to fall within the white area A. However, the presently disclosed subject matter is not limited to these.

For example, in order for the entire chromaticity of a predetermined light distribution pattern (high-beam light distribution pattern, low-beam light distribution pattern, or the like) to fall within the white area A, both the light incident surface 90b and the light emitting surface 90a of the second lens 26B can be varied. The same can be applied to the first lens 26A.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle headlight having an optical axis extending in a front-to-rear direction of a vehicle body on which the vehicle headlight is to be mounted, the vehicle headlight comprising:
 a projection lens disposed on the optical axis, the projection lens including a light emitting surface, a light incident surface on which light to be projected through the light emitting surface is incident, and a reference point disposed to face the light incident surface; and
 a light source disposed substantially at the reference point, the light source emitting white light to be incident on the light incident surface to enter the projection lens and be projected forward through the light emitting surface, wherein
 the light source is configured to emit white light by color mixture of at least a first color light and a second color light so that white light directed in a direction of the optical axis contains a relatively larger amount of the first color light than the second color light while white light directed in an oblique direction with respect to the optical axis by a certain angle contains a relatively larger amount of the second color light than the first color light,
 the light source includes at least one semiconductor light emitting device configured to emit the first color light and a light transmitting member configured to absorb at least part of the first color light from the semiconductor light emitting device and convert the first color light into the second color light, a ratio of an amount of the first color light contained in the white light directed toward the optical axis is large than a ratio of an amount of the first color light contained in the white light directed in the oblique direction by a larger angle with respect to the optical axis, at least one of the light emitting surface and the light incident surface includes a surface configured to control the light from the light source at the reference point such that at least a portion of light incident on the light incident surface at an incident position on the optical axis or a first incident position near the optical axis is directed in a direction not parallel to the optical axis, the surface also configured to control light incident on the light incident surface at a second incident position away from the optical axis to be directed in a direction parallel to the optical axis, and the surface also configured to control light incident on the light incident surface at an incident position between the first incident position and the second incident position to be directed in a direction closer to the direction parallel to the optical axis as the light is incident on the light incident surface at an incident position closer from the first incident position to the second incident position, a right portion of any one of the light incident surface and the light emitting surface on a right side with respect to a vertical plane including the optical axis has a horizontal cross section configured to control the light emitted from the light source at the reference point and directed in a 0° direction with respect to the optical axis to a direction rightward by a first predetermined right angle with respect to the optical axis and also control the light emitted from the light source at the reference point and directed in directions ranging from the 0° direction to a direction rightward by a second predetermined right angle with respect to the optical axis to directions rightward by the predetermined right angle to the 0° direction as the direction of light emission is gradually changed from 0° to the second predetermined right angle rightward, and a left portion of any one of the light incident surface and the light emitting surface on a left side with respect to the vertical plane including the optical axis has a horizontal cross section configured to control the light emitted from the light source at the reference point and directed in a 0° direction with respect to the optical axis to a direction leftward by a first predetermined left angle with respect to the optical axis and also control the light emitted from the light source at the reference point and directed in directions ranging from the 0° direction to a direction leftward by a second predetermined left angle with respect to the optical axis to directions leftward by the first predetermined left angle to the 0° direction as the direction of light emission is gradually changed from 0° to the second predetermined left angle rightward.

2. The vehicle headlight according to claim 1, wherein the first color light is blue light, and the second color light is yellow light.

3. The vehicle headlight according to claim 1, wherein
a lower portion of any one of the light incident surface and the light emitting surface on a lower side with respect to a horizontal plane including the optical axis has a vertical cross section configured to control the light emitted from the light source at the reference point and directed in the 0° direction with respect to the optical axis to a direction downward by a first predetermined lower angle with respect to the optical axis and also control the light emitted from the light source at the reference point and directed in directions ranging from the 0° direction to a direction downward by a second predetermined lower angle with respect to the optical axis to directions downward by the first predetermined lower angle to the 0° direction as the direction of light emission is gradually changed from 0° to the second predetermined lower angle downward, an upper portion of any one of the light incident surface and the light emitting surface on an upper side with respect to the vertical plane including the optical axis has a horizontal cross section configured to control the light emitted from the light source at the reference point and directed in a 0° direction with respect to the optical axis to a direction upward by a first predetermined upper angle with respect to the optical axis and also control the light emitted from the light source at the reference point and directed in directions ranging from the 0° direction to a direction upward by a second predetermined upper angle with respect to the optical axis to directions upward by the first predetermined upper angle to the 0° direction as the direction of light emission is gradually changed from 0° to the second predetermined upper angle upward, and the first predetermined upper angle and the first predetermined lower angle are each smaller than the first predetermined right angle and the first predetermined left angle.

4. The vehicle headlight according to claim 3, wherein each of the first predetermined lower angle and the first predetermined upper angle is 2 degrees or smaller.

5. The vehicle headlight according to claim 1, wherein each of the first predetermined right angle and the first predetermined left angle is 45 degrees or smaller.

6. A projection lens for a vehicle headlight, comprising a light emitting surface, a light incident surface on which light to be projected through the light emitting surface is incident, and a reference point disposed to face the light incident surface, wherein the protection lens has an optical axis through the light emitting surface, the light incident surface, and the reference point, at least one of the light emitting surface and the light incident surface includes a surface configured to control light from the reference point such that light incident on the light incident surface at an incident position on a predetermined reference axis or a first incident position near the predetermined reference axis is directed in a direction not parallel to the predetermined reference axis, the surface also configured to control light incident on the light incident surface at a second incident position away from the predetermined reference axis to be directed in a direction parallel to the predetermined reference axis, and the surface further configured to control light incident on the light incident surface at an incident position between the first incident position and the second incident position to be directed in a direction closer to the direction parallel to the predetermined reference axis as the light is incident on the light incident surface at an incident position closer from the first incident position to the second incident position, a right portion of an one of the light incident surface and the light emitting surface on a right side with respect to a vertical plane including the optical axis has a horizontal cross section configured to control light emitted from the reference point and directed in a 0° direction with respect to the optical axis to a direction rightward by a first predetermined right angle with respect to the optical axis and also control the light emitted from the reference point and directed in directions ranging from the 0° direction to a direction rightward by a second predetermined right angle with respect to the optical axis to directions rightward by the first predetermined right angle to the 0° direction as the direction of light emission is gradually changed from 0° to the second predetermined right angle rightward, and a left portion of any one of the light incident surface and the light emitting surface on a left side with respect to the vertical plane including the optical axis has a horizontal cross section configured to control the light emitted from the reference point and directed in a 0° direction with respect to the optical axis to a direction leftward by a first predetermined left angle with respect to the optical axis and also control the light emitted from the reference point and directed in directions ranging from the 0° direction to a direction leftward by a second predetermined left angle with respect to the optical axis to directions leftward by the first predetermined left angle to the 0° direction as the direction of light emission is gradually changed from 0° to the second predetermined left angle rightward.

7. The projection lens for a vehicle headlight according to claim 6, wherein a lower portion of any one of the light incident surface and the light emitting surface on a lower side with respect to a horizontal plane including the optical axis has a vertical cross section configured to control the light emitted from the light source at the reference point and directed in the 0° direction with respect to the optical axis to a direction downward by a first predetermined lower angle with respect to the optical axis and also control the light emitted from the light source at the reference point and directed in directions ranging from the 0° direction to a direction downward by a second predetermined lower angle with respect to the optical axis to directions downward by the first predetermined lower angle to the 0° direction as the direction of light emission is gradually changed from 0° to the second predetermined lower angle downward, an upper portion of any one of the light incident surface and the light emitting surface on an upper side with respect to the vertical plane including the optical axis has a horizontal cross section configured to control the light emitted from the light source at the reference point and directed in a 0° direction with respect to the optical axis to a direction upward by a first predetermined upper angle with respect to the optical axis and also control the light emitted from the light source at the reference point and directed in directions ranging from the 0° direction to a direction upward by a second predetermined upper angle with respect to the optical axis to directions upward by the first predetermined upper angle to the 0° direction as the direction of light emission is gradually changed from 0° to the second predetermined upper angle upward, and both the first predetermined upper angle and the first predetermined lower angle are smaller than both the first predetermined right angle and the first predetermined left angle.

8. The projection lens for a vehicle headlight according to claim 7, wherein each of the first predetermined lower angle and the first predetermined upper angle is 2 degrees or smaller.

9. The projection lens for a vehicle headlight according to claim 6, wherein each of the first predetermined right angle and the first predetermined left angle is 45 degrees or smaller.

* * * * *